(12) United States Patent
Sugita et al.

(10) Patent No.: US 10,126,859 B2
(45) Date of Patent: Nov. 13, 2018

(54) TOUCH PANEL

(71) Applicant: Sharp Kabushiki Kaisha, Osaka (JP)

(72) Inventors: Yasuhiro Sugita, Osaka (JP); Kenshi Tada, Osaka (JP); Hiroyuki Ogawa, Osaka (JP); Shinji Yamagishi, Osaka (JP); Jean Mugiraneza, Osaka (JP); Koichi Miyachi, Osaka (JP); Hidefumi Yoshida, Osaka (JP); Mitsuhiro Murata, Osaka (JP); Kohhei Tanaka, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 13 days.

(21) Appl. No.: 15/119,059

(22) PCT Filed: Feb. 19, 2015

(86) PCT No.: PCT/JP2015/054617
§ 371 (c)(1),
(2) Date: Aug. 15, 2016

(87) PCT Pub. No.: WO2015/125864
PCT Pub. Date: Aug. 27, 2015

(65) Prior Publication Data
US 2017/0045988 A1    Feb. 16, 2017

(30) Foreign Application Priority Data

Feb. 20, 2014    (JP) .................................. 2014-030963

(51) Int. Cl.
*G06F 3/041*    (2006.01)
*G06F 3/044*    (2006.01)
*G02F 1/1333*    (2006.01)

(52) U.S. Cl.
CPC ........ *G06F 3/0416* (2013.01); *G02F 1/13338* (2013.01); *G06F 3/044* (2013.01);
(Continued)

(58) Field of Classification Search
None
See application file for complete search history.

(56) References Cited

U.S. PATENT DOCUMENTS

2010/0001969 A1* 1/2010 Saito ....................... G06F 3/044
345/173
2010/0182273 A1* 7/2010 Noguchi ............. G02F 1/13338
345/174
(Continued)

FOREIGN PATENT DOCUMENTS

CN           103425347 A    12/2013
JP           2009-244958 A  10/2009
(Continued)

*Primary Examiner* — Christopher Kohlman
(74) *Attorney, Agent, or Firm* — ScienBiziP, P.C.

(57) ABSTRACT

A touch panel includes: a first substrate; a second substrate disposed on a viewer side of the first substrate; a liquid crystal layer provided between the first substrate and the second substrate; a plurality of pixel electrodes and a common electrode for applying a voltage to the liquid crystal layer; and a plurality of detection electrodes and a plurality of driving electrodes for a touch sensor. The first substrate includes: a first transparent substrate; and the plurality of pixel electrodes, which are formed on the liquid crystal layer side of the first transparent substrate. The second substrate includes: a second transparent substrate; and the plurality of driving electrodes and the plurality of detection electrodes formed on the liquid crystal layer side of the second transparent substrate. The touch panel does not include a conductive layer on the viewer side of the second transparent substrate.

12 Claims, 47 Drawing Sheets

(52) U.S. Cl.
CPC .. *G06F 3/0412* (2013.01); *G06F 2203/04107* (2013.01); *G06F 2203/04112* (2013.01)

(56) References Cited

U.S. PATENT DOCUMENTS

| | | | | |
|---|---|---|---|---|
| 2011/0187677 A1* | 8/2011 | Hotelling | ............... | G06F 3/0412 345/174 |
| 2014/0028616 A1 | 1/2014 | Furutani et al. | | |
| 2014/0173893 A1* | 6/2014 | Nagao | ............... | G02F 1/133788 29/829 |
| 2014/0218335 A1* | 8/2014 | Teranishi | ................ | G06F 3/044 345/174 |
| 2014/0347578 A1* | 11/2014 | Yamada | .................. | G06F 3/044 349/12 |
| 2015/0035791 A1 | 2/2015 | Mo et al. | | |
| 2015/0091587 A1* | 4/2015 | Shepelev | ................ | G06F 3/044 324/658 |
| 2015/0177878 A1* | 6/2015 | Cheng | .................... | G06F 3/044 345/174 |
| 2016/0283009 A1* | 9/2016 | Sun | ....................... | G06F 3/0412 |

FOREIGN PATENT DOCUMENTS

| | | |
|---|---|---|
| JP | 2009-259063 A | 11/2009 |
| JP | 2010-15412 A | 1/2010 |
| WO | 2009/119664 A1 | 10/2009 |

\* cited by examiner (a)

TOUCH PANEL

TECHNICAL FIELD

The present invention relates to a touch panel, and specifically relates to a capacitive touch panel.

BACKGROUND ART

In recent years, touch panels have been widely used in smart phones, tablet-type portable terminals, and the like. There are a variety of different types of touch panels that are well-known, such as resistive touch panels, capacitive touch panels, and optical touch panels. Among these, projection-type capacitive touch panels, which can respond to multi-touch and in which touch locations can be detected with a high degree of accuracy, have become widely used. Hereafter, a touch panel will be described that is used in combination with a TFT liquid crystal display panel (hereafter sometimes referred to as a "TFT LCD") that is used as a display panel. The display panel is not limited to a TFT LCD, and various types of display panels can be used, such as an organic EL display panel or an electrophoretic display panel.

There are various types of touch panels, such as external touch panels (in which the touch panel is disposed on the viewer side of a polarizing plate (referred to as a "front polarizing plate") that is disposed on the viewer side of a display panel), on-cell touch panels, and in-cell touch panels. Here, an on-cell touch panel and an in-cell touch panel have been combined, forming a so-called "built-in touch panel". Here, the word "cell" refers to a display cell (hereafter referred to as a "display panel"), and the liquid crystal display panel includes a pair of substrates (a TFT substrate and an opposite substrate, for example) that face each other through a liquid crystal layer and does not include a polarizing plate, for example. An on-cell touch panel includes a layer that functions as a touch panel between a polarizing plate and the opposite substrate of the liquid crystal display panel, while an in-cell touch panel includes a layer that functions as a touch panel on the liquid crystal layer side of the opposite substrate of the liquid crystal display panel or on the TFT substrate of the liquid crystal display panel. A built-in touch panel is useful in that the device (including the TFT liquid crystal display panel and the touch panel) is thinner, lighter, and narrower overall compared to an external touch panel, and also has the benefit of being able to increase light transmittance.

Patent Document 1 discloses a touch panel that is less likely to be affected by the potential of a user (a finger) since a common electrode of the liquid crystal display panel is used as driving electrodes (transmission electrodes) for a touch sensor. Patent Document 1 discloses an on-cell touch panel and an in-cell touch panel. FIG. 4 of Patent Document 1 discloses an on-cell touch panel that utilizes a vertical electric field mode (also referred to as "V mode") liquid crystal display panel, for example. FIG. 9 and the like of Patent Document 1 disclose a touch panel that uses a fringe field switching (FFS) mode liquid crystal display panel that utilizes positive-type liquid crystal material as an example of an in-cell touch panel that utilizes a horizontal electric field mode (also referred to as "L mode") liquid crystal display panel (see FIG. 10 of Patent Document 1).

RELATED ART DOCUMENT

Patent Document

Patent Document 1: Japanese Patent Application Laid-Open Publication No. 2009-244958

SUMMARY OF THE INVENTION

Problems to be Solved by the Invention

However, in the on-cell touch panel disclosed in FIG. 4 of Patent Document 1, it is necessary to form two electrodes (a sensor detection electrode layer and a sensor driving electrode layer (which functions as a common electrode)) on both sides of an opposite substrate that is, of the two substrates in the display panel, disposed closer to the viewer. As a result, there are a variety of problems with such a touch panel, such as manufacturing costs being high, difficulty in making the display panel larger and thinner, and low light transmittance.

Meanwhile, in an in-cell touch panel that utilizes a horizontal field mode liquid crystal display panel that has a configuration such as that disclosed in FIG. 9 of Patent Document 1, in order to prevent changes in the electric field resulting from contact by the finger of a user from having a negative effect on the alignment of liquid crystal molecules, a configuration is used in which the polarizing plate disposed closer to the viewer has an anti-static conductive layer (also referred to as a "shield electrode layer"). This leads to problems such as increases in costs, decreases in the sensing function of the touch panel, and decreases in light transmittance.

In this manner, it is necessary for the touch panel disclosed in Patent Document 1 to have a total of two conductive layers, including one conductive layer provided on the opposite substrate side of the liquid crystal layer and one conductive layer provided on the viewer side of the opposite substrate. Therefore, there is a problem (Problem 1) in which manufacturing costs are high, light transmittance is low, and the like. Problem 1 is a problem shared by both touch panels that use a vertical electric field mode liquid crystal display panel and touch panels that use a horizontal electric field mode liquid crystal display panel.

Touch panels that use a horizontal electric field mode liquid crystal display panel have a problem (Problem 2) in that it is necessary to separately provide a shield electrode layer for preventing the electric field from affecting the liquid crystal layer.

In addition, according to research conducted by the inventors, the touch panel disclosed in Patent Document 1 has a problem (Problem 3) in that there is a decrease in display quality. This is due to the fact that since the common electrode of the liquid crystal display panel is used as driving electrodes, when transmission signals are sequentially provided to the common electrode, which has been divided into a plurality of sections, differences in potential occur between adjacent common electrodes and an electric field is formed in the liquid crystal layer in accordance with this difference in potential, resulting in the liquid crystal molecules becoming misaligned. While Problem 3 is a problem shared by both touch panels that utilize a vertical electric field mode liquid crystal display panel and touch panels that utilize a horizontal electric field mode liquid crystal display panel, Problem 3 is more pronounced in touch panels that utilize a horizontal electric field mode liquid crystal display panel than in touch panels that utilize a vertical electric field mode liquid crystal display panel.

The present invention was created in order to solve at least the above-mentioned Problem 1, and an aim thereof is to provide a touch panel that utilizes a liquid crystal display panel and that, at a minimum, does not have a conductive layer (a detection electrode layer or an anti-static conductive layer) on the viewer side of a transparent substrate on the viewer side of the touch panel, regardless of the display mode (whether a vertical electric field mode or a horizontal electric field mode) of the liquid crystal display panel.

Means for Solving the Problems

A touch panel according to one embodiment of the present invention includes: a first substrate; a second substrate disposed on a viewer side of the first substrate; and a liquid crystal layer provided between the first substrate and the second substrate, wherein the touch panel further includes a plurality of pixel electrodes and a common electrode for applying a voltage to the liquid crystal layer, and a plurality of detection electrodes and a plurality of driving electrodes for a touch sensor, wherein the first substrate includes a first transparent substrate and the plurality of pixel electrodes formed on the liquid crystal layer side of the first transparent substrate, wherein the second substrate includes a second transparent substrate and the plurality of driving electrodes and the plurality of detection electrodes formed on the liquid crystal layer side of the second transparent substrate, and wherein the touch panel does not include a conductive layer on the viewer side of the second transparent substrate.

In one embodiment, the second substrate includes the common electrode, wherein the common electrode is formed on the liquid crystal layer side of the second transparent substrate, and wherein the liquid crystal layer is a vertical alignment-type liquid crystal layer that includes nematic liquid crystal material having a negative dielectric anisotropy. A touch panel of one embodiment of the present invention may include a different type of vertical electric field mode liquid crystal display panel other than a vertical alignment mode liquid crystal display panel, such as a TN mode liquid crystal display panel, for example.

In one embodiment, the common electrode has a plurality of common electrode sections, wherein the plurality of common electrode sections also function as the plurality of detection electrodes.

In one embodiment, the first substrate further includes the common electrode, wherein the first substrate includes the common electrode, wherein the common electrode is formed on the liquid crystal layer side of the first transparent substrate, and wherein the liquid crystal layer is a horizontal alignment-type liquid crystal layer that includes nematic liquid crystal material having a negative dielectric anisotropy. A touch panel of one embodiment of the present invention may include a horizontal electric field mode liquid crystal display panel, such as an FFS mode liquid crystal display panel or an IPS mode liquid crystal display panel. In addition, while it is possible to use a liquid crystal display panel that has a liquid crystal layer that includes nematic liquid crystal material having a positive dielectric anisotropy, it is preferable to use a liquid crystal display panel that has a liquid crystal layer that includes nematic liquid crystal material having a negative dielectric anisotropy.

In one embodiment, the second substrate further includes a shield electrode layer formed closer to the liquid crystal layer than the plurality of driving electrodes.

In one embodiment, a potential of the shield electrode layer is fixed.

In one embodiment, the shield electrode layer has a plurality of shield electrode sections, and the plurality of shield electrode sections function as the plurality of detection electrodes.

In one embodiment, the common electrode has a plurality of common electrode sections that are parallel to the plurality of detection electrodes, and wherein the plurality of common electrode sections are respectively electrically connected to one of the plurality of detection electrodes facing the common electrode sections through the liquid crystal layer.

In one embodiment, the second substrate further includes a black matrix formed on the liquid crystal layer side of the second transparent substrate, wherein the plurality of driving electrodes respectively include a metal electrode, and wherein the plurality of driving electrodes are disposed so as to overlap a light-shielding portion of the black matrix when viewed from a direction normal to the second substrate.

In one embodiment, the plurality of detection electrodes extend in a first direction, wherein the plurality of driving electrodes extend in a second direction that intersects the first direction, wherein the light-shielding portion of the black matrix has a wide section that extends in the second direction, and wherein the plurality of driving electrodes are disposed so as to overlap the wide section of the black matrix when viewed from the direction normal to the second substrate.

In one embodiment, the touch panel further includes a plurality of lead-out wiring lines that are formed from a same conductive film as the plurality of detection electrodes and that extend in the first direction, wherein the plurality of driving electrodes are respectively connected to at least one of the plurality of lead-out wiring lines, and wherein terminals for the plurality of detection electrodes and terminals for the plurality of lead-out wiring lines are both provided near a same side of the second transparent substrate that extends substantially parallel to the second direction.

In one embodiment, the plurality of driving electrodes and the plurality of detection electrodes are formed from a same conductive film, and wherein, from among the plurality of driving electrodes, two driving electrodes that are adjacent to each other with one of the plurality of detection electrodes interposed therebetween are electrically connected to each other.

In one embodiment, the touch panel further includes a plurality of lead-out wiring lines formed from the same conductive film as the plurality of driving electrodes and the plurality of detection electrodes, wherein the plurality of driving electrodes are respectively connected to at least one of the plurality of lead-out wiring lines, and wherein terminals for the plurality of detection electrodes and terminals for the plurality of lead-out wiring lines are both provided near a same side of the second transparent substrate.

In one embodiment, the plurality of driving electrodes and the plurality of detection electrodes are formed of two different conductive films that are insulated from one another.

In one embodiment, the second substrate further includes a shield electrode layer formed closer to the liquid crystal layer than the plurality of detection electrodes, wherein the shield electrode layer has a plurality of shield electrode sections, and wherein the plurality of shield electrode sections function as the plurality of driving electrodes.

In one embodiment, the common electrode includes a plurality of common electrode sections, and wherein the plurality of common electrode sections function as the plurality of driving electrodes.

Effects of the Invention

According to one embodiment of the present invention, a touch panel is provided that utilizes a liquid crystal display panel and that does not include a conductive layer (a detection electrode layer or an anti-static conductive layer) at least on a viewer side of a transparent substrate on a viewer side of the touch panel, regardless of the display mode of the liquid crystal display panel.

BRIEF DESCRIPTION OF THE DRAWINGS

FIG. 5(a) shows the results for when positive-type liquid crystal material was used, and FIG. 5(b) shows the results for when negative-type liquid crystal material was used.

FIG. 28 shows examples of the connection configuration of the lead-out wiring line 12Dt and the driving electrode 14D.

FIG. 32(a) is a cross-sectional view along the line X1-X1', and FIG. 32(b) is a cross-sectional view along the line Y1-Y1'.

FIG. 33(a) is a cross-sectional view along the line X1-X1', and FIG. 33(b) is a cross-sectional view along the line Y1-Y1'.

FIG. 37(a) is a cross-sectional view along the line X1-X1', and FIG. 37(b) is a cross-sectional view along the line Y1-Y1'.

FIG. 38(a) is a cross-sectional view along the line X1-X1', and FIG. 38(b) is a cross-sectional view along the line Y1-Y1'.

FIG. 41(a) is a cross-sectional view along the line X1-X1', and FIG. 41(b) is a cross-sectional view along the line Y1-Y1'.

FIG. 42(a) is a cross-sectional view along the line X1-X1', and FIG. 42(b) is a cross-sectional view along the line Y1-Y1'.

FIG. 43(a) is a cross-sectional view along the line X1-X1', and FIG. 43(b) is a cross-sectional view along the line Y1-Y1'.

FIG. 45(a) is a cross-sectional view along a line A-A' in FIG. 44(a), and FIG. 45(b) is a cross-sectional view along a line B-B' in FIG. 44(a).

FIG. 46(b) shows a basic pattern TBP of the touch sensor, and FIG. 46(a) enlarges a portion P1 of FIG. 46(b).

FIG. 47(b) shows the TFT substrate 1SA, and FIG. 47(a) enlarges a portion P2 of FIG. 47(b).

DETAILED DESCRIPTION OF EMBODIMENTS

Figure 1:
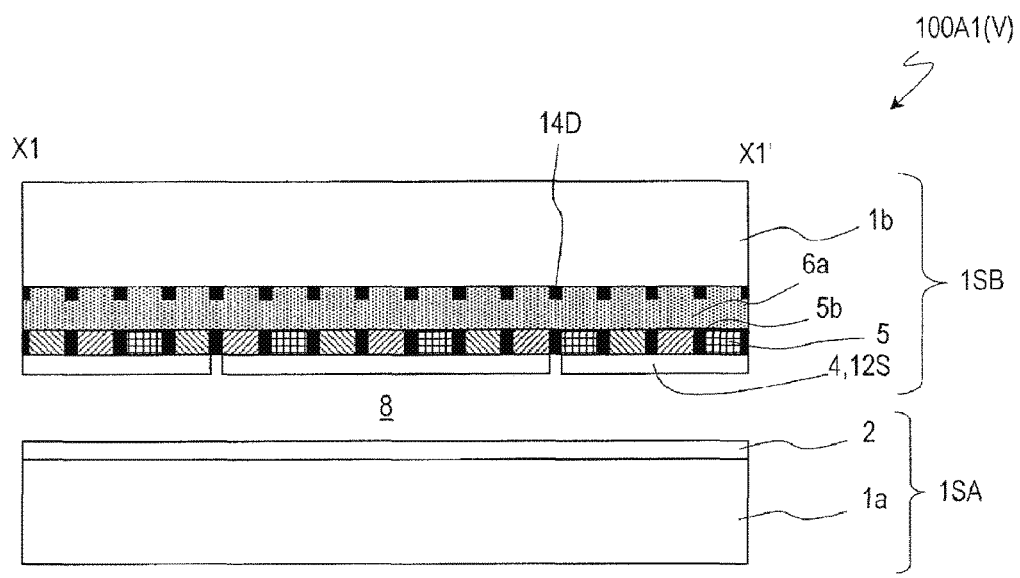
FIG. 1 is a schematic cross-sectional view of a touch panel according to one embodiment of the present invention, and is a cross-sectional view along a line X1-X1' of a type touch panel 100A1(V) that uses a vertical electric field mode liquid crystal display panel.

Touch panels according to the embodiments of the present invention include: type A (including A1 and A2), type B, type C, and type D (including D1 and D2) touch panels, all of which will be explained later. Type A to D touch panels are able to resolve at least the above-mentioned Problem 1, regardless of whether a vertical electric field mode or horizontal electric field mode liquid crystal display panel is used. In addition, a touch panel of one embodiment that utilizes a horizontal electric field mode liquid crystal display panel is able to resolve the above-mentioned Problem 2. Type A (including A1 and A2), type B, and type C touch panels are able to resolve the above-mentioned Problem 3, regardless of whether a vertical electric field mode or horizontal electric field mode liquid crystal display panel is used. The above-mentioned Problem 3 is more pronounced in a touch panel that utilizes a horizontal electric field mode liquid crystal display panel, however.

Touch panels according to embodiments of the present invention will be described below with reference to the drawings. Touch panels according to embodiments of the present invention are not limited to the touch panels described as examples below. In the drawings below, constituting components having essentially the same functions are shown with common reference characters, and descriptions thereof may be omitted.

First, the configuration of type A touch panels will be described. FIG. 1 schematically shows the cross-sectional structure of a type A1 touch panel 100A1(V) according to one embodiment of the present invention. This cross-sectional view corresponds to a cross-sectional view along the line X1-X1' in FIG. 8(c).

The touch panel 100A1(V) includes a vertical electric field mode liquid crystal display panel. Hereafter, the reference character of touch panels that include a vertical electric field mode liquid crystal display panel will have a "(V)" attached to the end of the character in order to distinguish the touch panel from a touch panel that includes a horizontal electric field mode liquid crystal display panel. The vertical electric field mode liquid crystal display panel differs from a horizontal electric field mode liquid crystal display panel in that the panel includes a common electrode (also referred to as an "opposite electrode") in an opposite substrate (a substrate disposed on a viewer side of a liquid crystal layer).

The touch panel 100A1(V) includes: a TFT substrate (first substrate) 1SA; an opposite substrate (second substrate) 1SB disposed on a viewer side of the TFT substrate 1SA; and a liquid crystal layer 8 provided between the TFT substrate 1SA and the opposite substrate 1SB. The touch panel 100A1(V) further includes: a plurality of pixel electrodes 2 and a common electrode 4 for applying voltage to the liquid crystal layer 8; and a plurality of detection electrodes 12S and a plurality of driving electrodes 14D for a touch sensor. The liquid crystal layer 8 is a vertical alignment-type liquid crystal layer that includes nematic liquid crystal material having a negative dielectric anisotropy, for example. The liquid crystal layer included in the vertical electric field mode liquid crystal display panel is not limited to a vertical alignment (VA) mode, and may be a liquid crystal layer used in another well-known type of vertical electric field mode, such as a twisted nematic (TN) mode, for example.

The TFT substrate 1SA includes: a first transparent substrate (a glass substrate, for example) 1a; and the plurality of pixel electrodes 2, which are formed on the liquid crystal layer 8 side of the first transparent substrate 1a. In FIG. 1, the plurality of pixel electrodes 2 are shown as one layer for ease of description, but are electrically independent for each pixel. The same is true for other drawings, unless otherwise specifically noted.

Figure 44:
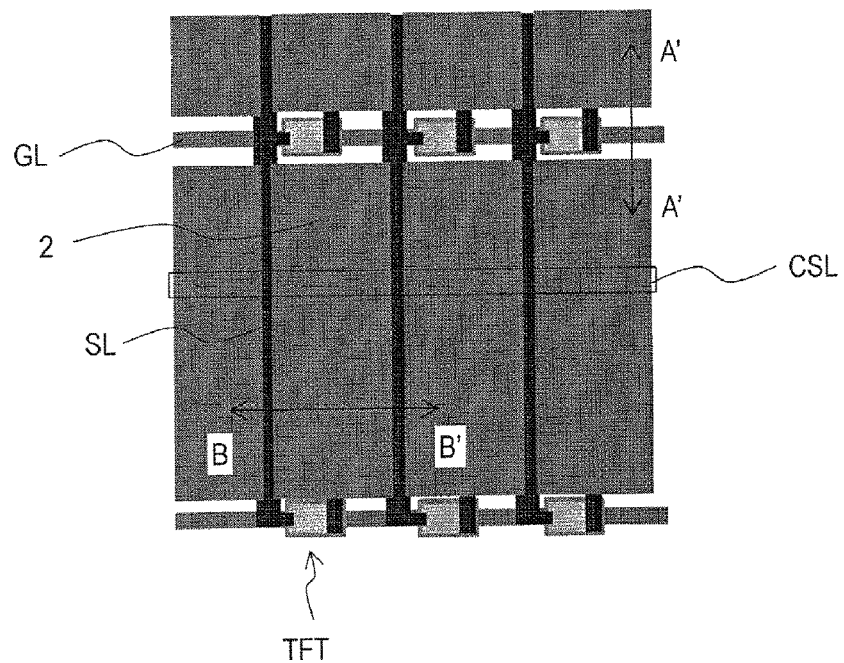
FIG. 44(a) is a schematic plan view of a TFT substrate of a TFT liquid crystal display panel.
FIG. 44(b) is a plan view that shows the TFT substrate as viewed from the opposite substrate side.
Figure 44:
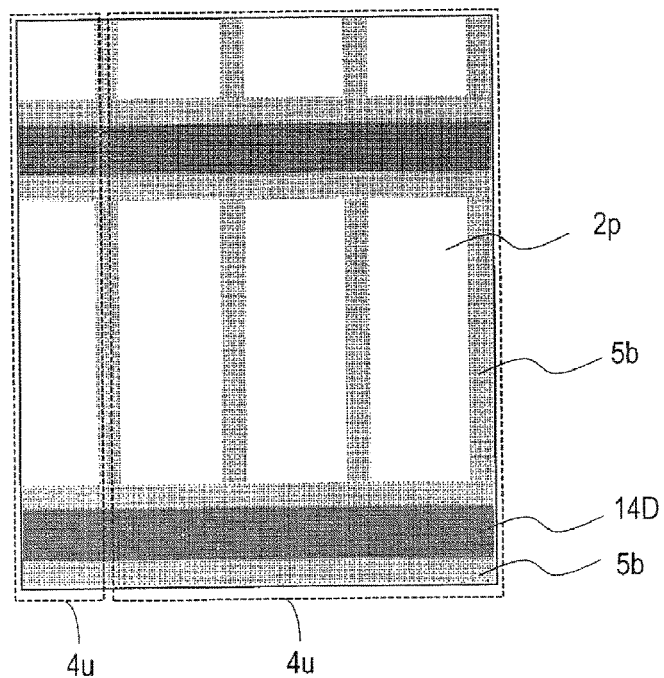

The TFT substrate 1SA further includes: a TFT; a gate bus line connected to the gate electrode of the TFT; and a source bus line connected to the source electrode of the TFT. The drain electrode of the TFT is electrically connected to the pixel electrode 2. The TFT liquid crystal display panel has an auxiliary capacitance (CS) that is electrically connected in parallel to a liquid crystal capacitance (the pixel electrodes 2/the liquid crystal layer 8/the common electrode 4). The auxiliary capacitance is formed via an insulating layer (a gate insulation layer, for example) and a pair of electrodes that face each other through the insulating layer. One of the electrodes (also referred to as an "auxiliary capacitance electrode") of the auxiliary capacitance is provided with the same voltage (a display signal voltage, for example) as the pixel electrode 2, and the other electrode (also referred to as an "auxiliary capacitance opposite electrode") is provided with the same voltage (a common voltage, for example) as the common electrode 4 via a CS bus line. The pixel electrode 2 may also function as the auxiliary capacitance electrode. The auxiliary capacitance opposite electrode and the CS bus line are formed of the same metal layer as the gate bus line, for example, and the CS bus line is disposed so as to be parallel to the gate bus line. Since these constituting components of the TFT substrate 1SA in a vertical electric field mode liquid crystal display panel are well-known, descriptions thereof may be omitted. (For example, please refer to the auxiliary capacitance opposite electrode 7 in FIG. 10B for an example of an auxiliary capacitance opposite electrode and to the CS bus line CSL in FIG. 44(*a*) for an example of a CS bus line).

The opposite substrate 1SB includes: a second transparent substrate (a glass substrate, for example) 1*b*; and the plurality of driving electrodes 14D and the plurality of detection electrodes 12S formed on the liquid crystal layer 8 side of the second transparent substrate 1*b*. The opposite substrate 1SB does not include a conductive layer on the viewer side of the second transparent substrate 1*b*. The opposite substrate 1SB includes the common electrode 4, and the common electrode 4 is formed on the liquid crystal layer 8 side of the second transparent substrate 1*b*. The common electrode 4 has a plurality of common electrode sections, and the plurality of common electrode sections function as the plurality of detection electrodes 12S.

In the opposite substrate 1SB of the touch panel 100A1 (V), the common electrode 4 that functions as the detection electrodes 12S is formed on the liquid crystal layer 8 side of the driving electrodes 14D. The driving electrodes 14D and the detection electrodes 12S (the common electrode 4) are insulated from each other via an interlayer insulating layer 6*a*. The detection electrodes 12S (the common electrode 4) are formed on a color filter layer 5 (which includes a black matrix 5*b*) that is formed on the interlayer insulating layer 6*a*. Unlike the driving electrodes 14D, these detection electrodes 12S (the common electrode 4) have a fixed potential, and the detection electrodes 12S are used so as to suppress the generation of a vertical electric field in the liquid crystal layer 8 resulting from electric charges on the surface of the opposite substrate 1SB. In other words, the detection electrodes 12S (the common electrode 4) function as a shield electrode layer. In addition, since the potential of the detection electrodes 12S (the common electrode 4) is fixed, the touch panel 100A1(V) is able to resolve the above-mentioned Problem 3 of a decline in display quality resulting from the liquid crystal molecules becoming misaligned due to the voltage used to drive the touch panel.

As will be explained later, the detection electrodes 12S may be provided independent of the common electrode 4 so as to be closer to the second transparent substrate 1*b* than the common electrode 4, as is the case for type B and type C touch panels. In cases in which the common electrode 4 is not used as the detection electrodes 12S, the common electrode 4 can be formed as a single conductive film in a manner similar to a common electrode in a normal vertical electric field mode liquid crystal display panel.

The touch panel 100A1(V) does not include a conductive layer on the viewer side of the second transparent substrate 1*b*. In other words, a conductive layer is not formed on the surface on the viewer side of the second transparent substrate 1*b*. In addition, while the touch panel 100A1(V) includes two polarizing plates (not shown) that are disposed so as to face each other through the two substrates 1SA, 1SB interposed therebetween, the polarizing plate (also referred to as a "front polarizing plate") disposed on the viewer side of the opposite substrate 1SB is an ordinary polarizing plate that does not include an anti-static conductive layer. In this manner, the touch panel 100A1(V) according to one embodiment of the present invention does not include a conductive layer (either a detection electrode layer or an anti-static conductive layer) on the viewer side of the touch panel. Therefore, the touch panel 100A1(V) is able to resolve the above-mentioned Problem 1 of high manufacturing costs, difficulty in making the device larger and thinner, low light transmittance, and the like.

Figure 2:
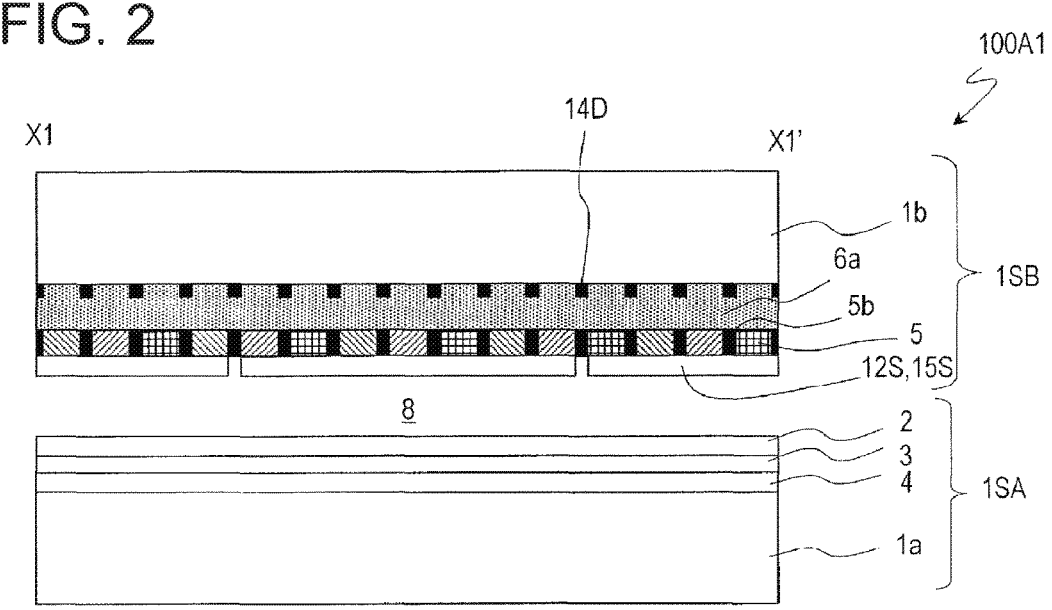
FIG. 2 is a cross-sectional view along a line X1-X1' of a type A1 touch panel 100A1 that uses a horizontal electric field mode liquid crystal display panel.

Next, the configuration of a type A1 touch panel 100A1 that utilizes a horizontal electric field mode liquid crystal display panel will be described with reference to FIG. 2. FIG. 2 is a cross-sectional view of the touch panel 100A1 along the line X1-X1' in FIG. 8(*c*).

The touch panel 100A1 includes: the TFT substrate (first substrate) 1SA; the opposite substrate (second substrate) 1SB disposed on the viewer side of the TFT substrate 1SA; and the liquid crystal layer 8 provided between the TFT substrate 1SA and the opposite substrate 1SB. The touch panel 100A1 further includes: the plurality of pixel electrodes 2 and the common electrode 4 for applying voltage to the liquid crystal layer 8; and the plurality of detection electrodes 12S and the plurality of driving electrodes 14D for the touch sensor.

The TFT substrate 1SA includes: the first transparent substrate (a glass substrate, for example) 1*a*; and the plurality of pixel electrodes 2, which are formed on the liquid crystal layer 8 side of the first transparent substrate 1*a*. The opposite substrate 1SB includes: the second transparent substrate (a glass substrate, for example) 1*b*; and the plurality of driving electrodes 14D and the plurality of detection electrodes 12S formed on the liquid crystal layer 8 side of the second transparent substrate 1*b*.

The touch panel 100A1 also does not include a conductive layer on the viewer side of the second transparent substrate 1*b*. In addition, while the touch panel 100A1 includes two polarizing plates (not shown) that are disposed so as to face each other through the two substrates 1SA, 1SB interposed therebetween, the polarizing plate disposed on the viewer side of the opposite substrate 1SB also is an ordinary polarizing plate that does not include an anti-static conductive layer.

The touch panel 100A1 used as an example includes an FFS mode liquid crystal display panel. The liquid crystal layer 8 is a horizontal alignment-type liquid crystal layer that includes nematic liquid crystal material having a negative dielectric anisotropy (also referred to as "negative-type"), for example. As will be mentioned later, an FFS mode liquid crystal display panel that utilizes negative-type nematic liquid crystal material has the benefit of being able to decrease misalignment of liquid crystal molecules resulting from a vertical electric field compared to a case in which nematic liquid crystal material having a positive dielectric anisotropy (also referred to as "positive-type") is used.

The TFT substrate 1SA forming a part of the FFS mode liquid crystal display panel includes: the common electrode 4, which is formed on the liquid crystal layer 8 side of the first transparent substrate 1*a*; and the plurality of pixel electrodes 2, which are formed on the liquid crystal layer 8 side of the common electrode 4. The common electrode 4 and the plurality of pixel electrodes 2 are insulated from each other via an interlayer insulating layer 3. In FIG. 2 as well, the plurality of pixel electrodes 2 are shown as one layer for ease of description, but are electrically independent for each pixel. The same is true for other drawings, unless otherwise specifically noted. In addition, the positional relationship of the common electrode 4 and the pixel electrodes 2 may be the opposite of that described above, or in other words, the common electrode 4 may be on the liquid crystal layer 8 side of the pixel electrodes 2. In the drawings that show a touch panel that utilizes a horizontal electric field mode liquid crystal display panel, the pixel electrodes 2 and the interlayer insulating layer 3 may be omitted in order to simplify the drawings. In addition, in an FFS mode liquid crystal display panel, the stacked structure of the pixel electrodes 2/interlayer insulating layer 3/common electrode 4 forms the auxiliary capacitance (CS). In other words, the pixel electrodes 2 function as "the auxiliary capacitance electrode", and the common electrode 4 disposed so as to face the pixel electrodes 2 functions as the "auxiliary capacitance opposite electrode". A common wiring line that provides a common voltage to the common electrode 4 functions as a CS bus line.

In the opposite substrate 1SB of the touch panel 100A1, the detection electrodes 12S are formed on the liquid crystal layer 8 side of the driving electrodes 14D. The driving electrodes 14D and the detection electrodes 12S are insulated from each other via the interlayer insulating layer 6a. The detection electrodes 12S are formed on the color filter layer 5 (which includes the black matrix 5b) that is formed on the interlayer insulating layer 6a. The detection electrodes 12S (unlike the driving electrodes 14D) have a fixed potential, and the detection electrodes 12S are used so as to suppress the generation of a vertical electric field in the liquid crystal layer 8 resulting from electric charges on the surface of the opposite substrate 1SB. In other words, the detection electrodes 12S function as a shield electrode layer 15S. As will be explained later, the shield electrode layer 15S may be provided independent of the detection electrodes 12S so as to be closer to the liquid crystal layer 8 than the detection electrodes 12S, as is the case for type B and type C touch panels. The shield electrode layer 15S does not need to be formed via a single continuous conductive layer, and, like the detection electrodes 12S, may be formed of a plurality of electrodes. However, it is preferable that the shield electrode layer 15S be formed so as cover the entire display area, excluding a light-shielding portion of the black matrix 5b.

The touch panel 100A1 according to one embodiment of the present invention does not include a conductive layer (either a detection electrode layer or an anti-static conductive layer) on the viewer side of the touch panel. Therefore, the touch panel 100A1 is able to resolve the above-mentioned Problems 1 and 2 of high manufacturing costs, difficulty in making the device larger and thinner, low light transmittance, and the like. Furthermore, since the touch panel 100A1 includes the shield electrode layer 15S formed on the liquid crystal layer 8 side of the driving electrodes 14D, it is possible to mitigate the above-mentioned Problem 3 in which display quality is reduced due to the liquid crystal molecules becoming misaligned as a result of the voltage used to drive the touch panel. The liquid crystal layer 8 having nematic liquid crystal material that has a negative dielectric anisotropy also contributes toward resolving Problem 3.

Figure 3:
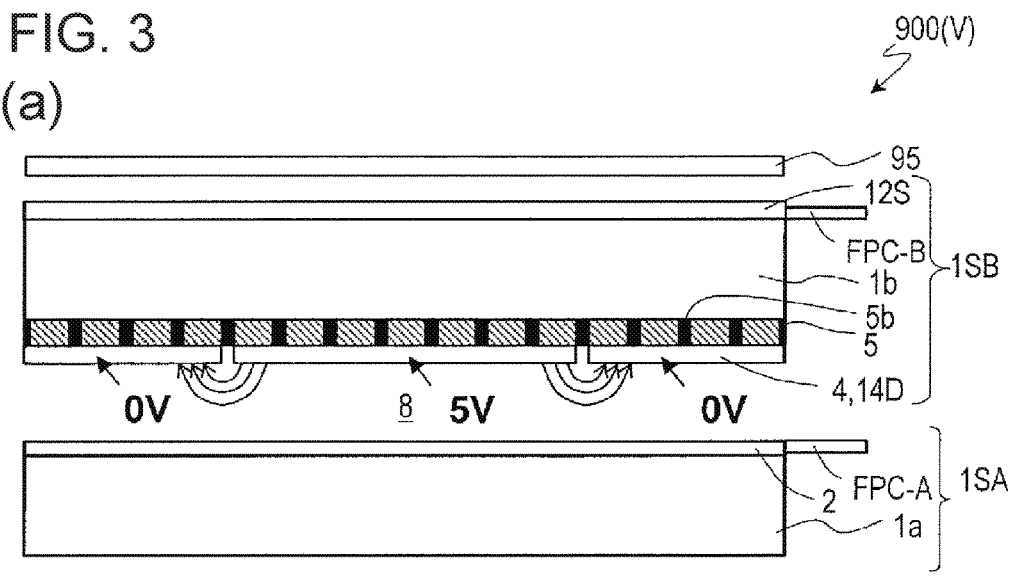
FIG. 3(a) is a schematic cross-sectional view of a touch panel 900(V) of a comparison example that uses a vertical electric field mode liquid crystal display panel.
FIG. 3(b) is a schematic cross-sectional view of a touch panel 900 of a comparison example that uses a horizontal electric field mode liquid crystal display panel.
Figure 3:
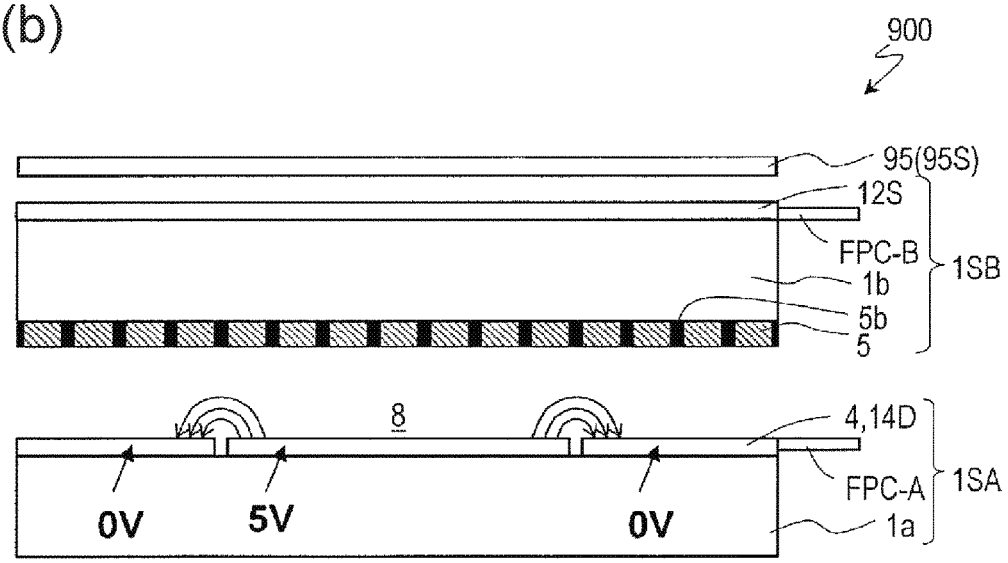

Next, the configurations and problems of touch panels 900(V), 900 according to comparison examples will be explained in detail with reference to FIG. 3. FIG. 3(a) is a schematic cross-sectional view of the touch panel 900(V) of a comparison example that uses a vertical electric field mode liquid crystal display panel, and FIG. 3(b) is a schematic cross-sectional view of the touch panel 900 of a comparison example that uses a horizontal electric field mode liquid crystal display panel.

Figure 4:
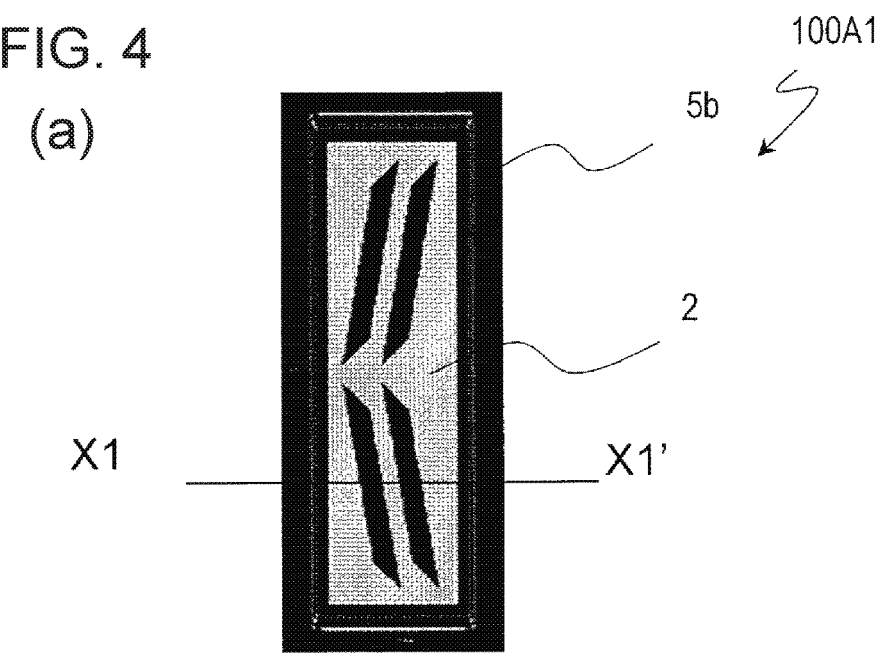
FIG. 4(a) is a plan view of a portion of the touch panel 100A1 that corresponds to one pixel.
FIG. 4(b) is a cross-sectional view of the touch panel 100A1 along the line X1-X1' in FIG. 4(a).
Figure 4:
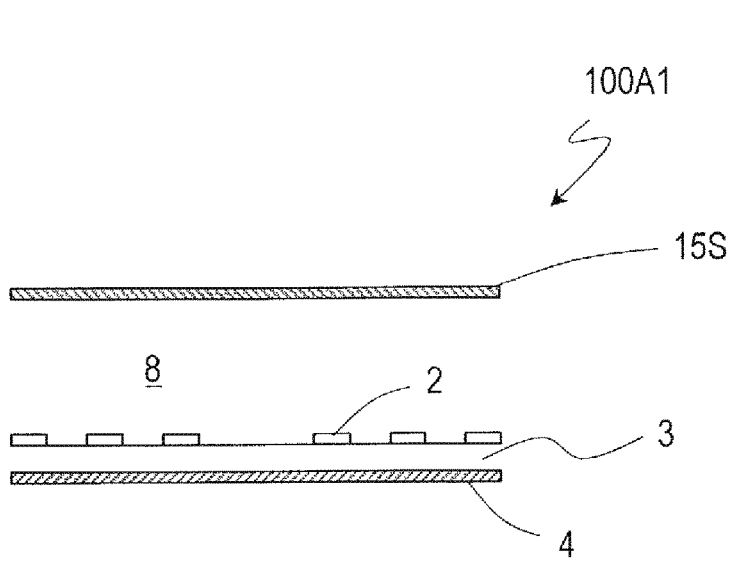

In the touch panel 900(V) shown in FIG. 3(a), like the touch panel disclosed in FIG. 4 of Patent Document 1, the common electrode 4 included in the opposite substrate 1SB is used as the driving electrodes 14D for the touch sensor, and the detection electrodes 12S are provided on the viewer side of the second transparent substrate 1b included in the opposite substrate 1SB. It is necessary in the touch panel 900(V) to provide not just an FPC-A in the TFT substrate 1SA, but also provide an FPC-B in the opposite substrate 1SB in order to connect the touch panel 900(V) to an external circuit (not shown) that provides desired voltages to the various electrodes. A front polarizing plate 95 included in the touch panel 900(V) is an ordinary polarizing plate that does not include an anti-static conductive layer.

Figure 9:
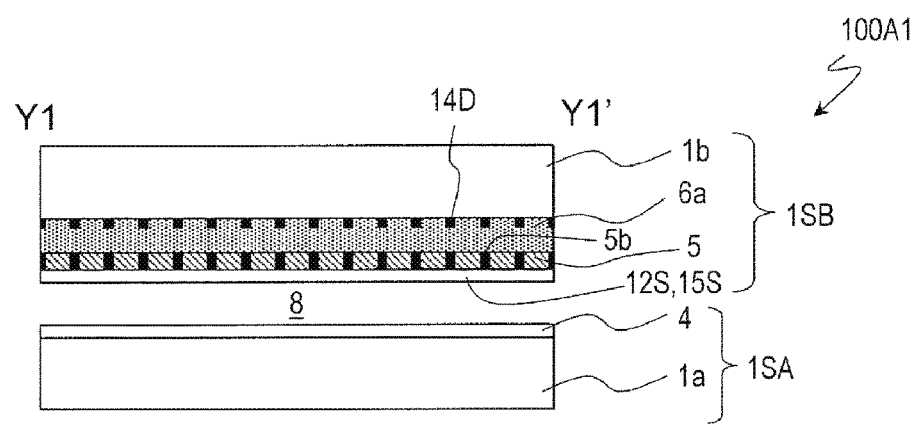
FIG. 9(a) is a cross-sectional view of the touch panel 100A1 along a line Y1-Y1'.
FIG. 9(b) is a cross-sectional view of the touch panel 100A1 along a line X2-X2'.
Figure 9:
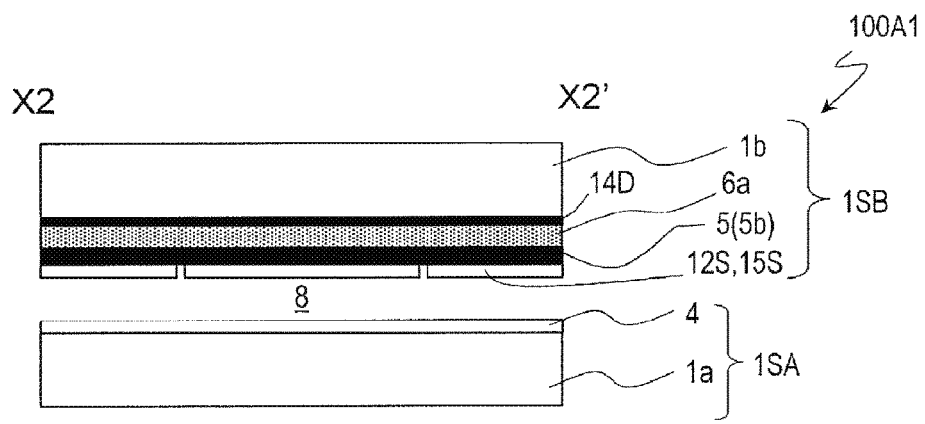

In the touch panel 900 shown in FIG. 3(b), like the touch panel disclosed in FIG. 9 of Patent Document 1, the common electrode 4 (the pixel electrodes and the interlayer insulating layer are not shown) included in the TFT substrate 1SA is used as the driving electrodes 14D for the touch sensor, and the detection electrodes 12S are provided on the viewer side of the second transparent substrate 1b included in the opposite substrate 1SB. The touch panel 900 further includes a special polarizing plate, which includes an anti-static conductive layer 95S, as the front polarizing plate 95. It is necessary in the touch panel 900 to provide not just an FPC-A in the TFT substrate 1SA, but also provide an FPC-B in the opposite substrate 1SB in order to connect the touch panel 900 to an external circuit (not shown) that provides desired voltages to the various electrodes.

Therefore, the manufacturing process of the touch panels 900(V), 900 becomes more complicated, as will be described later with reference to FIG. 6. In particular, there is a drawback to the touch panel 900 in that the touch panel 900 requires the special polarizing plate that includes an anti-static conductive layer.

In addition, in the touch panels 900(V), 900, the common electrode 4 is used as the driving electrodes 14D; thus, when transmission signals are sequentially provided to the plurality of driving electrodes 14D (in other words, the common electrode 4 divided into a plurality of sections), differences in potential occur between adjacent common electrodes 4 and an electric field is formed in the liquid crystal layer in accordance with this difference in potential, resulting in the liquid crystal molecules becoming misaligned. In particular, when the liquid crystal layer 8 of the horizontal electric field mode touch panel 900 is of the positive-type, the problem in which display quality decreases due the liquid crystal molecules becoming misaligned as a result of being affected by a vertical electric field is more pronounced.

Figure 5:
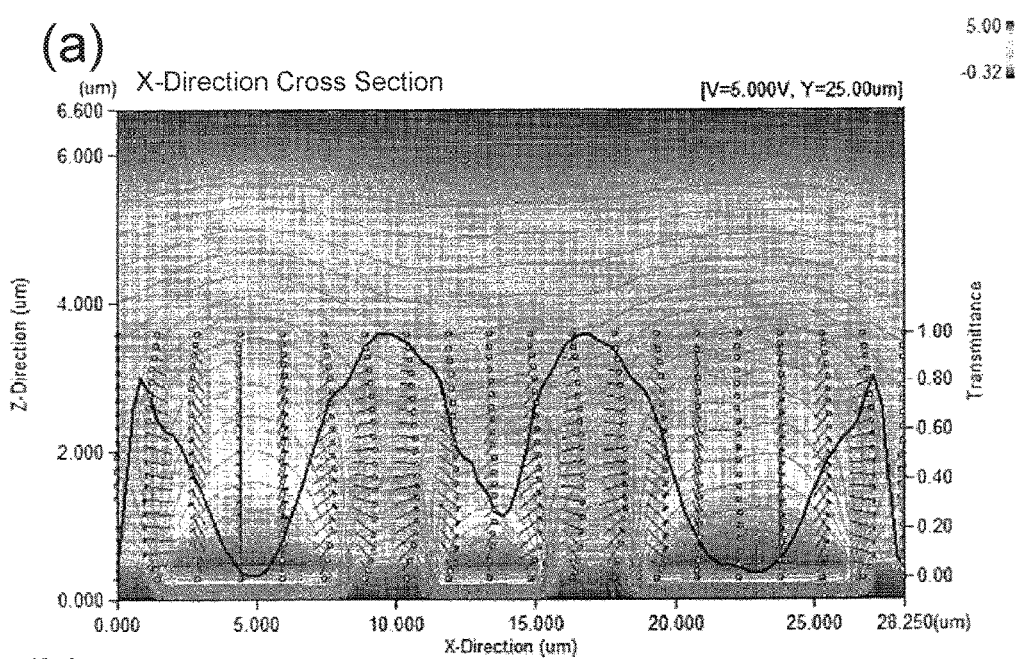
FIGS. 5(a) and 5(b) show the results of simulations for the orientation state and transmittance of liquid crystal molecules in FFS mode.
Figure 5:
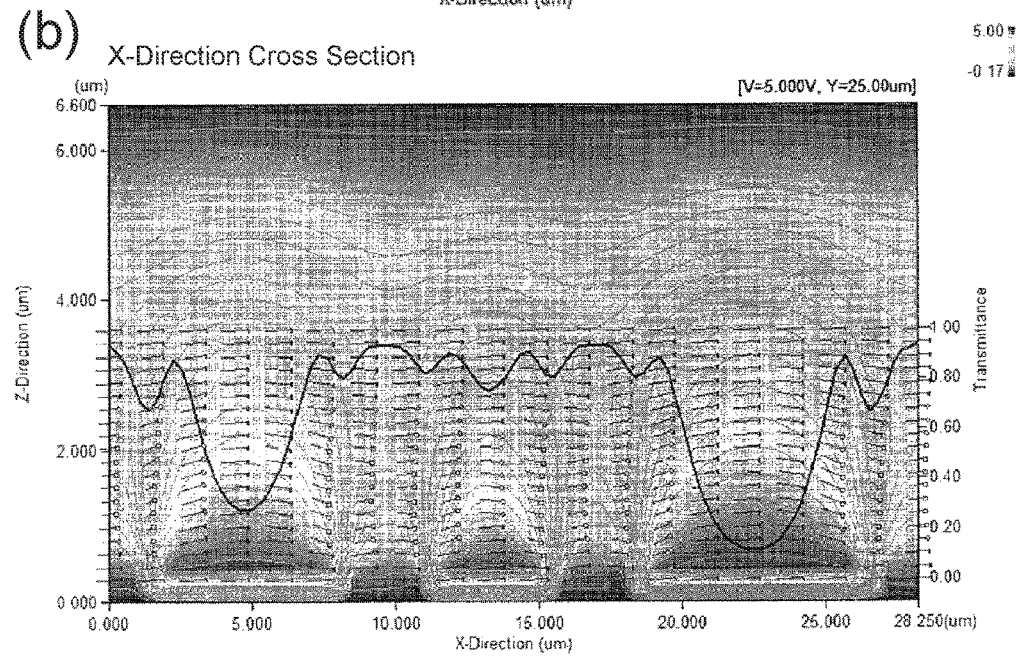

Here, the benefits obtained by using negative-type liquid crystal material in a horizontal electric field mode liquid crystal display panel will be described with reference to FIGS. 4 and 5. FIG. 4 schematically shows the configuration of the touch panel 100A1 used in the simulations. FIG. 4(a) is a plan view of a portion of the touch panel 100A1 that corresponds to one pixel, and FIG. 4(b) is a cross-sectional view of the touch panel 100A1 along the line X1-X1' in FIG. 4(a). In the touch panel 100A1, the pixel electrode 2, which has a plurality of slits, is disposed on the common electrode 4, forming an FFS mode liquid crystal display panel. The pixel electrodes 2 and the common electrode 4 are insulated from each other via the interlayer insulating layer 3.

FIG. 5(a) shows the results of a simulation in which positive-type liquid crystal material was used, and FIG. 5(b) shows the results of a simulation in which negative-type liquid crystal material was used. These two figures show the orientation state of the liquid crystal molecules (a nail model), the light transmittance (thick line), and equipotential lines (thin lines) when a voltage that is +5V with respect to the opposite electrode 4 is applied to the pixel electrode 2. An LCD Master-3D (manufactured by Shintech Inc.) was used in the simulations. The parameters used in the simulations are listed below.

Pixel size: 84.25 μm×28.25 μm

Line-and-space of the slits of the pixel electrodes: L/S=3 μm/4 μm

Thickness of the liquid crystal layer: 3.3 μm

Dielectric anisotropy (Δε) of the liquid crystal material (positive-type): 7.0

Dielectric anisotropy (Δε) of the liquid crystal material (negative-type): −3.6

Birefringence (Δn) of the liquid crystal material: 0.1

As can be seen from FIG. 5(a), when positive-type liquid crystal material is used, the liquid crystal molecules orient vertically as a result of the influence of an oblique electric field; thus, there is large change in transmittance. Since the liquid crystal molecules orient vertically, this leads to a problem of a higher degree of viewing angle dependence. As a countermeasure, it is possible to reduce the influence of the oblique electric field, reduce changes in transmittance, and eliminate viewing angle-dependence by using negative-type liquid crystal material, as is the case in the touch panel 100A1 of one embodiment of the present invention.

Therefore, as disclosed in FIG. 9 of Patent Document 1, when a common electrode is used as driving electrodes in a touch panel that includes an FFS mode liquid crystal display panel that utilizes positive-type liquid crystal material, the orientation of the liquid crystal molecules is strongly affected by a vertical electric field generated by the driving electrodes, resulting in the liquid crystal molecules becoming misaligned. As a countermeasure, when a horizontal electric field mode (an FFS mode, for example) liquid crystal display panel is used in the touch panels (all of types A to D) according to the embodiments of the present invention, negative-type nematic liquid crystal material is used, which makes it possible to prevent the occurrence of the problem in which display quality decreases due to the liquid crystal molecules becoming misaligned as a result of the voltage used for driving the touch panel.

Next, the manufacturing processes for the touch panels 900(V), 900 of the comparison examples and the touch panels (for all of types A to D) according to the embodiments will be described with reference to FIGS. 6 and 7.

Figure 6:
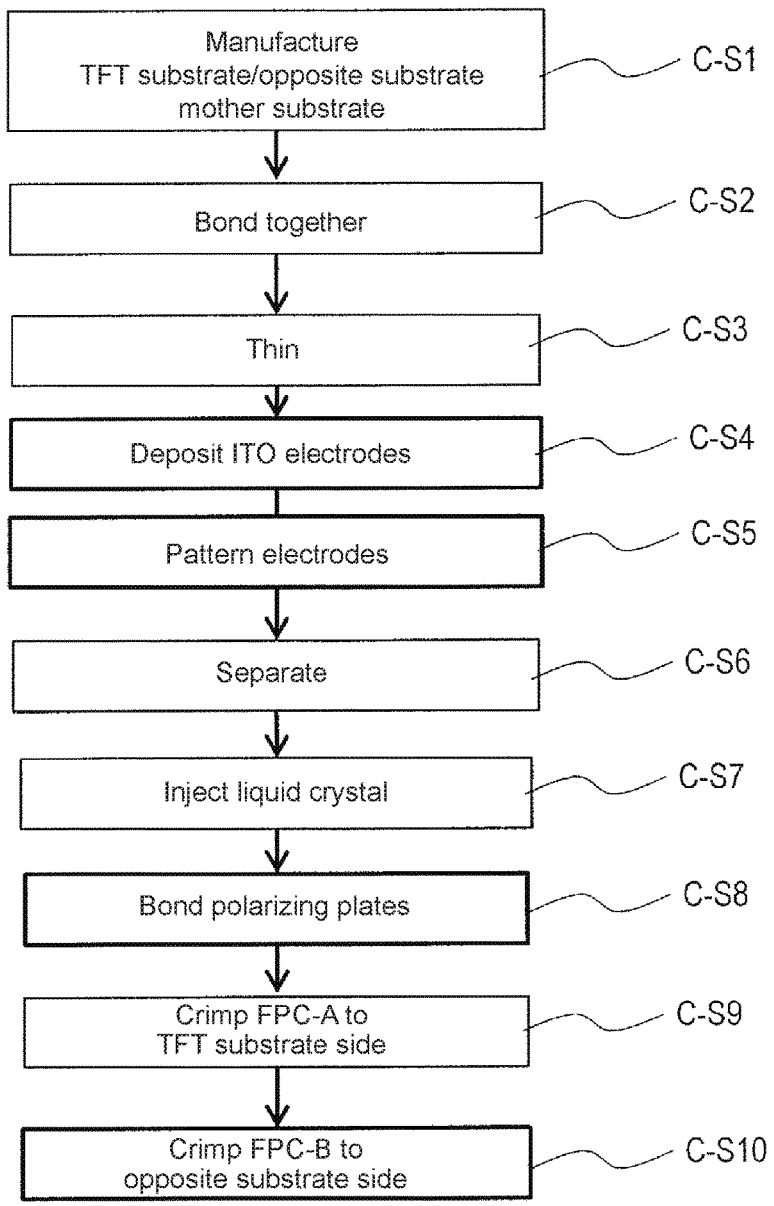
FIG. 6 is a flow chart for explaining a manufacturing method of the touch panel 900 of a comparison example.

As shown in FIG. 6, during the manufacturing process of the touch panels 900(V), 900 of the comparison examples, it is not possible to perform drip injection of liquid crystal material immediately after manufacturing the TFT substrate 1SA and the opposite substrate 1SB (Step C-S1). When drip injection (which includes injecting liquid crystal and attaching the two substrates) is performed first, there is the possibility that the substrates will detach thereafter during the step (C-S4) of depositing an ITO electrode for forming the detection electrodes 12S. Therefore, after Step C-S1, the two substrates are attached (Step C-S2), and thinning (etching of the two substrates; Step C-S3) is performed, after which the detection electrodes 12S are formed by performing the step (C-S4) of depositing the ITO electrode on the opposite substrate 1SB and patterning the electrode (Step C-S5). At such time, when the smoothness of the surface of the transparent substrate 1b is low, the processing yield of the detection electrodes 12S decreases; thus, the amount of thinning is restricted. For example, when a glass substrate with a thickness of 0.7 mm is etched until the thickness is less than or equal to 0.15 mm, the smoothness of the surface of the glass substrate decreases. In addition, since there are limits regarding the temperature at which the ITO electrode is deposited, there is a problem in that it is difficult to form a low resistance ITO film, which requires a relatively high temperature.

Thereafter, the obtained open cell is partitioned (Step C-S6), after which the liquid crystal material is injected (Step C-S7). At such time, since the vacuum injection method must be used, the throughput decreases, leading to a rise in costs.

Thereafter, a polarizing plate is attached (Step C-S8). In the touch panel 900 that includes a horizontal electric field mode liquid crystal display panel, a special polarizing plate that includes the anti-static conductive layer 95S is used as the polarizing plate.

Thereafter, the two FPCs, FPC-A and FPC-B, are bonded by pressure (Step C-S9 and Step C-S10). During the step of bonding the FPC-B to the opposite substrate 1SB by pressure (Step C-S10), the touch panel 900 is exposed to higher temperatures, which may cause the formation of air bubbles within the liquid crystal layer 8, which will lead to decreases in yield. In order to prevent this, it is necessary to make the substrate relatively thick, which limits the ability to make the touch panel 900 thinner.

In this manner, there are numerous problems with the manufacturing process of the touch panels 900(V), 900 of the comparison examples. In particular, due to the difficulties in performing drip injection, it is difficult to make the touch panel larger.

Figure 7:
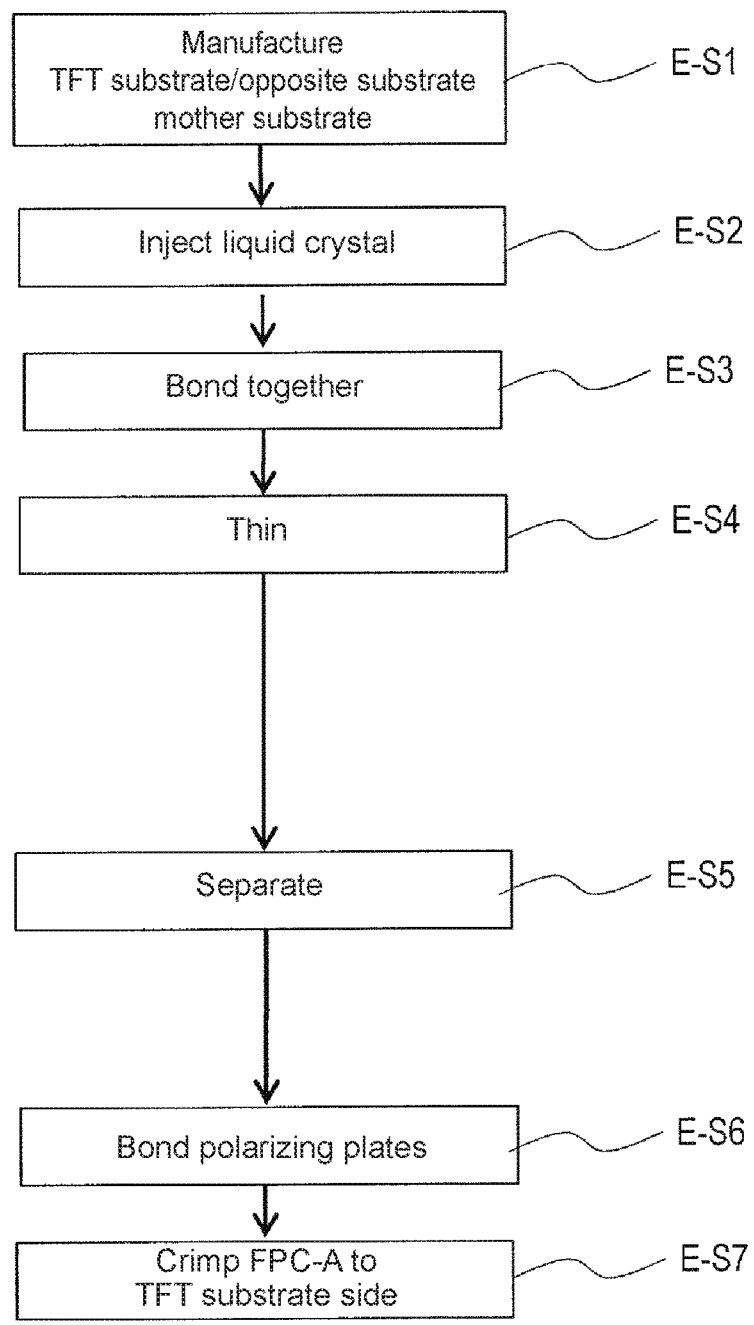
FIG. 7 is a flow chart for explaining a manufacturing method of the touch panels (for all of types A to D) of the embodiments.

As a countermeasure, as shown in FIG. 7, it is possible to perform drip injection of the liquid crystal material (Step E-S2 and Step E-S3) immediately after manufacturing the TFT substrate 1SA and the opposite substrate 1SB (Step E-S1) for the touch panels (all of types A to D) according to the embodiments. Thereafter, the step (E-S4) of thinning and the step (E-S5) of partitioning are carried out, after which the step (E-S6) of attaching the ordinary polarizing plate and the step (E-S7) of pressure bonding the FPC to the TFT substrate 1SA are carried out.

In this manner, the touch panels (all of types A to D) according to the embodiments do not have a conductive layer (a detection electrode layer or an anti-static conductive layer) on the viewer side of the viewer-side transparent substrate 1b; thus, it is possible to easily increase the size of the panel and lower costs will also be realized since the touch panel can be manufactured using a manufacturing process that is essentially the same as the manufacturing process of an ordinary large liquid crystal display panel.

Next, specific configurations and functions of the touch panels according to the embodiments of the present invention will be described in order for each type of touch panel.

The configuration of the type A1 touch panel 100A1 will be described with reference to FIGS. 8 and 9. The planar structure of the touch panel 100A1(V) is essentially the same as the planar structure of the touch panel 100A1 shown in FIG. 8(a); a description thereof will therefore be omitted.

Figure 8:
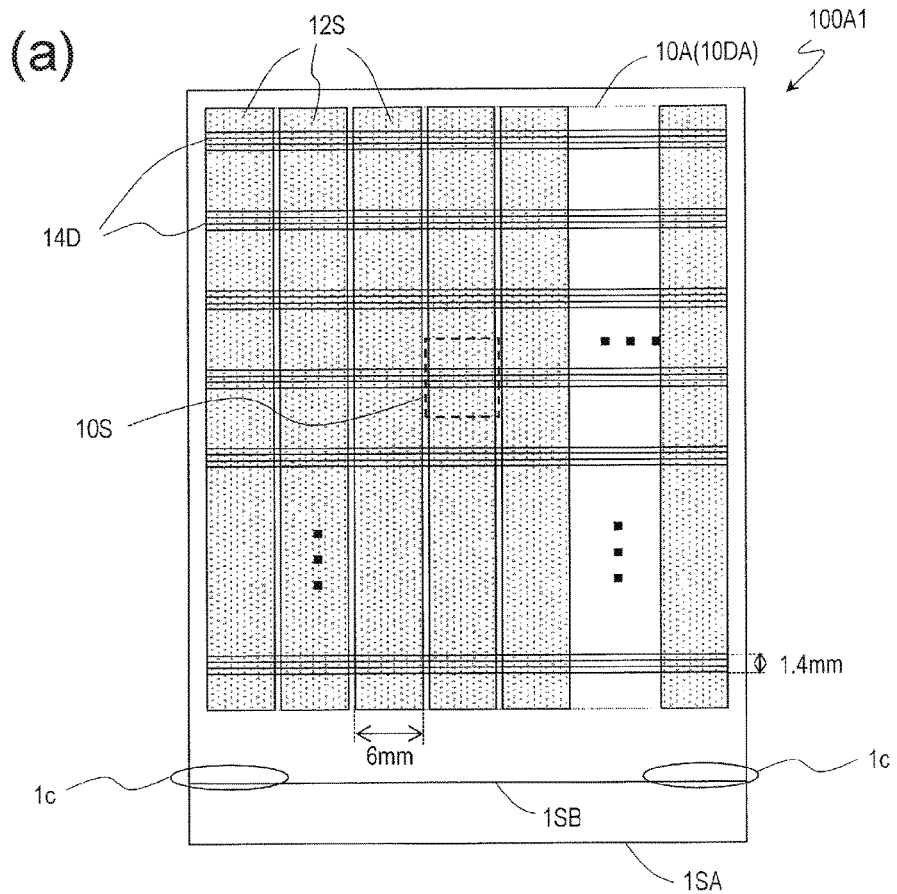
FIG. 8(a) is a schematic plan view of the touch panel 100A1.
FIG. 8(b) is a schematic plan view of a black matrix 5b.
FIG. 8(c) shows locations (lines) of cross-sections shown in cross-sectional views.
Figure 8:
Figure 8:
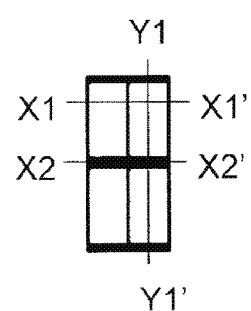

FIG. 8(a) shows a schematic plan view of the touch panel 100A1, FIG. 8(b) shows a schematic plan view of the black matrix 5*b*, and FIG. 8(*c*) shows locations (lines) of cross-sections shown in cross-sectional views. X1-X1' shows a location that does not overlap in the horizontal direction a light-shielding portion that extends in the horizontal direction. X2-X2' shows a location that overlaps the light-shielding portion that extends in the horizontal direction. Y1-Y1' shows a location that does not overlap in the vertical direction a light-shielding portion that extends in the vertical direction. The same reference characters are used to represent these cross-sectional locations below.

FIG. 9(*a*) shows a cross-sectional view of the touch panel 100A1 along the line Y1-Y1'. FIG. 9(*b*) shows a cross-sectional view of the touch panel 100A1 along the line X2-X2'. A cross-sectional view of the touch panel 100A1 along the line X1-X1' was shown in the previously-mentioned FIG. 2. In FIGS. 9(*a*) and 9(*b*), the pixel electrodes 2 and the interlayer insulating layer 3 from FIG. 2 are omitted.

As mentioned above, the touch panel 100A1 includes an FFS mode liquid crystal display panel, for example. The liquid crystal display panel includes a display area 10DA that has pixels arranged in a matrix that has rows and columns. A sensor array region 10A of the touch panel is disposed so as to correspond to the display area 10DA.

In the sensor array region 10A, the plurality of driving electrodes 14D, which extend in the row direction (horizontal direction), and the plurality of detection electrodes 12S, which extend in the column direction (vertical direction), are formed. Sensor unit cells (hereafter referred to as a "sensor units") 10S are formed with the intersection points of the plurality of detection electrodes 12S and driving electrodes 14D being at the center of the sensor units 10S. The plurality of sensor units 10S are arranged in a matrix, and the plurality of sensor units 10S arranged in a matrix define the sensor array region 10A. In the example used here, the width of the detection electrode 12S is 6 mm, and the width of the driving electrode 14D is 1.4 mm. The respective detection electrodes 12S are formed of a transparent electrode (typically an ITO electrode), and the respective driving electrodes 14D are formed of a plurality of metal electrodes (narrow lines with a thickness of 3 μm to 50 μm (5 μm, for example)). It is possible to widely use a well-known pattern as the pattern of the detection electrodes 12S and the driving electrodes 14D.

It is possible to detect a touch location from the capacitance of the sensor units arranged in a matrix. It is preferable to use a mutual capacitance system as the detection method in order to accommodate multi-touch, but a self-capacitance system may also be used. It is possible to use the configuration and method disclosed in U.S. Pat. No. 6,452,514 (corresponding Japanese patent application: Japanese Translation of PCT International Application Publication No. 2003-526831), for example, as the circuit configuration and driving method of a mutual capacitance touch panel. The entire disclosed contents of U.S. Pat. No. 6,452,514 are incorporated into the specification of this application by reference.

The electrodes formed in the opposite substrate 1SB are connected to wiring lines of the TFT substrate 1SA, or the like, in a seal contact area 1*c*. Therefore, in the touch panel 100A1, an FPC, FPC-A (not shown; see FIG. 3), may be provided on only the TFT substrate 1SA.

The opposite substrate 1SB includes the color filter layer 5 formed on the liquid crystal layer 8 side of the second transparent substrate 1*b*, and the color filter layer 5 includes a plurality of color filters (which sometimes have a "5*a*" attached in the drawings), and the black matrix 5*b*. The driving electrodes 14D that include a plurality of metal electrodes are arranged so as to overlap the light-shielding portion of the black matrix 5*b* when viewed from a direction normal to the opposite substrate 1SB. As shown in FIG. 8(*b*), the light-shielding portion of the black matrix 5*b* has wide sections that extend in the row direction, and the driving electrodes 14D are arranged so as to overlap the wide sections of the light-shielding portion of the black matrix 5*b* when viewed from the direction normal to the opposite substrate 1SB. As shown in this example, it is preferable that the entire driving electrode 14D extending in the row direction overlap the wide section of the light-shielding portion of the black matrix 5*b*. By arranging the driving electrodes 14D in such a manner, it is possible to reduce the loss of display light that passes through a pixel section 2*p*.

As mentioned above with reference to FIGS. 1, 8, and 9, the touch panel 100A1 is able to resolve the above-mentioned Problems 1 to 3, and is able to increase light usage efficiency.

Next, the configuration of type A2 touch panels 100A2, 100A2(V) will be described with reference to FIGS. 10A and 10B.

Figure 10A:
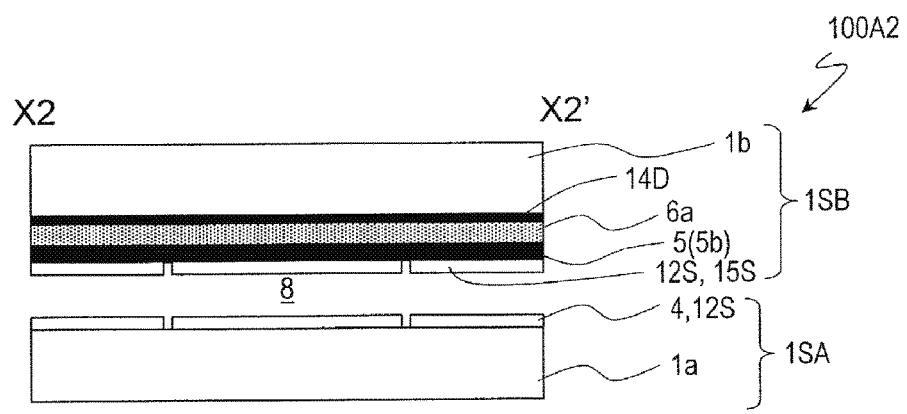
FIG. 10A is a schematic cross-sectional view of a type A2 touch panel 100A2 that uses a horizontal electric field mode liquid crystal display panel.

FIG. 10A shows a schematic cross-sectional view of the type A2 touch panel 100A2. The type A2 touch panel 100A2 includes a horizontal electric field mode liquid crystal display panel. The touch panel 100A2 differs from the touch panel 100A1 in that the common electrode 4 also functions as detection electrodes 12S.

The common electrode 4 of the touch panel 100A2 is divided into a plurality of sections that extend in parallel to detection electrodes 12S that also function as the shield electrode layer 15S provided in the opposite substrate 1SB, and is configured so as to also function as detection electrodes 12S. In other words, the common electrode 4 has a plurality of common electrode sections that are parallel to a plurality of detection electrodes 12S, and the plurality of common electrode sections are respectively electrically connected to one of the plurality of detection electrodes 12S that face the common electrode sections through the liquid crystal layer 8. The touch panel 100A2 has a lower parasitic capacitance (electrostatic capacitance) associated with the detection electrodes 12S than does the touch panel 100A1; thus, it is possible for the touch panel 100A2 to have a higher sensing sensitivity than the touch panel 100A1.

Figure 10B:
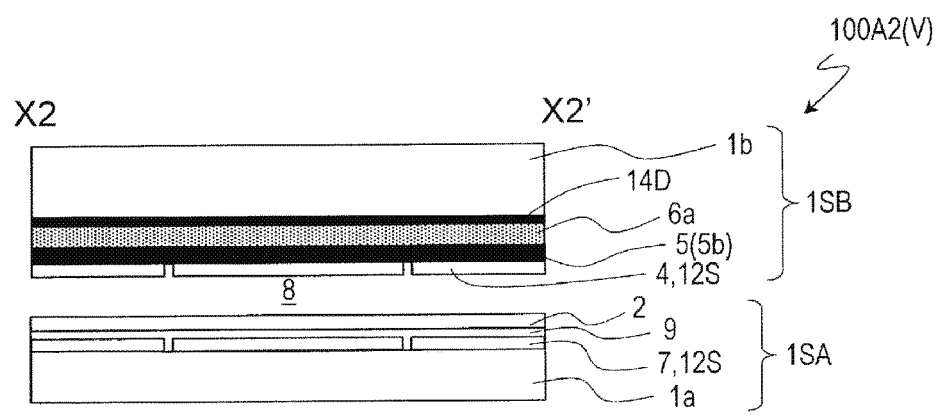
FIG. 10B is a schematic cross-sectional view of a type A2 touch panel 100A2(V) that uses a vertical electric field mode liquid crystal display panel.

FIG. 10B shows a schematic cross-sectional view of the type A2 touch panel 100A2(V). The type A2(V) touch panel 100A2 includes a vertical electric field mode liquid crystal display panel. The touch panel 100A2(V) differs from the touch panel 100A1 in that an auxiliary capacitance opposite electrode 7 included in the TFT substrate 1SA also functions as detection electrodes 12S. The auxiliary capacitance opposite electrode 7 is insulated from the pixel electrodes 2 via an insulating layer (a gate insulation layer, for example) 9.

The auxiliary capacitance opposite electrode 7 of the touch panel 100A2(V) is divided into a plurality of sections that extend in parallel to the detection electrodes 12S that also function as the common electrode 4 provided in the opposite substrate 1SB, and is configured so as to also function as detection electrodes 12S. In other words, the auxiliary capacitance opposite electrode 7 has a plurality of auxiliary capacitance opposite electrode sections that are parallel to a plurality of detection electrodes 12S, and the plurality of auxiliary capacitance opposite electrode sections are respectively electrically connected to one of the plurality of detection electrodes 12S that face the auxiliary capacitance opposite electrode sections through the liquid crystal layer 8. The touch panel 100A2(V) has a lower parasitic capacitance (electrostatic capacitance) associated with the detection electrodes 12S than does the touch panel 100A1 (V); thus, it is possible for the touch panel 100A2(V) to have a higher sensing sensitivity than the touch panel 100A1(V).

Figure 11:
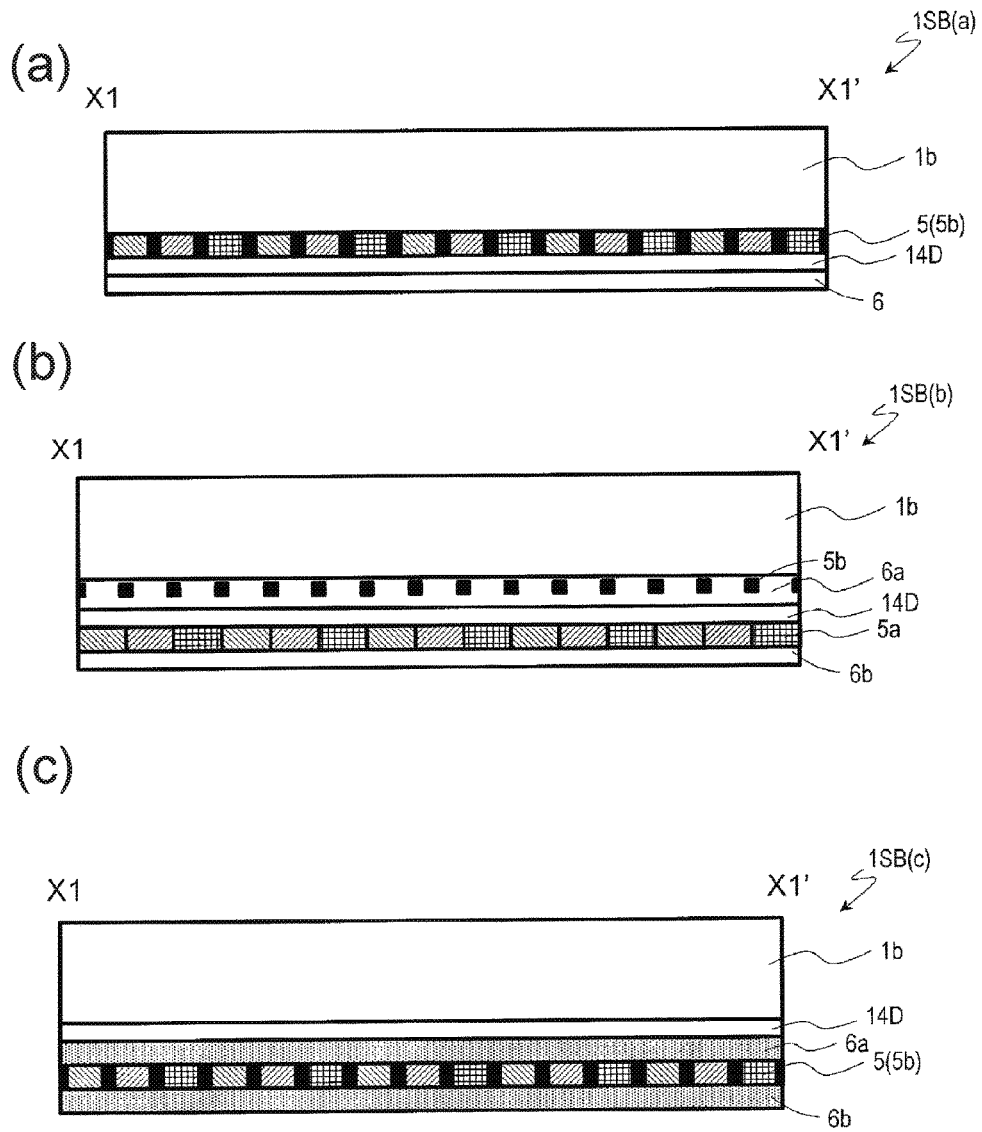
FIGS. 11(a) to 11(c) shows variations of an opposite substrate of a type A touch panel.

In the opposite substrate 1SB of the above-mentioned touch panels 100A1(V), 100A1, 100A2, 100A2(V), the driving electrodes 14D were disposed on the second transparent substrate 1b in the location furthest from the liquid crystal layer 8. The location of the driving electrodes 14D is not limited to this, however, and can be modified as shown in FIGS. 11(a) to 11(c). The detection electrodes 12S are not shown in FIG. 11, but are disposed in the opposite substrate 1SB so as to be next to the liquid crystal layer 8 in a manner similar to that in the opposite substrate 1SB of the touch panels 100A1(V), 100A1, and 100A2. In the examples shown in FIGS. 11(a) to 11(c), the detection electrodes 12S are formed on the liquid crystal layer 8 side of interlayer insulating films 6, 6b. Forming an insulating layer and an alignment film (not shown) as necessary on the liquid crystal layer 8 side of the detection electrodes 12S should be obvious to a person skilled in the art.

As in an opposite substrate 1SB(a) shown in FIG. 11(a), the driving electrodes 14D may be formed on the liquid crystal layer 8 side of the color filter layer 5. When such a configuration is used, it is possible to use the light-shielding portion of the black matrix 5b to hide the driving electrodes 14D when viewed from the direction normal to the opposite substrate 1SB(a). Thus, it is possible to prevent the occurrence of moiré. In addition, since ambient light is not reflected by the driving electrodes 14D, it is possible to realize the benefit of a higher contrast ratio in a bright environment.

As in an opposite substrate 1SB(b) shown in FIG. 11(b), when the black matrix 5b is formed in a separate layer from the color filter 5a, the driving electrodes 14D may be formed between the black matrix 5b and the color filter 5a. The interlayer insulating film 6a is formed between the black matrix 5b and the driving electrodes 14D, but may be omitted. The opposite substrate 1SB(b) has a smaller parasitic capacitance between the driving electrodes 14D and the detection electrodes 12S compared to the opposite substrate 1SB(a); thus, there is an improvement in the performance of the touch panel.

As in an opposite substrate 1SB(c) shown in FIG. 11(c), the driving electrodes 14D may be formed on the second transparent substrate 1b. Furthermore, by providing the interlayer insulating layers 6a, 6b above and below the color filter layer (including the black matrix 5b) 5, it is possible to decrease the parasitic capacitance between the driving electrodes 14D and the detection electrodes 12S; thus there will be an improvement in the performance of the touch panel. In addition, the distance between the pixel electrodes and the color filter layer is small, and it is possible to prevent color mixing.

A manufacturing method of the opposite substrate 1SB(c) will be described as one example of a manufacturing method of the opposite substrate 1SB with reference to FIGS. 12(a) to 12(e). The opposite substrate 1SB(c) used as an example here can be used in a touch panel 100A-e (see FIGS. 20 to 23), which will be explained later, for example.

Figure 12:
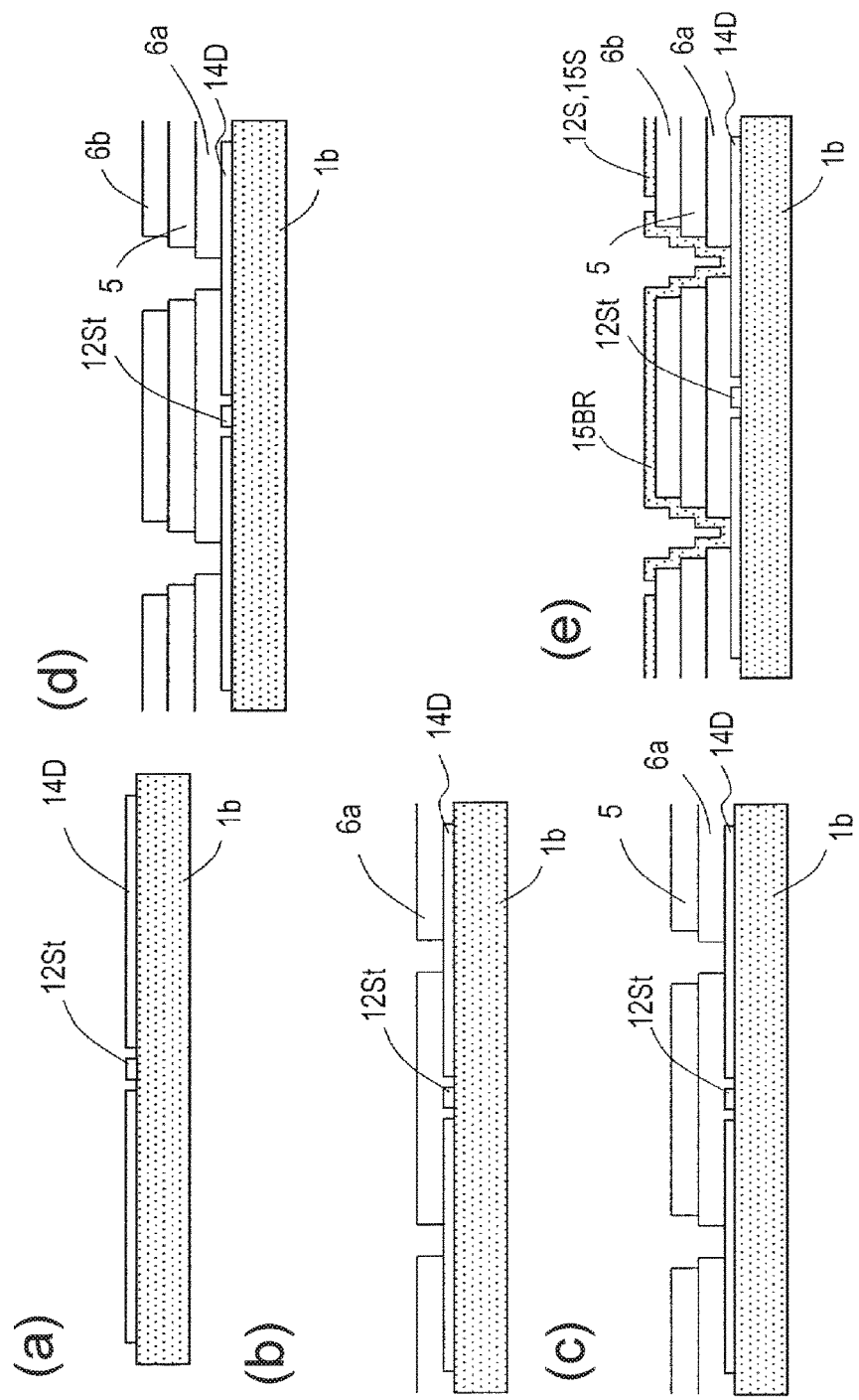
FIGS. 12(a) to 12(e) are used for describing one example of a manufacturing method of an opposite substrate 1SB.

As shown in FIG. 12(a), the glass substrate 1b is prepared, and the driving electrodes 14D and auxiliary wiring lines 12St for the detection electrodes 12S are formed thereon using a metal layer or a transparent conductive layer, for example.

Next, as shown in FIGS. 12(b) and 12(c), the interlayer insulating layer 6a is formed, and the color filter layer 5 is then formed thereon.

Next, as shown in FIG. 12(d), the interlayer insulating layer 6b is formed on the color filter layer 5. Contact holes are formed in the interlayer insulating layer 6a, the color filter layer 5, and the interlayer insulating layer 6b.

Next, as shown in FIG. 12(e), the shield electrode layer 15S (which also functions as the detection electrodes 12S) is formed by depositing a transparent electrode layer. A bridge section 15BR of the shield electrode layer 15S is electrically connected to the driving electrodes 14D inside the contact holes, and connects the driving electrodes 14D in the row direction.

Next, variations of a type A touch panel will be described with reference to FIGS. 13 to 30. Hereafter, variations of the driving electrodes 14D and the detection electrodes 12S for the touch panel will be mainly described; thus, descriptions of other configurations may be omitted.

Figure 13:
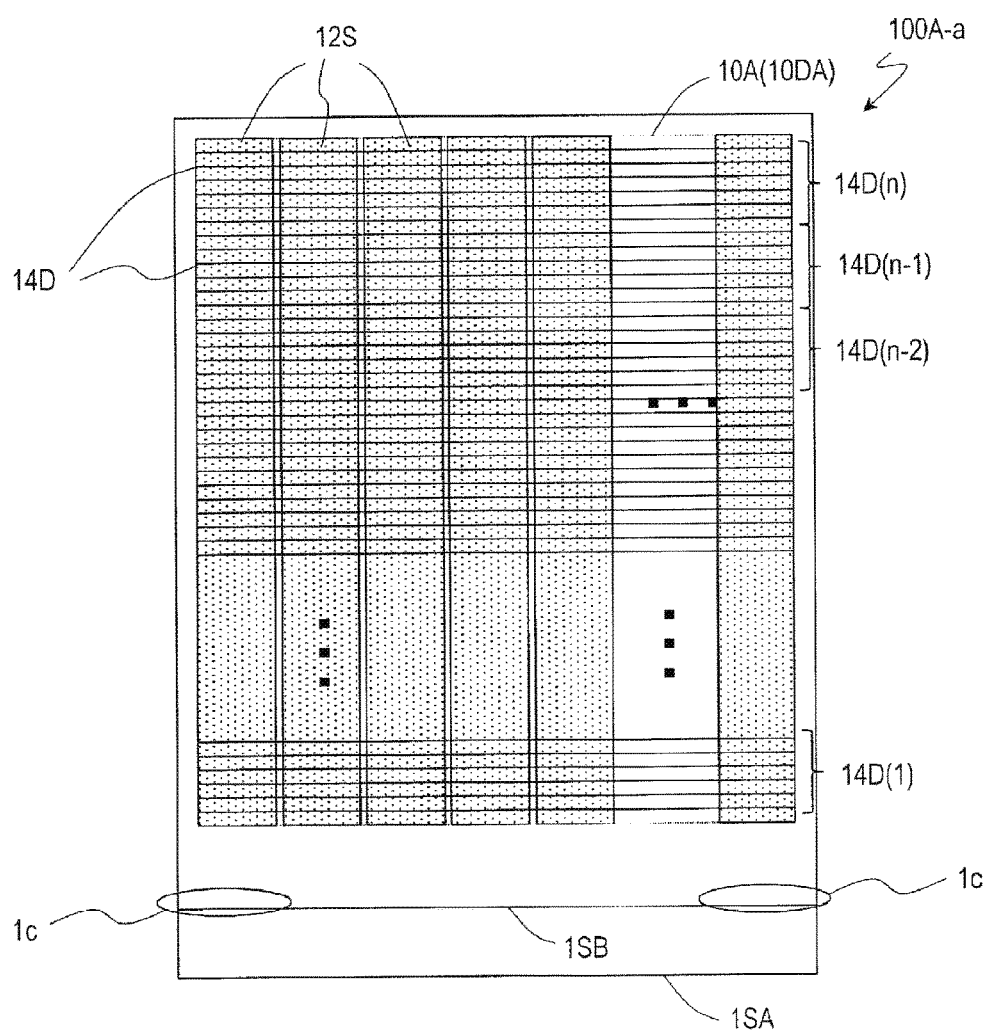
FIG. 13 is a schematic plan view of a touch panel 100A-a.
Figure 14:
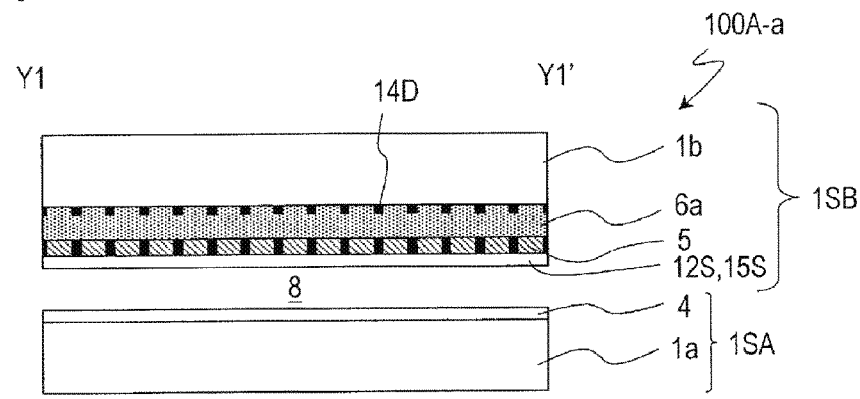
FIGS. 14(a) to 14(c) are schematic cross-sectional views (Y1-Y1') of the touch panel 100A-a.
Figure 14:
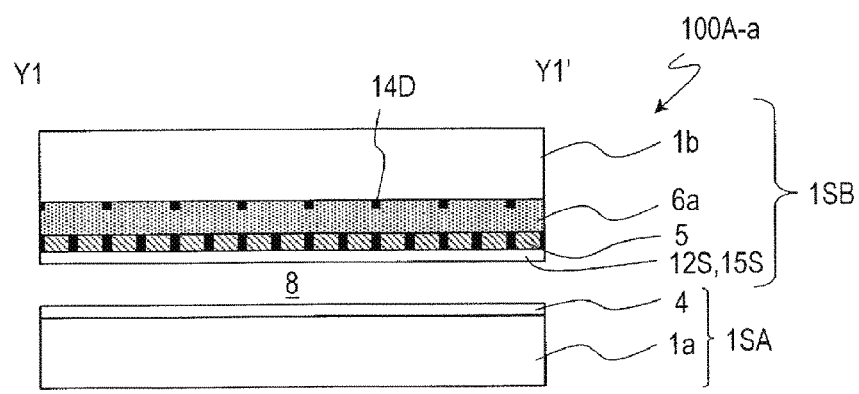
Figure 14:
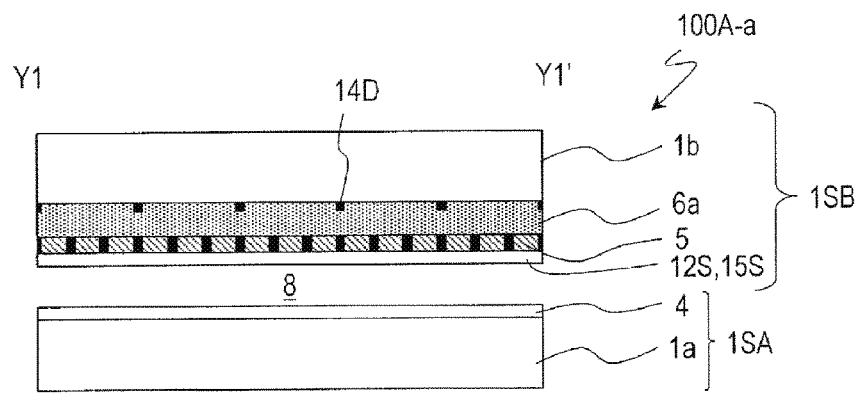

FIG. 13 shows a schematic plan view of a touch panel 100A-a, and FIG. 14 shows schematic cross-sectional views (Y1-Y1') of the touch panel 100A-a.

The configuration of the driving electrodes 14D in the touch panel 100A-a differs from the driving electrodes 14D in the touch panel 100A1 shown in FIG. 8. In the driving electrodes 14D of the touch panel 100A-a, metal electrodes (thin lines) are provided so as to be dispersed in the sensor array region 10A in a substantially even manner. The individual driving electrodes 14D (14D(n), 14D(n−1) . . . 14D(1), respectively) are formed of a plurality of metal electrodes.

As shown in FIGS. 14(a) to 14(c), the number of metal electrodes (thin lines) forming the individual driving electrodes 14D can be appropriately modified.

In this manner, by arranging the driving electrodes 14D on the entire surface of the sensor array region 10A, it is possible to make the pattern of the driving electrodes 14D less visible. In addition, since signals can be made uniform, it is possible to improve the detection accuracy of touch locations.

Figure 15:
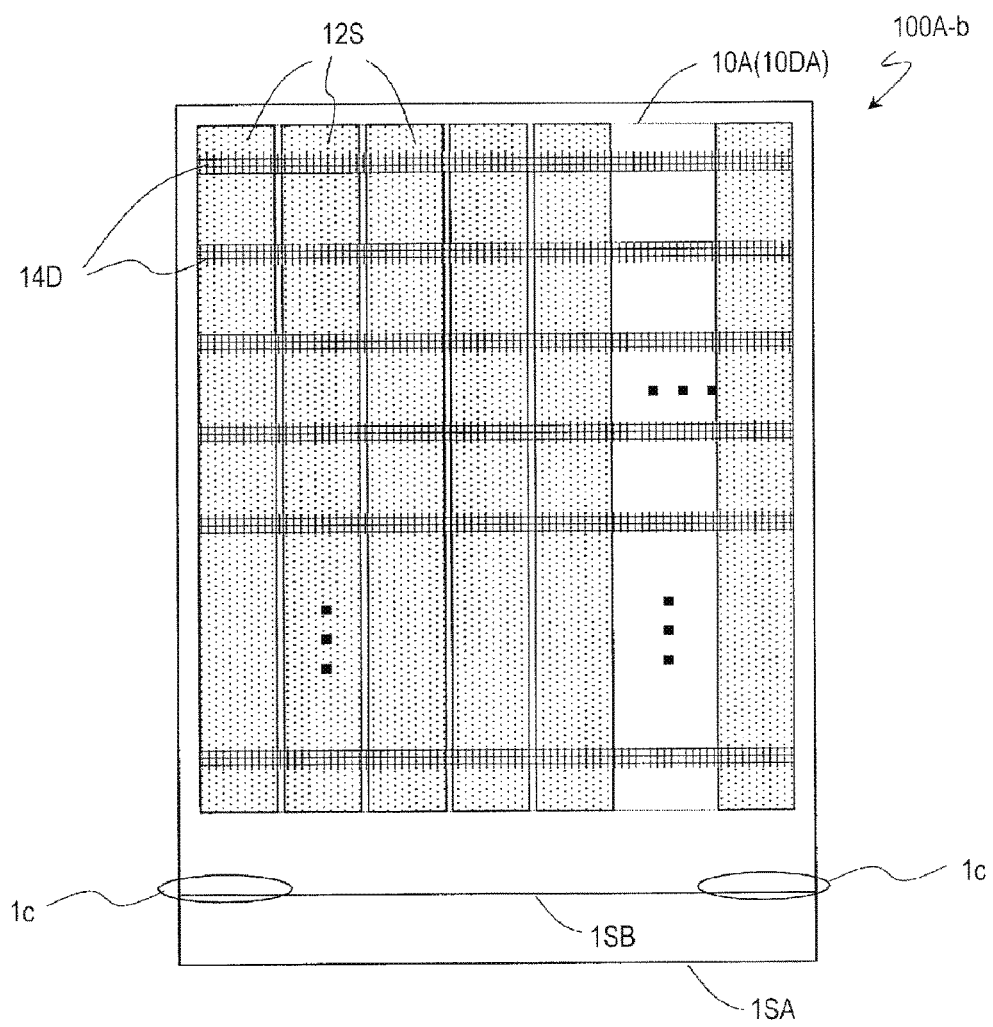
FIG. 15 is a schematic plan view of a touch panel 100A-b.
Figure 16:
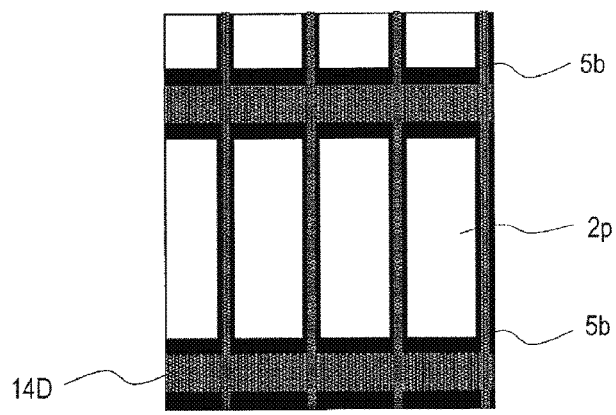
FIG. 16(a) is a schematic plan view of the pattern of the black matrix 5b in the touch panel 100A-b.
FIG. 16(b) is a schematic cross-sectional view (X1-X1') of the touch panel 100A-b.
FIG. 16(c) is a schematic cross-sectional view (Y1-Y1') of the touch panel 100A-b.
Figure 16:
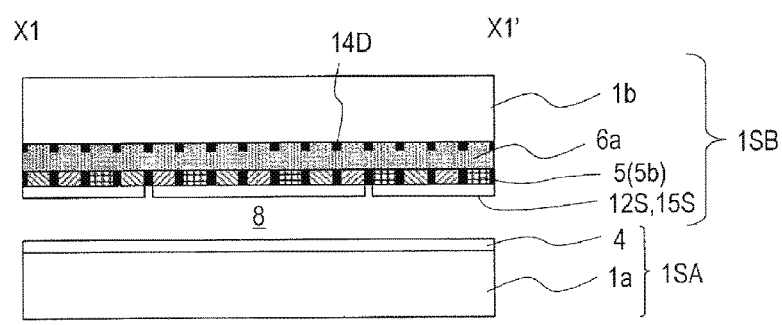
Figure 16:
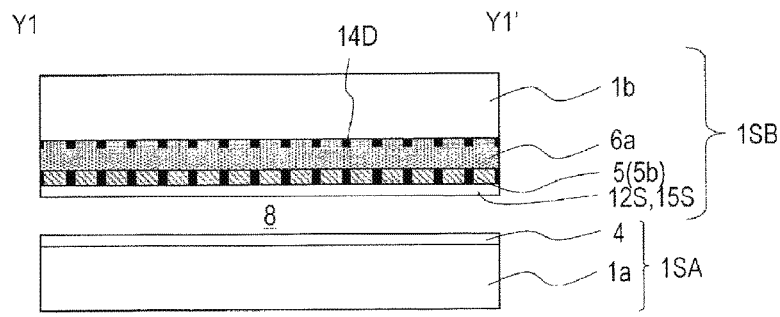
Figure 17:
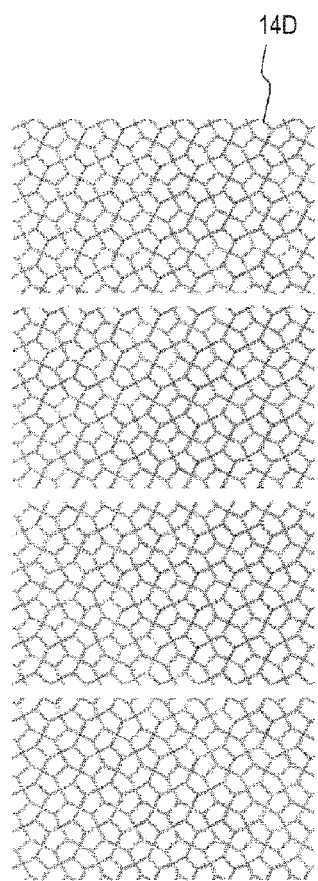
FIG. 17(a) is a schematic plan view of driving electrodes 14D of a touch panel 100A-c.
FIG. 17(b) is a schematic plan view of the pattern of the black matrix 5b.
FIG. 17(c) is a schematic cross-sectional view (Y1-Y1') of the touch panel 100A-c.
Figure 17:
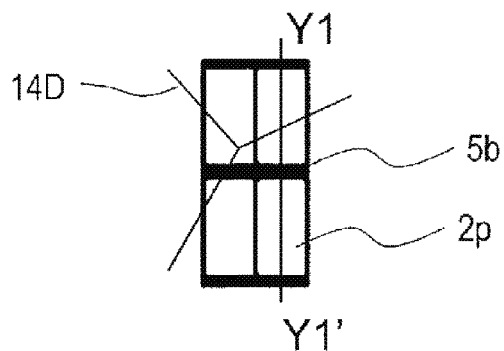
Figure 17:
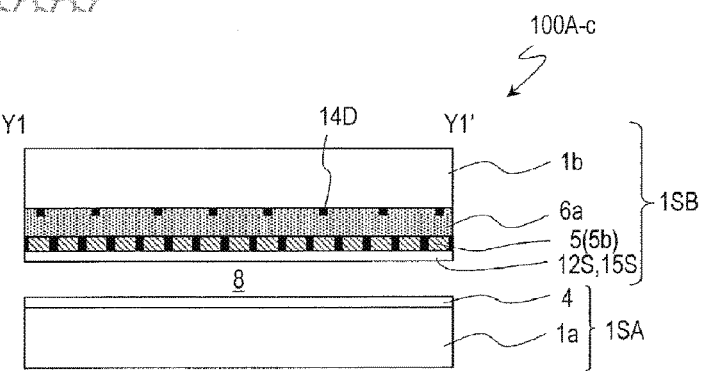

FIG. 15 shows a schematic plan view of a touch panel 100A-b. FIG. 16(a) shows a schematic plan view of the pattern of the black matrix 5b, FIG. 16(b) shows a schematic cross-sectional view (X1-X1') of the touch panel 100A-b, and FIG. 16(c) shows a schematic cross-sectional view (Y1-Y1') of the touch panel 100A-b.

As shown in FIG. 15, the driving electrodes 14D of the touch panel 100A-b differ from the driving electrodes 14D of the touch panel 100A1 shown in FIG. 8 in that the individual driving electrodes 14D are formed of metal electrodes arranged in a mesh pattern (a grid pattern). As shown in FIGS. 16(a) and 16(c), in the touch panel 100A-b as well, the driving electrodes 14D extending in the row direction are arranged so as to overlap the wide sections of the light-shielding portion of the black matrix 5b extending in the row direction in a manner similar to that in the touch panel 100A1 shown in FIG. 8; it is thus possible to reduce the loss of display light that passes through the pixel section 2p. Furthermore, as shown in FIGS. 16(a) and 16(b), in the touch panel 100A-b, the driving electrodes 14D extending in the column direction are also arranged so as to overlap the light-shielding portion of the black matrix 5b.

Therefore, similar to the touch panel 100A1, it is possible in the touch panel 100A-b to reduce the loss of display light that passes through the pixel section 2p. Furthermore, it is possible in the touch panel 100A-b to make the area of the driving electrodes 14D larger than in the touch panel 100A1; thus, it is possible to improve the detection accuracy of touch locations.

Next, FIG. 17(a) shows a schematic plan view of the driving electrodes 14D of a touch panel 100A-c, FIG. 17(b) shows a schematic plan view of the pattern of the black matrix 5b, and FIG. 17(c) shows a schematic cross-sectional view (Y1-Y1') of the touch panel 100A-c.

As shown in FIG. 17(a), the driving electrodes 14D of the touch panel 100A-c have a pattern that spreads out in a mesh shape. The pattern of the driving electrodes 14D has a mesh shape in which hexagons have been joined together, for example, and does not include long straight-line regions. In addition, the mesh-shaped pattern of the driving electrodes 14D is not parallel to the light-shielding portion of the black matrix 5b, and will necessarily intersect the light-shielding portion at an angle. As schematically shown in FIGS. 17(b) and 17(c), the individual mesh of the driving electrodes 14D are the same size as or larger than the individual pixel sections 2p. When driving electrodes 14D with such a mesh pattern are used, it is possible to realize the benefits of making the pattern of the driving electrodes 14D less visible and making moiré less likely to occur. Furthermore, there is the benefit that when the opposite substrate 1SB is arranged with respect to the TFT substrate 1SA, it is not necessary to properly align the opposite substrate 1SB with respect to the pixels.

Figure 18:
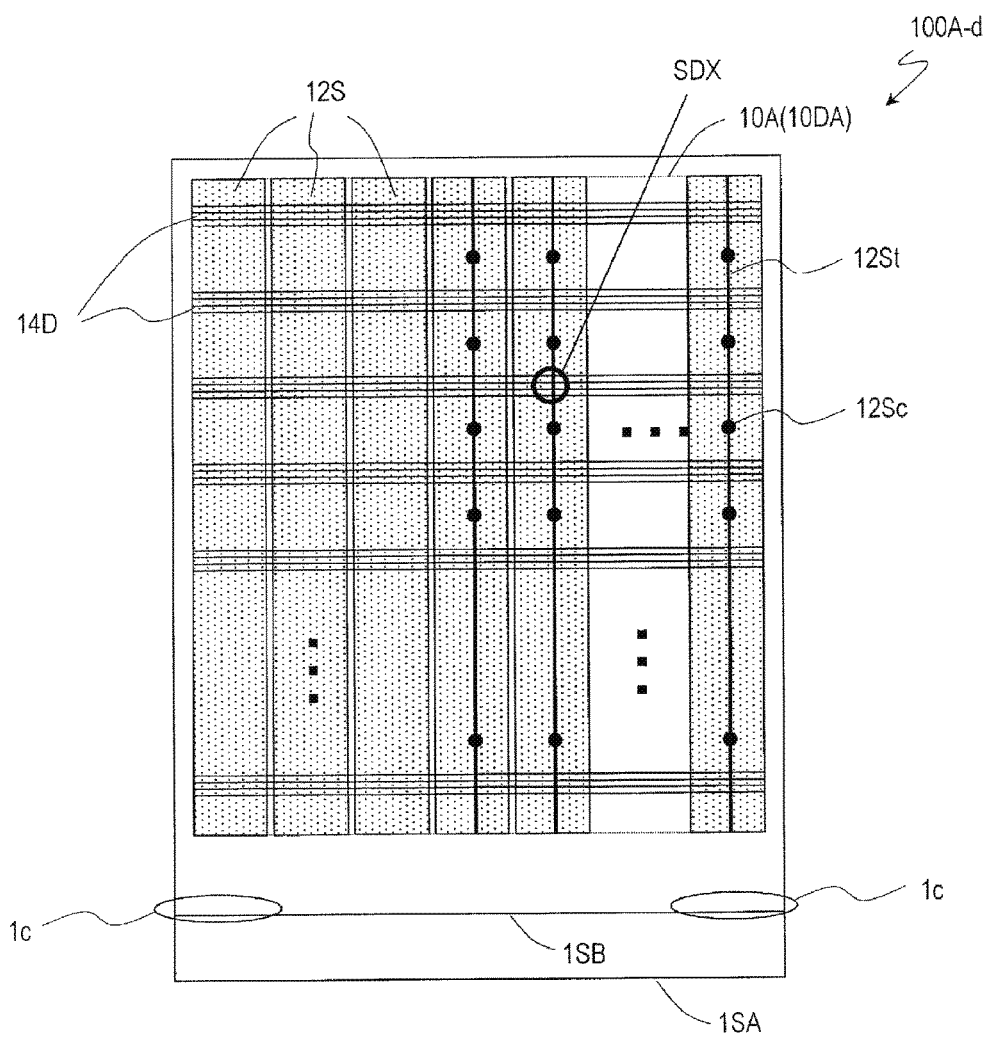
FIG. 18 is a schematic plan view of a touch panel 100A-d.
Figure 19:
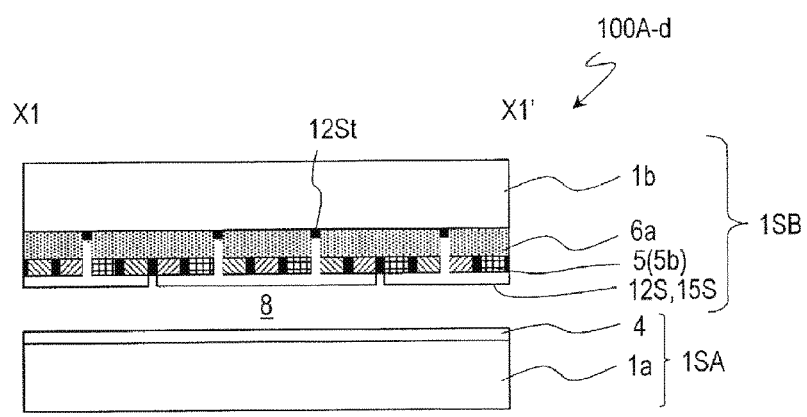
FIG. 19(a) is a schematic cross-sectional view (X1-X1') of the touch panel 100A-d.
FIG. 19(b) is a schematic cross-sectional view (Y1-Y1') of the touch panel 100A-d.
Figure 19:
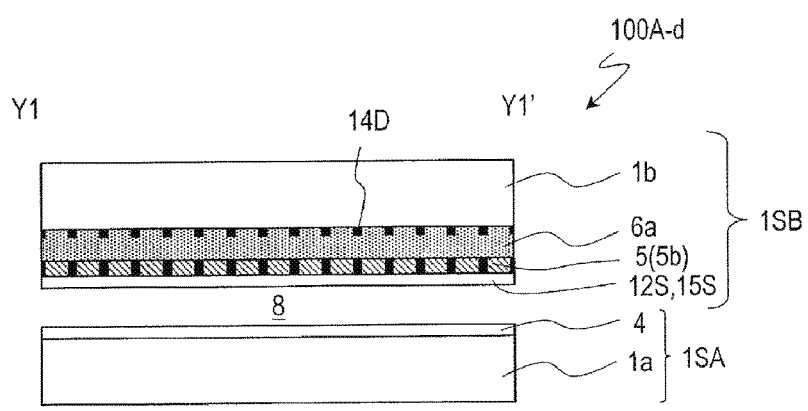

FIG. 18 shows a schematic plan view of a touch panel 100A-d. FIG. 19(a) shows a schematic cross-sectional view (X1-X1') of the touch panel 100A-d, and FIG. 19(b) shows a schematic cross-sectional view (Y1-Y1') of the touch panel 100A-d.

Figure 22:
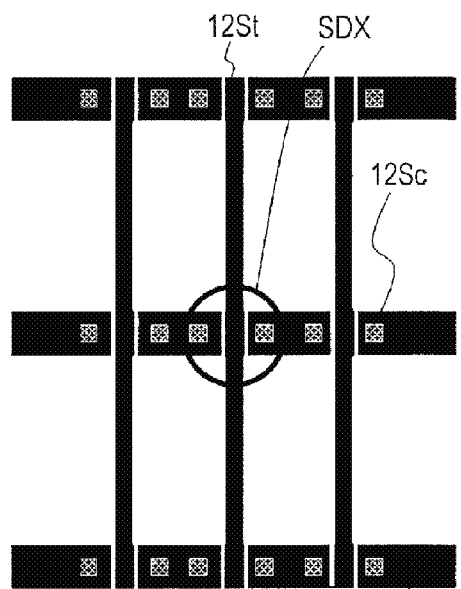
FIGS. 22(a) to 22(c) show the configuration of an intersection SDX of an auxiliary wiring line 12St and the driving electrode 14D.
Figure 22:
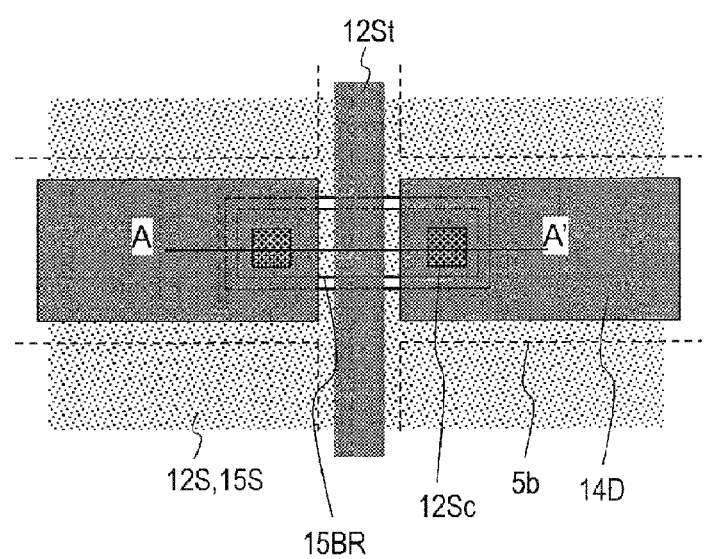
Figure 22:
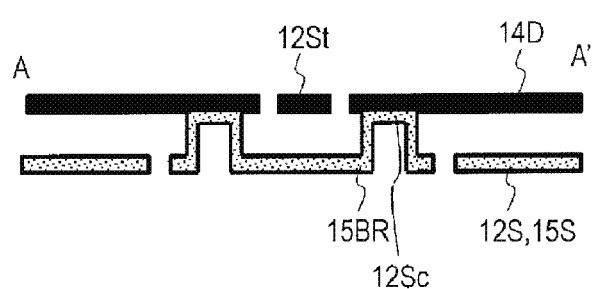

As shown in FIG. 18, the touch panel 100A-d includes, in addition to the touch panel 100A1 shown in FIG. 8, auxiliary wiring lines 12St for the detection electrodes 12S. The auxiliary wiring lines 12St are used to lower the resistance of the detection electrodes 12S. As shown in FIGS. 19(a) and 19(b), the auxiliary wiring lines 12St are formed by patterning the same conductive layer as that of the driving electrodes 14D. As shown in FIG. 22, the structure of an intersection SDX can be formed by utilizing the bridge structure 15BR that uses the shield electrode layer 15S and that includes two contact sections 12Sc. The bridge structure 15BR is formed to the inside of the light-shielding portion of the black matrix 5b by patterning the shield electrode 15S; thus, it is possible to realize a higher performance (high SNR and high report rate) in the touch panel since it is possible to lower the resistance of the detection electrodes 12S without lowering the aperture ratio or causing a decrease in display quality as a result of voltage changes in the driving electrodes 14D.

Figure 20:
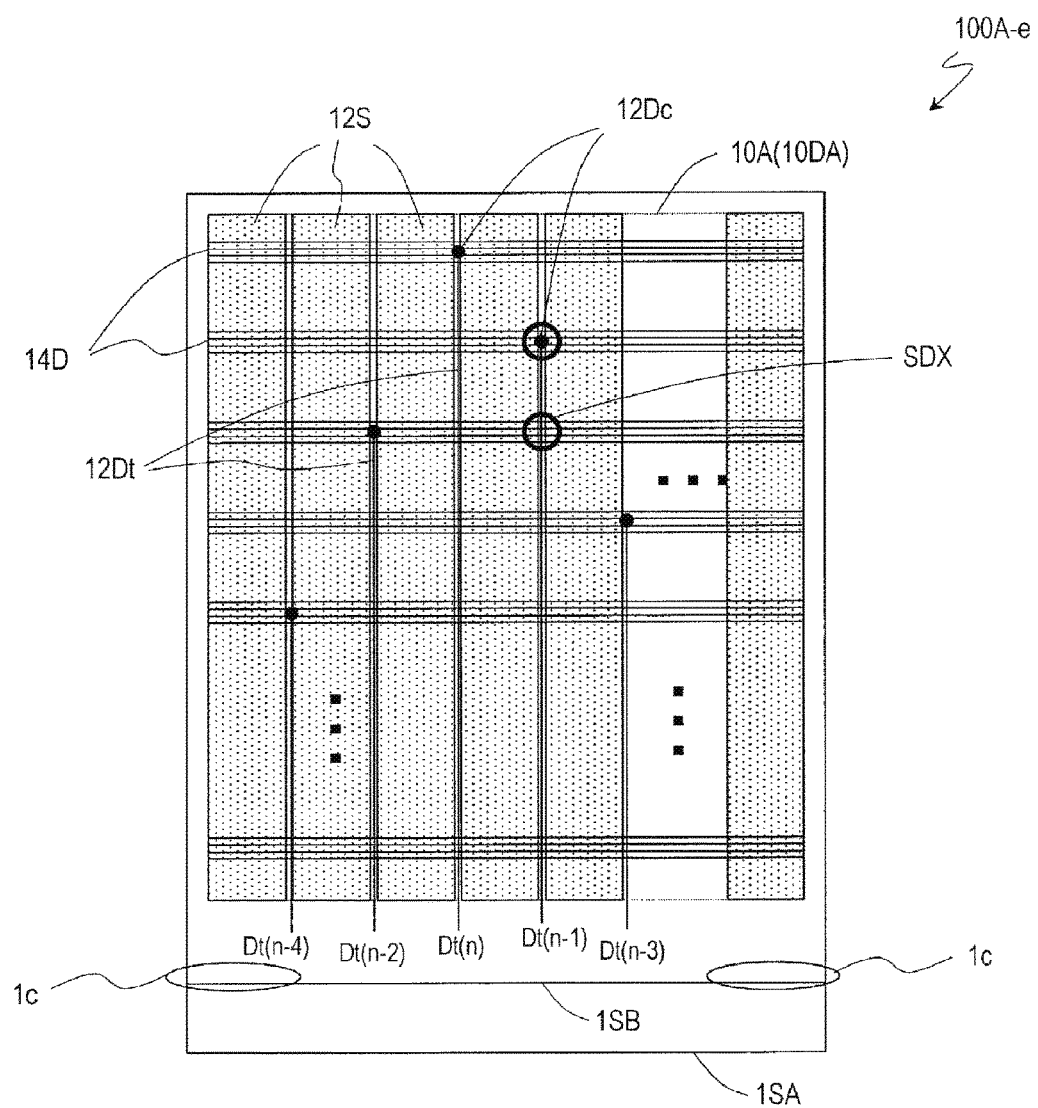
FIG. 20 is a schematic plan view of a touch panel 100A-e.
Figure 21:
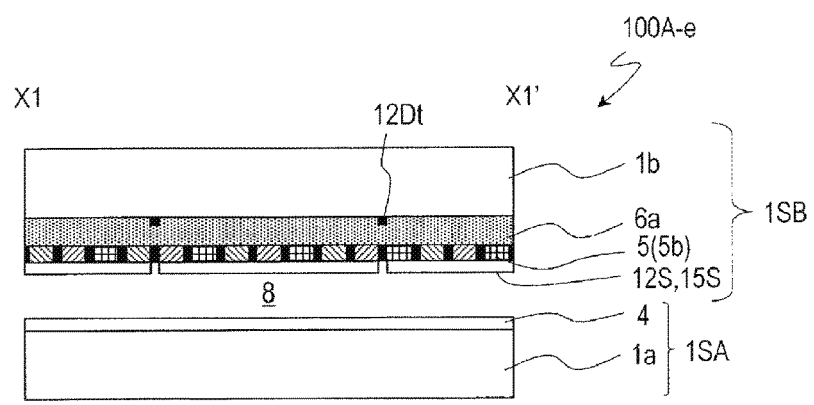
FIG. 21(a) is a schematic cross-sectional view (X1-X1') of the touch panel 100A-e.
FIG. 21(b) is a schematic cross-sectional view (Y1-Y1') of the touch panel 100A-e.
Figure 21:
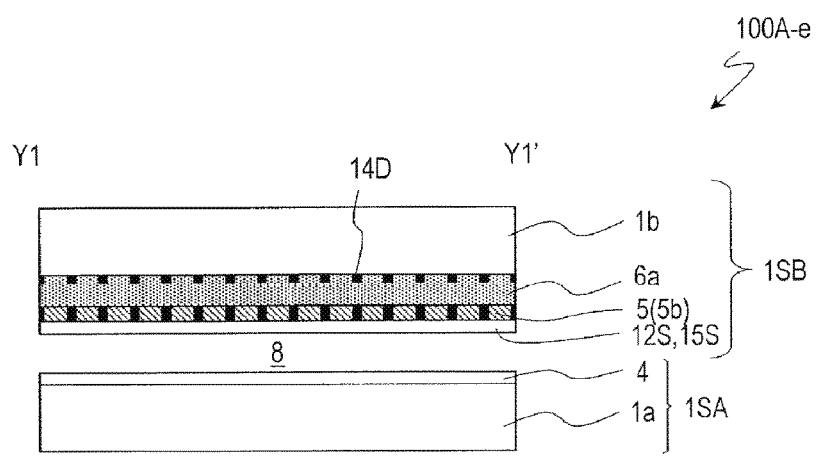

FIG. 20 shows a schematic plan view of a touch panel 100A-e. FIG. 21(a) shows a schematic cross-sectional view (X1-X1') of the touch panel 100A-e, and FIG. 21(b) shows a schematic cross-sectional view (Y1-Y1') of the touch panel 100A-e.

As shown in FIG. 20, the touch panel 100A-e includes, in addition to the touch panel 100A1 shown in FIG. 8, the lead-out wiring lines 12Dt for the driving electrodes 14D. The respective lead-out wiring lines 12Dt (Dt(n), Dt(n−1), for example) are electrically connected to one driving electrode 14D in a contact section 12Dc. By providing the lead-out wiring lines 12Dt, it is no longer necessary to draw out wiring lines for providing voltage (also referred to as "transmission signals") to the driving electrodes 14D from the left and right sides of the sensor array region, and it is instead possible to draw out the wiring lines toward the bottom in FIG. 20. Therefore, by using such a configuration, it is possible to provide an extremely narrow touch panel in which there is almost no non-display area (narrow region) on three sides (the upper side, left side, and right side, for example).

In addition, by having the lead-out wiring lines 12Dt overlap the light-shielding portion of the black matrix 5b that extends in the vertical direction (column direction), it is possible to reduce the loss of display light. Also, it is possible to standardize the CR time constant of the driving electrodes 14D as a result of the arrangement of the lead-out wiring lines 12Dt; thus it is possible to improve the performance of the touch panel.

Figure 23:
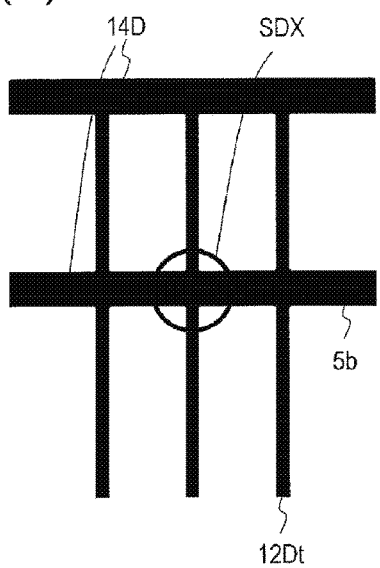
FIGS. 23(a) to 23(c) show the configuration of a connecting part of a lead-out wiring line 12Dt and the driving electrode 14D.
Figure 23:
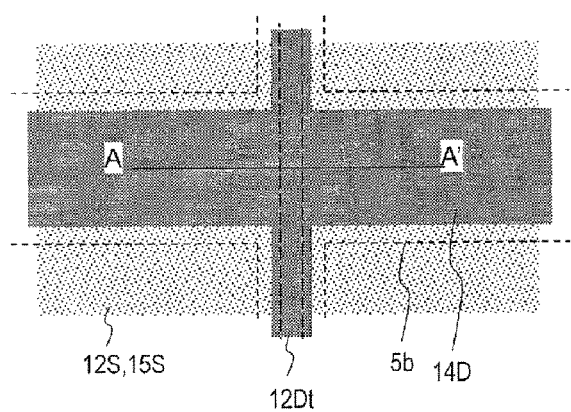
Figure 23:
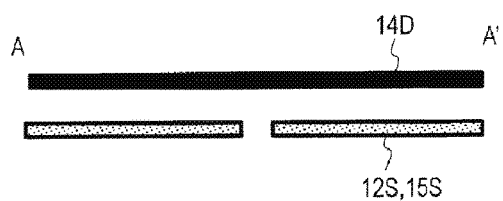

As shown in FIGS. 21(a) and 21(b), the lead-out wiring lines 12Dt can be formed by patterning the same conductive layer as that of the driving electrodes 14D. The structure of the intersection SDX includes both the bridge structure 15BR and the auxiliary wiring lines 12St shown in FIG. 22. As shown in FIG. 23, the structure of the contact section 12Dc is formed of the same conductive layer as the lead-out wiring lines 12Dt and the driving electrodes 14D, and is branched in a cross shape.

Figure 24:
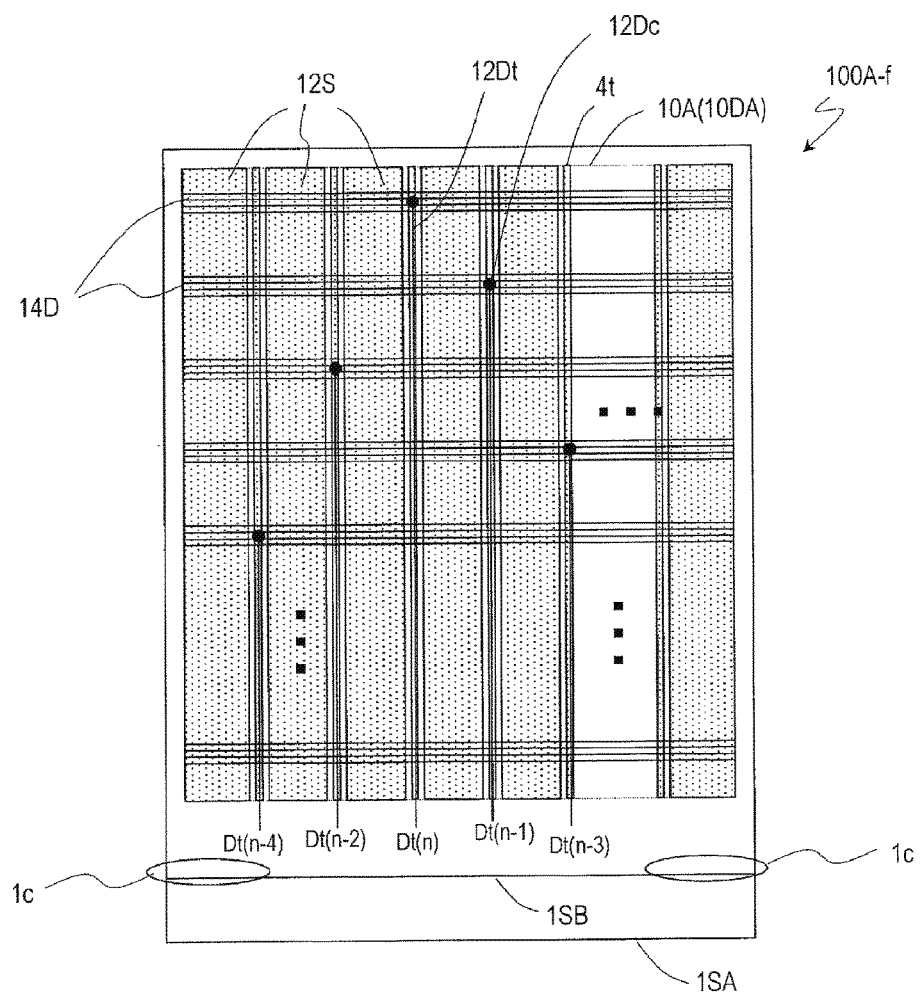
FIG. 24 is a schematic plan view of a touch panel 100A-f.
Figure 25:
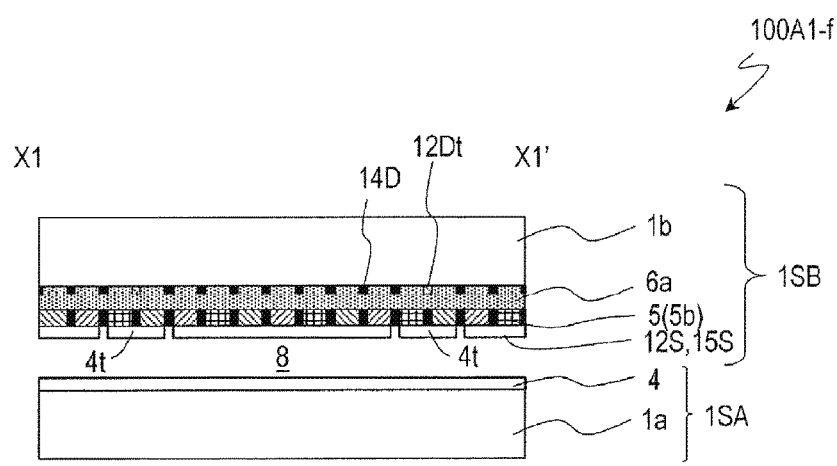
FIG. 25(a) is a schematic cross-sectional view (X1-X1') of a touch panel 100A1-f.
FIG. 25(b) is a schematic cross-sectional view (X1-X1') of a touch panel 100A2-f.
Figure 25:
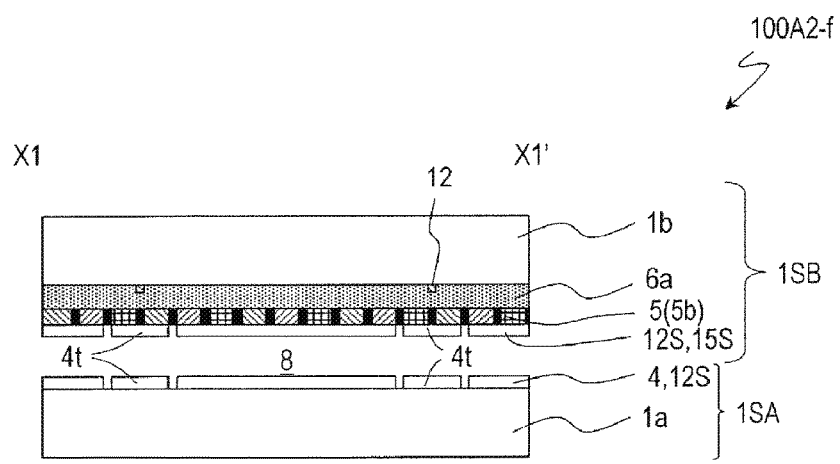
Figure 26:
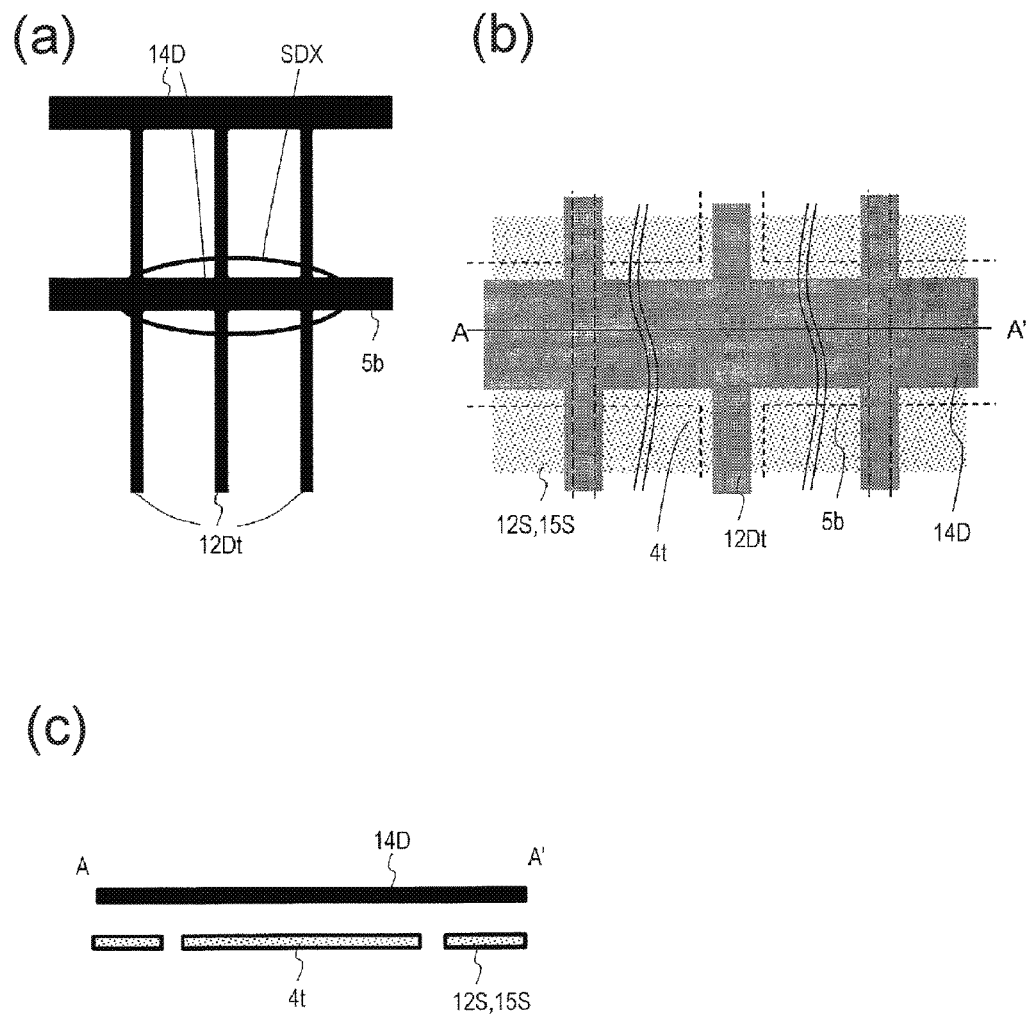
FIGS. 26(a) to 26(c) show the configuration of a connecting part of the lead-out wiring line 12Dt and the driving electrode 14D.

FIG. 24 shows a schematic plan view of a touch panel 100A-f. FIG. 25(a) shows a schematic cross-sectional view (X1-X1') of a touch panel 100A1-f, and FIG. 25(b) shows a schematic cross-sectional view (X1-X1') of a touch panel 100A2-f.

The touch panel 100A-f shown in FIG. 24, similar to the touch panel 100A-e shown in FIG. 20, includes lead-out wiring lines 12Dt for the driving electrodes 14D. The respective lead-out wiring lines 12Dt (Dt(n), Dt(n−1), for example) are electrically connected to one driving electrode 14D in the contact section 12Dc. As shown in FIGS. 26(a) to 26(c), the lead-out wiring lines 12Dt and the driving electrodes 14D are connected.

As shown in FIG. 25(a), in the touch panel 100A1-f, electrode portions 4t, which overlap the lead-out wiring lines 12Dt and are formed from the same conductive layer as the detection electrodes 12S, are separated from the detection electrodes 12S. The electrode portions 4t are configured so as to be provided a common voltage, and the electrode portions 4t do not function as detection electrodes 12S. By using such a configuration, it is possible to reduce the parasitic capacitance between the detection electrodes 12S and the lead-out wiring lines 12Dt for the driving electrodes 14D; thus, it is possible to prevent saturation of the integral circuit output for reading in the touch panel and to increase the detection accuracy of touch locations so as to be higher than that of the touch panel 100A-e shown in FIG. 20.

As shown in FIG. 25(b), the touch panel 100A2-f is a type A2 touch panel. In other words, the shield electrode layer 15S has a plurality of shield electrode sections, and the plurality of shield electrode sections function as a plurality of detection electrodes 12S. In addition, the common electrode 4 has a plurality of common electrode sections that are parallel to the plurality of detection electrodes 12S, and the plurality of common electrode sections are respectively electrically connected to one of the plurality of detection electrodes 12S that face the common electrode sections through the liquid crystal layer 8.

In the touch panel 100A2-f, the electrode portions 4t, which overlap the lead-out wiring lines 12Dt and are formed from the same conductive layer as the common electrode 4, are separated from the common electrode 4. The electrode portions 4t separated from the common electrode are electrically connected to the electrode portions 4t separated from the detection electrodes 12S, and these electrode portions 4t are configured so as to be independent and to be provided a common voltage. These electrode portions 4t also do not function as detection electrodes 12S. By using such a configuration, it is possible to further reduce the parasitic capacitance between the detection electrodes 12S and the lead-out wiring lines 12Dt for the driving electrodes 14D.

Figure 27:
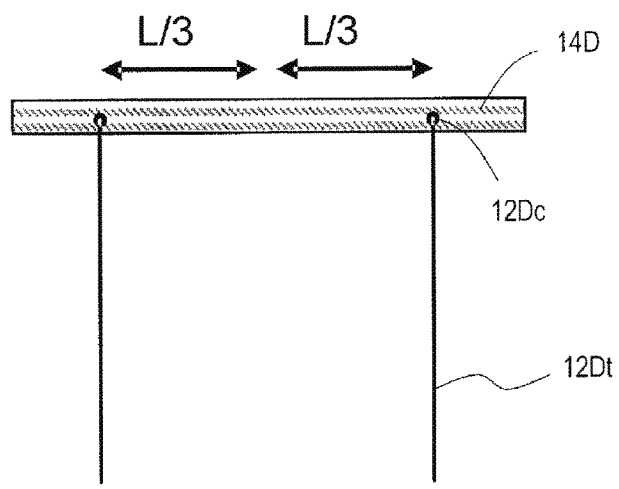
FIG. 27(a) schematically shows a configuration in which the lead-out wiring lines 12Dt are provided inside a sensor array region 10A.
FIG. 27(b) schematically shows a configuration in which lead-out wiring lines are not provided, and in which a drawn-out wiring line 94Dt is formed from an end of a driving electrode 94D.
Figure 27:
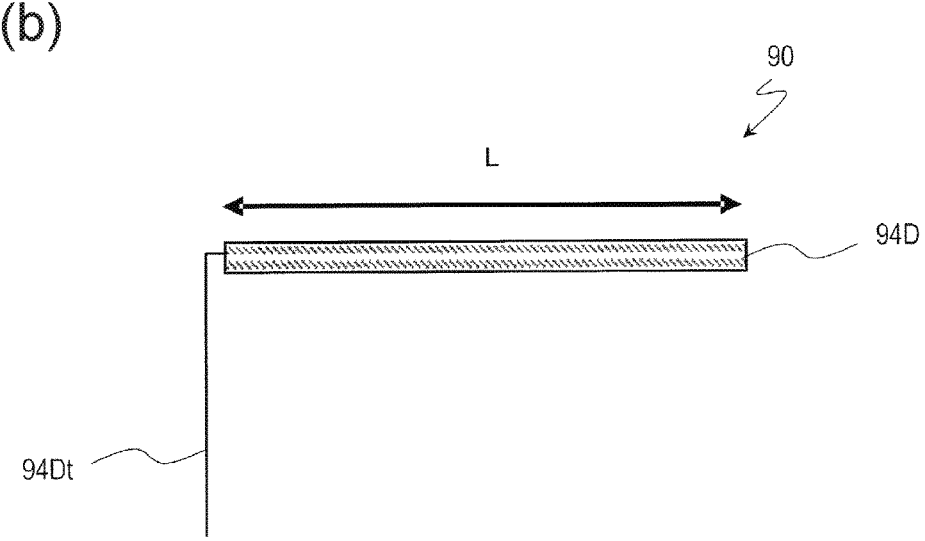

Here, the benefits obtained by providing the lead-out wiring lines 12Dt will be described with reference to FIG. 27. FIG. 27(a) schematically shows a configuration in which the lead-out wiring lines 12Dt are provided inside the sensor array region 10A. FIG. 27(b) schematically shows a configuration in which lead-out wiring lines are not provided, and in which a drawn-out wiring line 94Dt is formed from an end of a driving electrode 94D. As can be seen from FIG. 27(b), a length L of the driving electrodes 94D and the length of the drawn-out wiring lines 94Dt affect the resistance and parasitic capacitance (sometimes abbreviated as "CR") of the respective driving electrodes 94D. Therefore, the CR varies according to the location of the driving electrodes 94D. As a countermeasure, as shown in FIG. 27(a), by providing the lead-out wiring lines 12Dt, it is possible to cause the total CR of the lead-out wiring lines 12Dt connected to a driving electrode 14D to match the total CR of the lead-out wiring lines 12Dt connected to another driving electrode 14D. For example, as shown in FIG. 27(a), by providing two lead-out wiring lines 12Dt at two contact sections 12Dc, the contribution of the driving electrode 14D to the CR of the respective lead-out wiring lines 12Dt is L/3.

Figure 28:
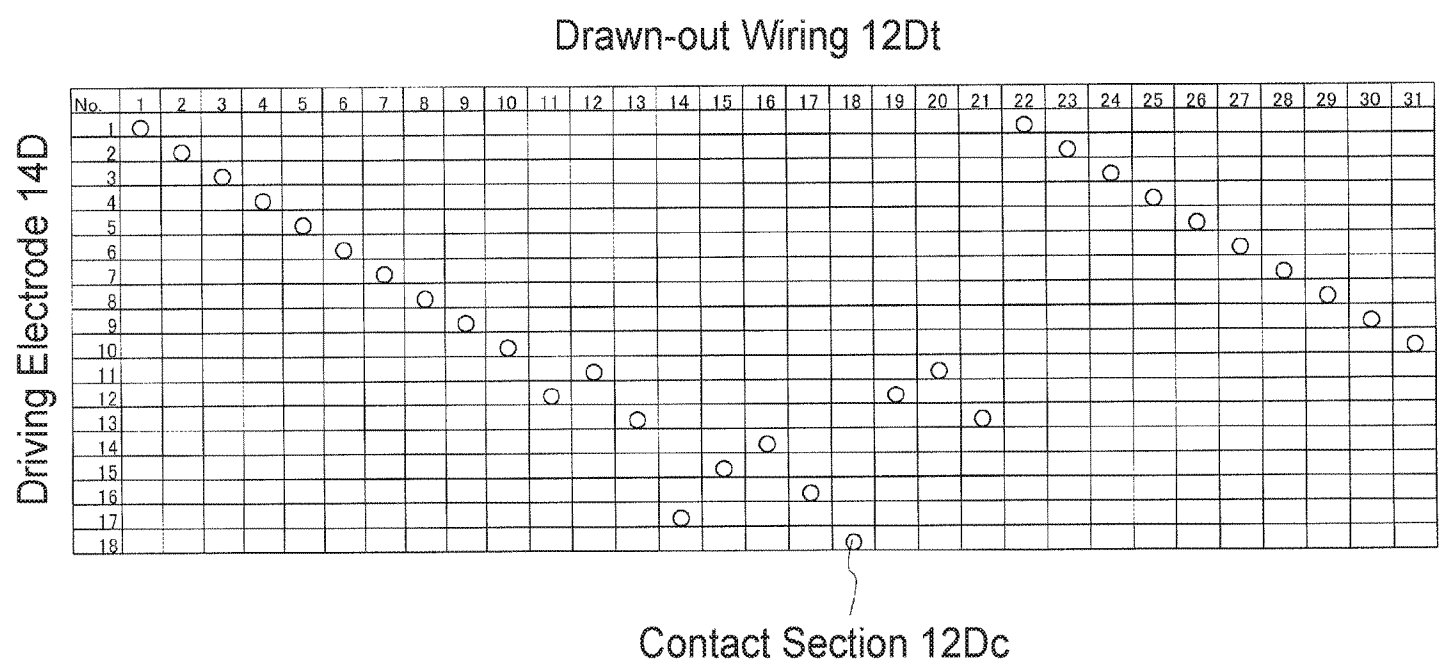

FIG. 28 shows examples of the connection configuration of the lead-out wiring lines 12Dt and the driving electrodes 14D. FIG. 28 uses a "○" to show the location in which the contact sections 12Dc are formed via a matrix (table) formed by the number of the driving electrode 14D in the touch panel 100 and the number of the lead-out wiring line 12Dt in the touch panel 100. The matrix shown in FIG. 28 corresponds to the sensor array region 10A of the touch panel.

As shown in FIG. 28, the driving electrodes 14D (Nos. 14 to 18) closest to the side forming the terminal are electrically connected to the lead-out wiring lines 12Dt at the single contact section 12Dc. The driving electrodes 14D (Nos. 1 to 13) that are farther away from the side forming the terminal are respectively electrically connected to the lead-out wiring lines 12Dt at two contact sections 12Dc. The single contact section 12Dc is provided in a location that substantially bisects the length L of the driving electrode 14D. The two contact sections 12Dc are disposed such that the longest length of the driving electrodes 14D to be charged is L/3 from the contact section 12Dc. By connecting the lead-out wiring lines 12Dt in this manner, and, as needed, adjusting the drawn-out length on the lower side of the sensor array region 10A, it is possible to prevent variations in the CR due to the lead-out wiring lines 12Dt.

Figure 29:
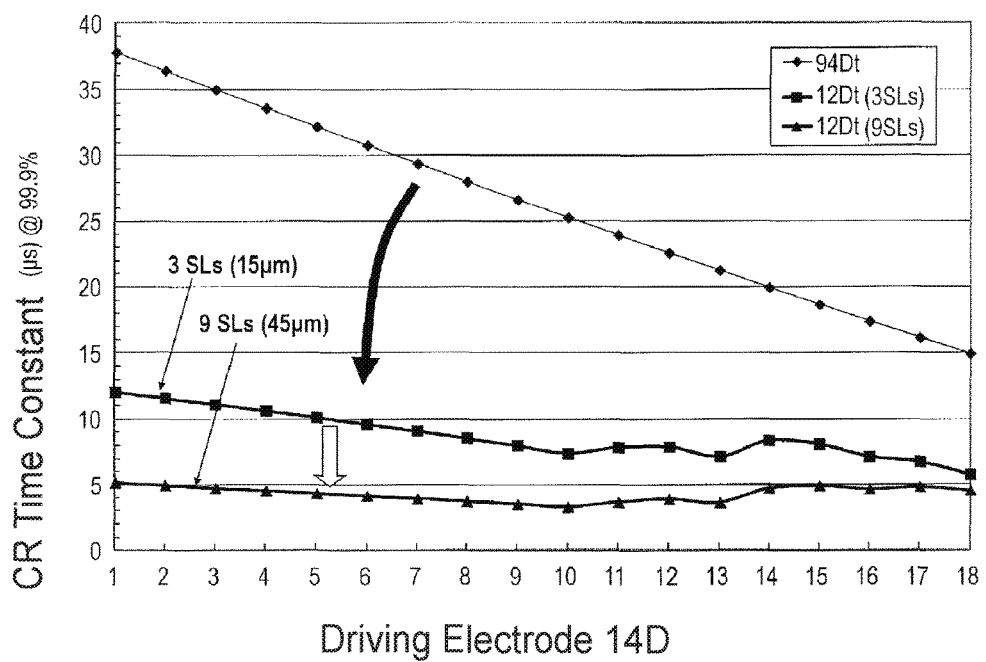
FIG. 29 shows results obtained from simulations of the CR time constant (the amount of charging time to reach 99.9% of a target potential) of the various driving electrodes 14D in a touch panel with a diagonal of 8.8 inches.

A specific example will be described with reference to FIG. 29. FIG. 29 shows the results obtained in a simulation of the CR time constant (the amount of charging time to reach 99.9% of the target potential) for the various driving electrodes 14D in a touch panel with a diagonal of 8.8 inches. The number of the driving electrode 14D corresponds to the location of the driving electrode 14D. "94Dt" in FIG. 29 shows the results when, as shown in the connection configuration of the comparison example shown in FIG. 27(b), a configuration is used in which the drawn-out wiring lines 94Dt are formed from an end of the driving electrode 94D. "12Dt(3SLs)" and "12Dt(9SLs)" show the results when the connection configuration shown in FIG. 28 is used. 3SLs and 9SLs respectively represent cases in which the number of thin lines (width of 5 μm) forming one lead-out wiring line 12Dt is three and nine, and respectively correspond to cases in which the width of the lead-out wiring line 12Dt is 15 μm and 45 μm.

As can be seen from the results for 94Dt in FIG. 29, the CR time constant has a large value of greater than or equal to approximately 15 μsec. In addition, the driving electrode 94D closest to the terminal (the driving electrode connected to the shortest drawn-out wiring line 94Dt) has the smallest CR time constant (approximately 15 μsec), and the driving electrode 94D furthest from the terminal (the driving electrode connected to the longest drawn-out wiring line 94Dt) has the largest CR time constant (approximately 38 μsec). In this manner, there are large variations in the CR time constant in the touch panel of the comparison example. As a countermeasure, as can be seen from the results for 12Dt in FIG. 29, by using the connection configuration shown in FIG. 28, it is possible to make the CR time constant of the driving electrodes 14D smaller, and it is also possible to decrease variations in the CR time constant. Therefore, compared to the touch panel of the comparison example, a touch panel having the lead-out wiring lines 12Dt has the benefits of better performance, the ability to more accurately perform touch location detection, and/or being able to be made larger more easily.

A configuration was described with reference to FIG. 28 in which, in a portion of the driving electrodes 14D, contact sections 12Dc were provided in two different locations (sensor units) of the driving electrode 14D and the driving electrode 14D was connected to two lead-out wiring lines 12Dt. The connection configuration of the lead-out wiring lines 12Dt and the driving electrodes 14D is not limited to this, however, and various modifications are possible. As shown in FIGS. 30(a) to 30(e), a plurality of lead-out wiring lines 12Dt may be disposed between adjacent detection electrodes 12S, for example.

Figure 30:
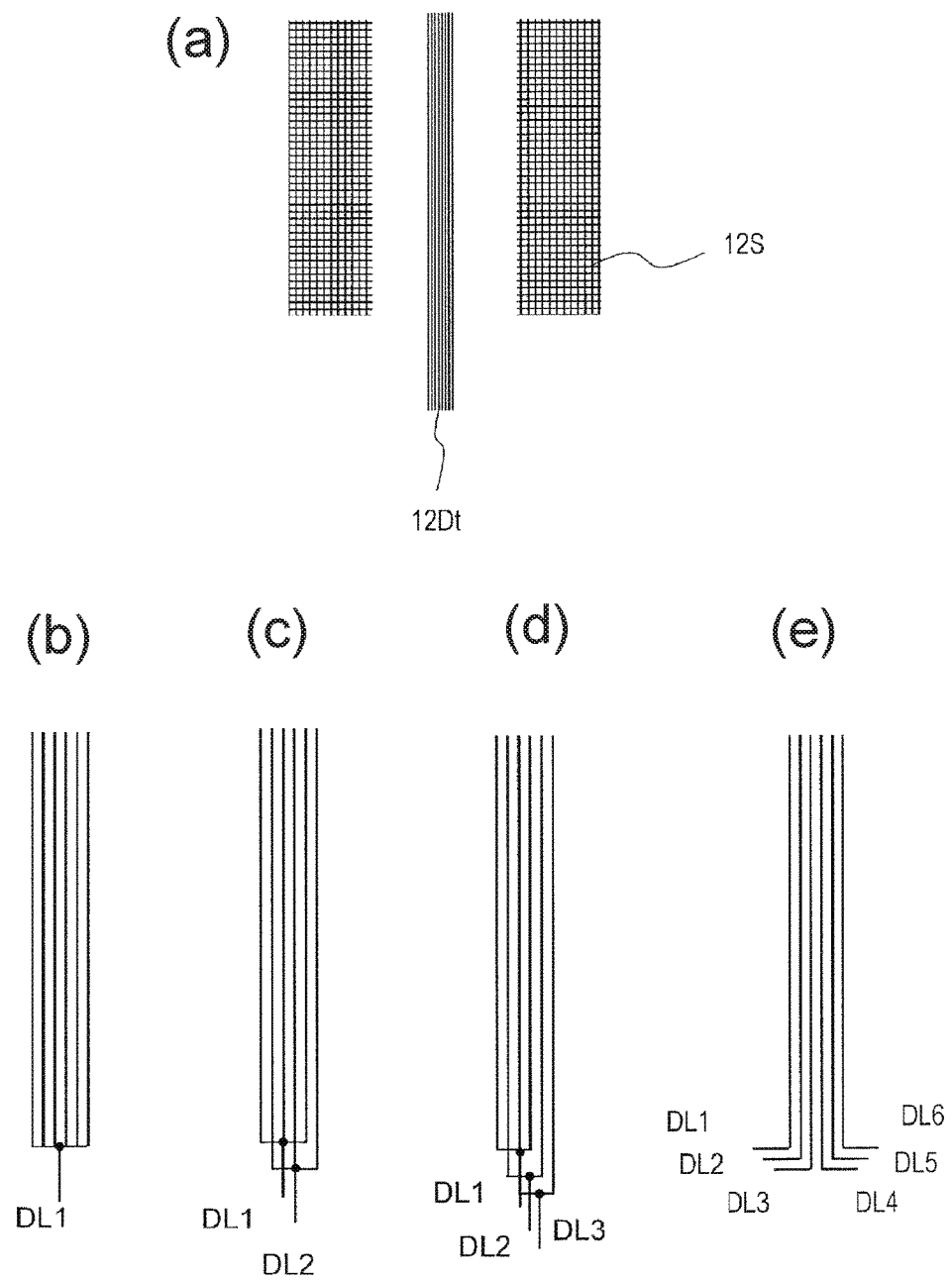
FIGS. 30(a) to 30(e) show variations of the lead-out wiring line 12Dt disposed between adjacent detection electrodes 12S.

As schematically shown in FIG. 30(a), the lead-out wiring lines 12Dt are disposed between two adjacent detection electrodes 12S. The driving electrodes 14D are omitted from FIG. 30 in order to focus on the positional relationship between the lead-out wiring lines 12Dt and the detection electrodes 12S.

Transmission signals provided to the driving electrodes 14D from the lead-out wiring lines 12Dt induce noise in the detection electrodes 12S adjacent to the lead-out wiring lines 12Dt. This noise is substantially proportional to the coupling capacitance value of the lead-out wiring lines 12Dt and the detection electrodes 12S. In other words, compared to a case in which, as shown in FIG. 30(b), the lead-out wiring lines 12Dt formed between two adjacent detection electrodes 12S are connected to the single driving electrode 14D (with "DL1" representing being connected to a first driving electrode), a case in which, as shown in FIG. 30(c), the lead-out wiring lines 12Dt are connected to two different driving electrodes (a case having DL1 connected to the first driving electrode, and DL2 connected to a second driving electrode) will have a smaller coupling capacitance value for e respective lead-out wiring lines 12Dt and detection electrodes 12S. Thus, it is possible to reduce noise. Furthermore, in a case in which, as shown in FIG. 30(d), the lead-out wiring lines are connected to three different driving electrodes, and in a case in which, as shown in FIG. 30(e), the lead-out wiring lines are connected to six different driving electrodes, it possible to further reduce noise. In such cases, the lead-out wiring lines 12Dt provided between the two adjacent detection electrodes 12S include at least two lead-out wiring lines 12Dt that are electrically independent from one another.

For example, FIG. 30(*e*) shows an example in which the lead-out wiring line DL1 that is connected to the first driving electrode, the lead-out wiring line DL2 that is connected to the second driving electrode, a lead-out wiring line DL3 that is connected to a third driving electrode, a lead-out wiring line DL4 that is connected to a fourth driving electrode, a lead-out wiring line DL5 that is connected to a fifth driving electrode, and a lead-out wiring line DL6 that is connected to a sixth driving electrode are provided between two adjacent detection electrodes 12S. The six lead-out wiring lines DL1 to DL6 disposed between the adjacent detection electrodes 12S are provided in four different locations (between adjacent detection electrodes 12S), and, in a plurality of different locations, are connected to a plurality of corresponding driving electrodes 14D at the contact sections 12Dc, for example.

The touch panel may also be configured such that the group of six lead-out wiring lines DL1 to DL6 are provided in six different locations, and the first driving electrode 14D is connected to six of the lead-out wiring lines DL1 in six different locations. The number and method of combining the lead-out wiring lines disposed between adjacent detection electrodes 12S is not limited to the above-mentioned example, and various other designs are possible which, as described above, reduce the CR time constant of the various driving electrodes and reduce variations in the CR time constant.

Next, the configuration of type B touch panels will be described with reference to FIGS. 31 to 35.

Figure 31:
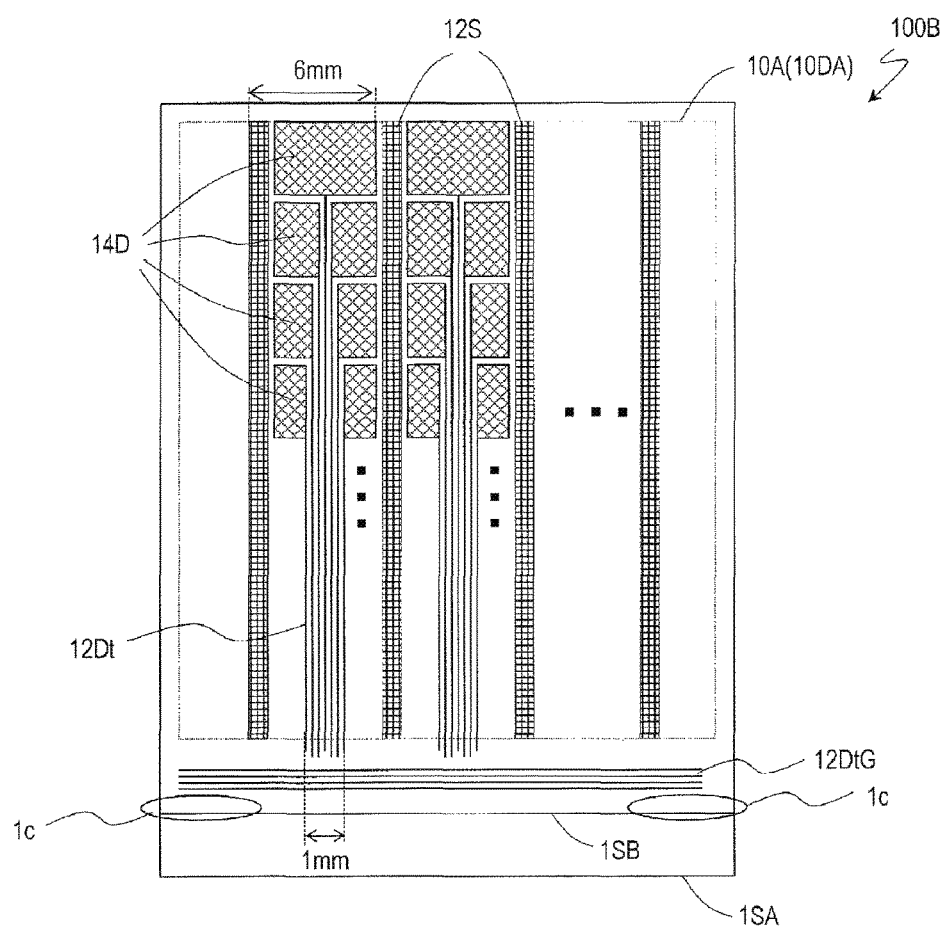
FIG. 31 is a schematic plan view of a type B touch panel 100B according to one embodiment of the present invention.
Figure 32:
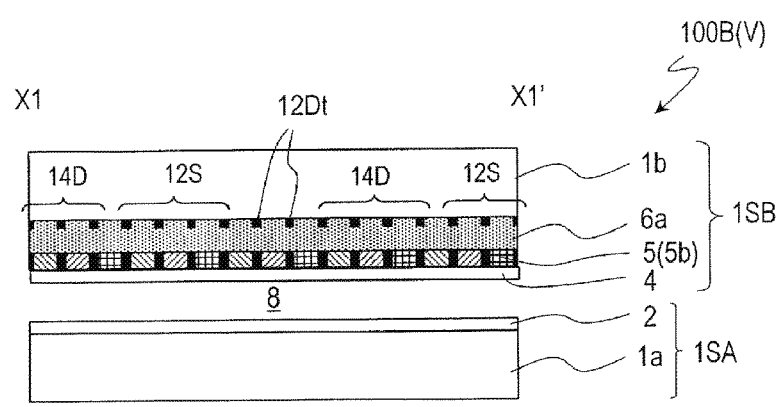
FIGS. 32(a) and 32(b) are schematic cross-sectional views of a type B touch panel 100B(V) that uses a vertical electric field mode liquid crystal display panel.
Figure 32:
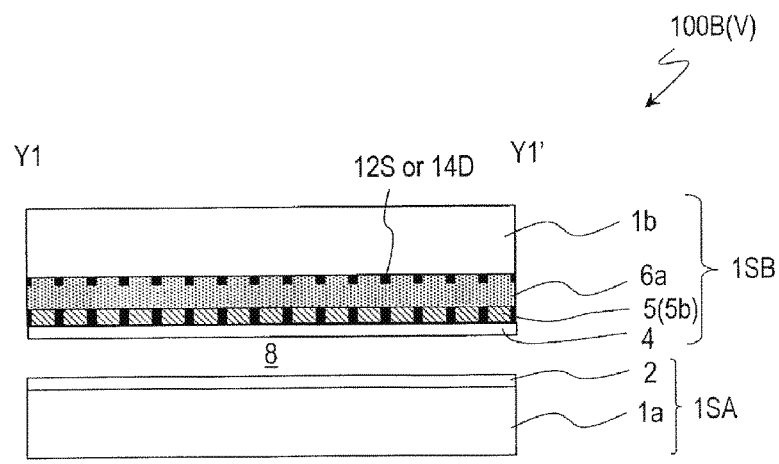

FIG. 31 shows a schematic plan view of a touch panel 100B. The touch panel 100B can include both vertical electric field mode and horizontal electric field mode liquid crystal display panels. FIG. 32(*a*) shows a cross-sectional view along the line X1-X1' of a touch panel 100B(V) that includes a vertical electric field mode liquid crystal display panel, and FIG. 32(*b*) shows a cross-sectional view of the touch panel 100B(V) along the line Y1-Y1'. In addition, FIG. 33(*a*) shows a cross-sectional view along the line X1-X1' of the touch panel 100B, which includes a horizontal electric field mode liquid crystal display panel, and FIG. 33(*b*) shows a cross-sectional view of the touch panel 100B along the line Y1-Y1'.

Figure 33:
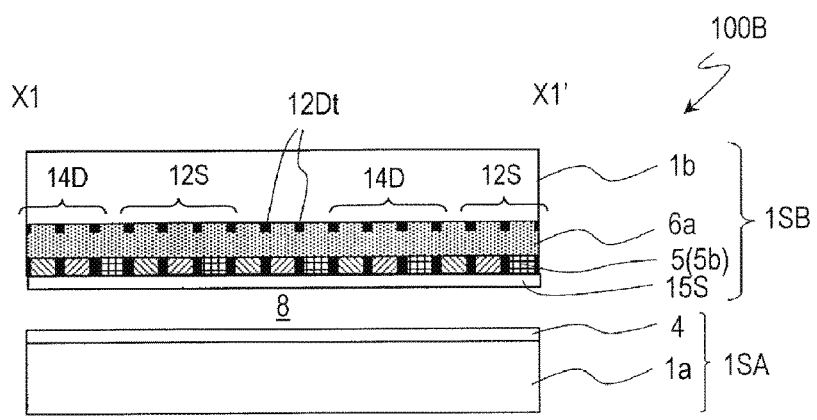
FIGS. 33(a) and 33(b) are schematic cross-sectional views of the type B touch panel 100B, which uses a horizontal electric field mode liquid crystal display panel.
Figure 33:
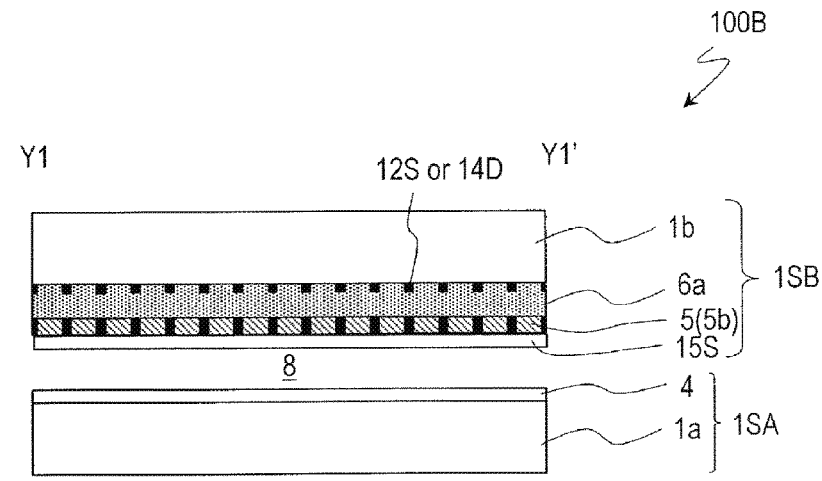

As shown in FIGS. 31 to 33, in the type B touch panel 100B, the driving electrodes 14D and the detection electrodes 12S are formed from the same conductive film. Therefore, it is possible to provide a touch panel with a relatively simply structure. The touch panel shown in FIG. 31 that includes the driving electrodes 14D and the detection electrodes 12S formed from the same conductive film is disclosed in the specification of U.S. Pat. No. 8,319,747, for example. The entire disclosed contents of the specification of U.S. Pat. No. 8,319,747 are incorporated into the specification of this application by reference.

Among the driving electrodes 14D, two driving electrodes 14D that are adjacent to each other with one detection electrode 12S interposed therebetween are electrically connected to each other. In other words, the plurality of driving electrodes 14D arranged in the row direction function as a single driving electrode 14D that extends in the row direction. As shown in FIG. 31, the touch panel 100B includes a plurality of the lead-out wiring lines 12Dt that are formed from the same conductive film as the driving electrodes 14D and the detection electrodes 12S, the respective driving electrodes 14D are connected to at least one lead-out wiring line 12Dt, and the lead-out wiring lines 12Dt are grouped together in a region 12DtG, for example. The plurality of driving electrodes 14D connected to the grouped lead-out wiring lines 12Dt function as a single driving electrode 14D that extends in the row direction.

In addition, in the touch panel 100B, a terminal (not shown) for the detection electrodes 12S and a terminal (not shown) for the lead-out wiring lines 12Dt are each provided in a region near a same side of the opposite substrate 1SB that extends substantially parallel to the row direction. Therefore, by using such a configuration, it is possible to provide an extremely narrow touch panel in which there is almost no non-display area (narrow region) on three sides (the upper side, left side, and right side, for example).

The detection electrodes 12S and the driving electrodes 14D are formed of mesh-shaped (grid-shaped) metal electrodes, for example. At such time, it is possible to reduce the loss of display light due to the metal mesh being arranged so as to overlap the light-shielding portions of the black matrix 5b that extend in the row direction and the column direction. In addition, since it is possible to make the area of the driving electrodes 14D larger, it is possible to improve the detection accuracy of touch locations.

Next, the configuration of the type B touch panel 100B(V) that includes a vertical electric field mode liquid crystal display panel will be described with reference to FIG. 32. FIGS. 32(*a*) and 32(*b*) are schematic cross-sectional views of the touch panel 100B(V). FIG. 32(*a*) is a cross-sectional view along the line X1-X1', and FIG. 32(*b*) is a cross-sectional view along the line Y1-Y1'.

The touch panel 100B(V) includes: the TFT substrate (first substrate) 1SA; the opposite substrate (second substrate) 1SB disposed on the viewer side of the TFT substrate 1SA; and the liquid crystal layer 8 provided between the TFT substrate 1SA and the opposite substrate 1SB. The touch panel 100B(V) further includes: the plurality of pixel electrodes 2 and the common electrode 4 for applying voltage to the liquid crystal layer 8; and the plurality of detection electrodes 12S and the plurality of driving electrodes 14D for the touch sensor. The liquid crystal layer 8 is a vertical alignment-type liquid crystal layer that includes nematic liquid crystal material having a negative dielectric anisotropy, for example. The liquid crystal layer included in the vertical electric field mode liquid crystal display panel is not limited to a vertical alignment (VA) mode, and may be a liquid crystal layer used in another well-known type of vertical electric field mode, such as a twisted nematic (TN) mode, for example.

The TFT substrate 1SA includes: the first transparent substrate (a glass substrate, for example) 1a; and the plurality of pixel electrodes 2, which are formed on the liquid crystal layer 8 side of the first transparent substrate 1a. In FIG. 32, the plurality of pixel electrodes 2 are shown as one layer for ease of description, but are electrically independent for each pixel.

The opposite substrate 1SB includes: the second transparent substrate (a glass substrate, for example) 1b; and the plurality of driving electrodes 14D and the plurality of detection electrodes 12S formed on the liquid crystal layer 8 side of the second transparent substrate 1b. The opposite substrate 1SB does not include a conductive layer on the viewer side of the second transparent substrate 1b. The opposite substrate 1SB includes the common electrode 4, and the common electrode 4 is formed on the liquid crystal layer 8 side of the second transparent substrate 1b. The common electrode 4 is typically formed as a single conductive film.

In the opposite substrate 1SB of the touch panel 100B(V), the common electrode 4 is formed on the liquid crystal layer 8 side of the driving electrodes 14D and the detection electrodes 12S. The driving electrodes 14D/detection electrodes 12S and the common electrode 4 are insulated from each other via the interlayer insulating layer 6a. The common electrode 4 is formed on the color filter layer 5 (which includes the black matrix 5b) that is formed on the interlayer insulating layer 6a. The common electrode 4 (unlike the driving electrodes 14D) has a fixed potential, and the common electrode 4 is used so as to suppress the generation of a vertical electric field in the liquid crystal layer 8 due to electric charges on the surface of the opposite substrate 1SB. In other words, the common electrode 4 functions as a shield electrode layer. In addition, since the potential of the common electrode 4 is fixed, the touch panel 100B(V) is able to resolve the above-mentioned Problem 3 of a decline in display quality due to liquid crystal molecules becoming misaligned as a result of the voltage used to drive the touch panel.

The touch panel 100B(V) does not include a conductive layer on the viewer side of the second transparent substrate 1b. In other words, a conductive layer is not formed on the surface on the viewer side of the second transparent substrate 1b. In addition, while the touch panel 100B(V) has two polarizing plates (not shown) that are disposed so as to face each other through the two substrates 1SA, 1SB interposed therebetween, the polarizing plate (also referred to as a "front polarizing plate") disposed on the viewer side of the opposite substrate 1SB is an ordinary polarizing plate that does not include an anti-static conductive layer. In this manner, the touch panel 100B(V) according to one embodiment of the present invention does not include a conductive layer (either a detection electrode layer or an anti-static conductive layer) on the viewer side of the touch panel. Therefore, the touch panel 100B(V) is able to resolve the above-mentioned Problem 1 of high manufacturing costs, difficulty in making the device larger and thinner, low light transmittance, and the like.

Next, the configuration of the type B touch panel 100B that includes a horizontal electric field mode liquid crystal display panel will be described with reference to FIG. 33. FIGS. 33(a) and 33(b) are schematic cross-sectional views of the touch panel 100B. FIG. 33(a) is a cross-sectional view along the line X1-X1', and FIG. 33(b) is a cross-sectional view along the line Y1-Y1'.

The touch panel 100B includes: the TFT substrate (first substrate) 1SA; the opposite substrate (second substrate) 1SB disposed on the viewer side of the TFT substrate 1SA; and the liquid crystal layer 8 provided between the TFT substrate 1SA and the opposite substrate 1SB. The touch panel 100B further includes: the plurality of pixel electrodes 2 and the common electrode 4 for applying voltage to the liquid crystal layer 8; and the plurality of detection electrodes 12S and the plurality of driving electrodes 14D for the touch sensor. The touch panel 100B includes an FFS mode liquid crystal display panel, for example, and the liquid crystal layer 8 is a horizontal alignment-type liquid crystal layer that includes nematic liquid crystal material having a negative dielectric anisotropy.

The opposite substrate 1SB includes: a second transparent substrate (a glass substrate, for example) 1b; and the plurality of driving electrodes 14D and the plurality of detection electrodes 12S formed on the liquid crystal layer 8 side of the second transparent substrate 1b. The opposite substrate 1SB does not include a conductive layer on the viewer side of the second transparent substrate 1b. The opposite substrate 1SB includes the shield electrode layer 15S, and the shield electrode layer 15S is formed on the liquid crystal layer 8 side of the second transparent substrate 1b. The shield electrode layer 15S is formed as a single conductive film, for example.

In the opposite substrate 1SB of the touch panel 100B, the shield electrode layer 15S is formed on the liquid crystal layer 8 side of the driving electrodes 14D and the detection electrodes 12S. The driving electrodes 14D/detection electrodes 12S and the shield electrode layer 15S are insulated from each other via the interlayer insulating layer 6a. The shield electrode layer 15S is formed on the color filter layer 5 (which includes the black matrix 5b) that is formed on the interlayer insulating layer 6a. The shield electrode layer 15S (unlike the driving electrodes 14D) has a fixed potential, and the shield electrode layer 15S is used so as to suppress the generation of a vertical electric field in the liquid crystal layer 8 that results from electric charges on the surface of the opposite substrate 1SB and the potential of the driving electrodes 14D. Therefore, the touch panel 100B is able to resolve the above-mentioned Problem 3 of a decline in display quality due to liquid crystal molecules becoming misaligned as a result of the voltage used to drive the touch panel.

The touch panel 100B does not include a conductive layer on the viewer side of the second transparent substrate 1b. In other words, a conductive layer is not formed on the surface on the viewer side of the second transparent substrate 1b. In addition, while the touch panel 100B has two polarizing plates (not shown) that are disposed so as to face each other through the two substrates 1SA, 1SB interposed therebetween, the polarizing plate (also referred to as a "front polarizing plate") disposed on the viewer side of the opposite substrate 1SB is an ordinary polarizing plate that does not include an anti-static conductive layer. In this manner, the touch panel 100B according to one embodiment of the present invention does not include a conductive layer (either a detection electrode layer or an anti-static conductive layer) on the viewer side of the touch panel. Therefore, the touch panel 100B is able to resolve the above-mentioned Problems 1 and 2 of high manufacturing costs, difficulty in making the device larger and thinner, low light transmittance, and the like.

Figure 34:
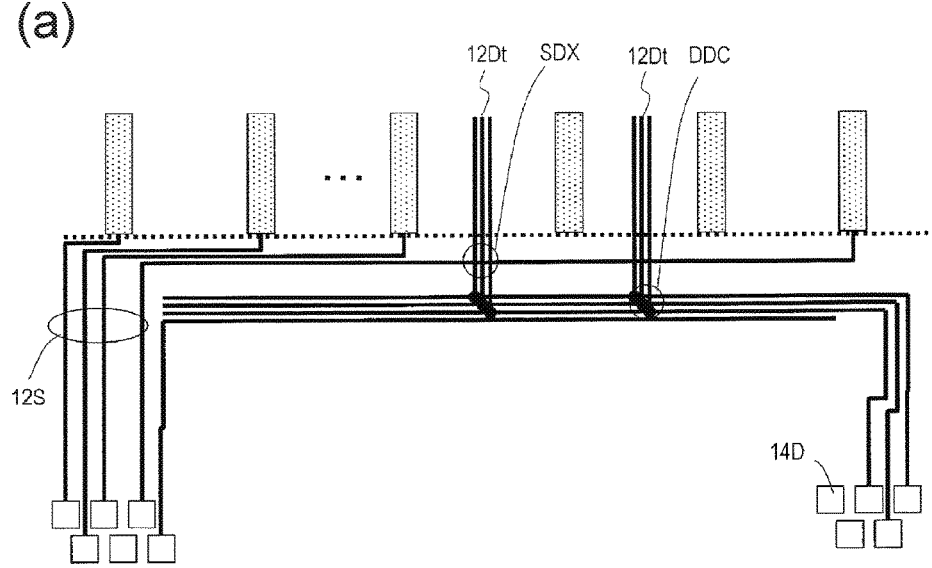
FIG. 34(a) schematically shows the connection configuration of wiring lines in a region 12DtG of the touch panel 100B.
FIG. 34(b) is a schematic plan view of the intersection SDX of the lead-out wiring lines 12Dt and wiring lines for the detection electrodes 12S.
FIG. 34(c) is a schematic plan view of a connecting part DDC of the lead-out wiring lines 12Dt and wiring lines for the driving electrode 14D.
Figure 34:
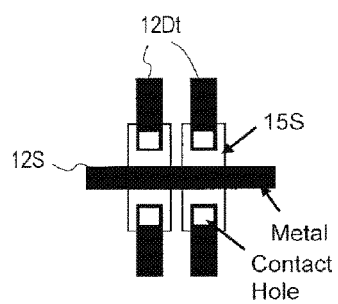
Figure 34:
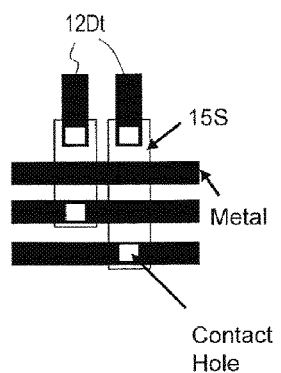

Next, FIG. 34(a) schematically shows a connection configuration of wiring lines in the region 12DtG of the touch panel 100B. As shown in FIG. 34, the lead-out wiring lines 12Dt connected to the driving electrodes 14D are connected to a terminal for the driving electrodes 14D via wiring lines provided in the region 12DtG, and in a similar manner, the detection electrodes 12S are connected to a terminal for the detection electrodes 12S via the wiring lines provided in the region 12DtG. These terminals are formed of the same transparent conductive layer as the shield electrode layer 15S.

FIG. 34(b) shows a schematic plan view of the intersection SDX of the lead-out wiring lines 12Dt and wiring lines for the detection electrodes 12S. FIG. 34(c) shows a schematic plan view of a connecting part DDC of the lead-out wiring lines 12Dt and wiring lines for the driving electrodes 14D. As shown in these figures, it is possible to form the intersection SDX and the connecting part DDC by using the same transparent conductive layer as that of the shield electrode layer 15S formed as a layer separate from the metal layer that forms the above-mentioned wiring lines.

Figure 35:
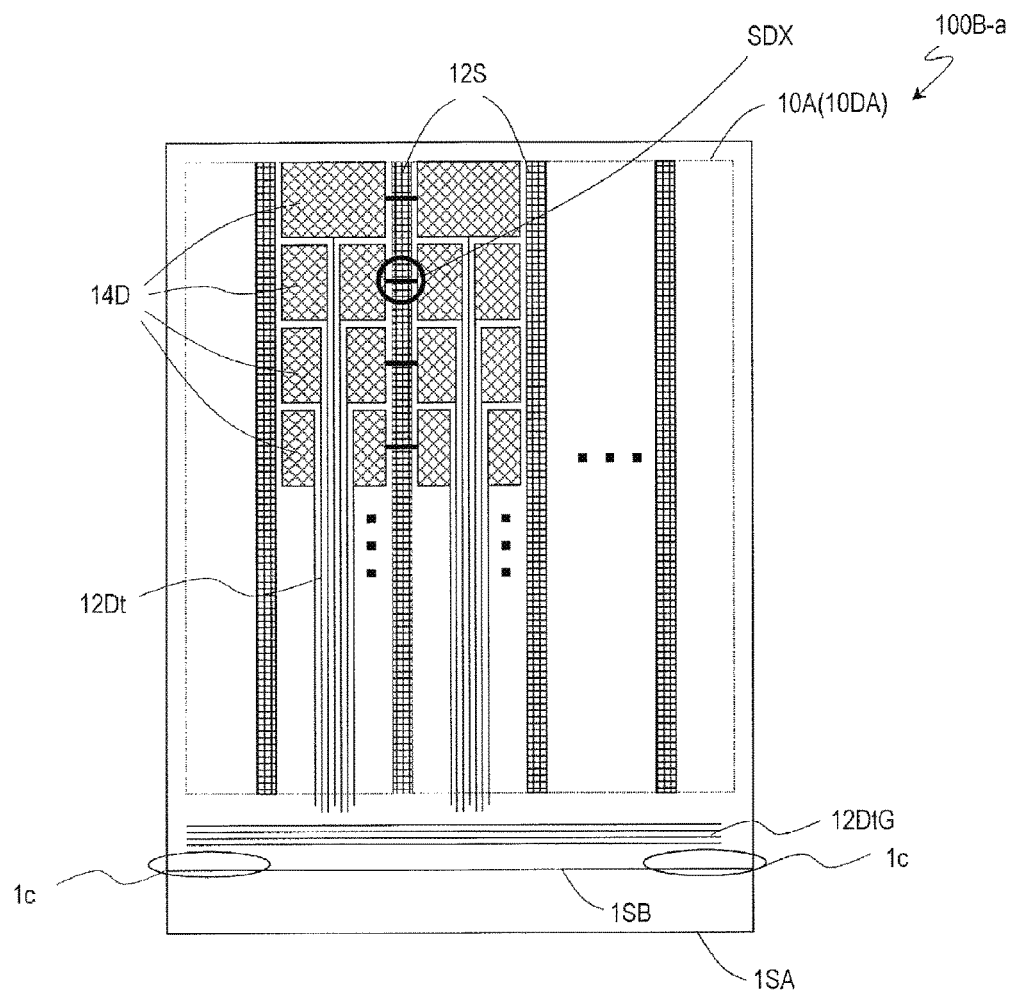
FIG. 35 is a schematic plan view of another type B touch panel 100B-a.

FIG. 35 shows a schematic plan view of a touch panel 100B-a. As shown in FIG. 35, among the plurality of driving electrodes 14D, two driving electrodes 14D that are adjacent to each other with one of the plurality of detection electrodes 12S interposed therebetween are electrically connected to each other via the intersection SDX. In this manner, by electrically connecting the driving electrodes 14D, it is possible to increase the degree of freedom of the wiring lines in the sensor array region 10A. An example was used here of two adjacent driving electrodes 14D being connected to each other, but the present invention is not limited to this. Variations in the CR between the driving electrodes 14D can be suppressed by increasing the number of the lead-out wiring lines 12Dt connected to the driving electrodes 14D located furthest from the terminal, or the like, for example. As shown in FIG. 22, the intersection SDX can be formed by utilizing the bridge structure 15BR that uses the shield electrode layer 15S.

Next, the configuration of type C touch panels will be described with reference to FIGS. 36 to 39.

Figure 36:
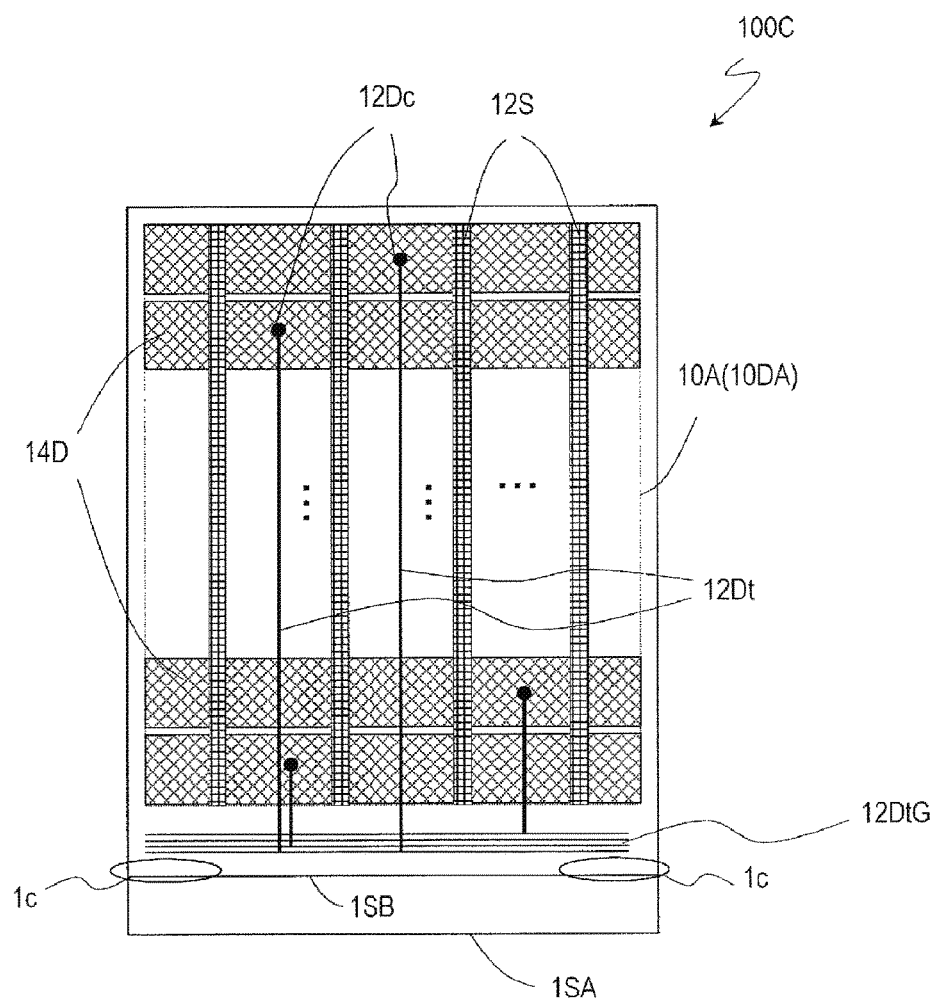
FIG. 36 is a schematic plan view of a type C touch panel 100C according to one embodiment of the present invention.

FIG. 36 shows a schematic plan view of a type C touch panel 100C. The touch panel 100C can include both vertical electric field mode and horizontal electric field mode liquid crystal display panels. FIG. 37(a) shows a cross-sectional view along the line X1-X1' of a touch panel 100C(V) that includes a vertical electric field mode liquid crystal display panel, and FIG. 37(b) shows a cross-sectional view of the touch panel 100C(V) along the line Y1-Y1'.

The type C touch panel 100C differs from a type B touch panel in that the driving electrodes 14D and the detection electrodes 12S are formed from different conductive layers that are insulated from each other. The type C touch panel includes a common electrode 4 or a shield electrode layer 15S that is independent of the detection electrodes 12S.

A touch panel 100C also includes a plurality of the lead-out wiring lines 12Dt formed from the same conductive layer as the detection electrodes 12S. The respective driving electrodes 14D are connected to at least one lead-out wiring line 12Dt, and the lead-out wiring lines 12Dt are grouped together in the region 12DtG. As mentioned above with reference to FIG. 20 and the like, by providing the lead-out wiring lines 12Dt, it is no longer necessary to draw out the wiring lines for providing voltage (transmission signals) to the driving electrodes 14D from the left and right sides of the sensor array region. In addition, in the touch panel 100C, a terminal (not shown) for the detection electrodes 12S and a terminal (not shown) for the lead-out wiring lines 12Dt are each provided in a region near a same side of the opposite substrate 1SB that extends substantially parallel to the row direction. Therefore, by using such a configuration, it is possible to provide an extremely narrow touch panel in which there is almost no non-display area (narrow region) on three sides (the upper side, left side, and right side, for example).

In addition, by having the lead-out wiring lines 12Dt overlap the light-shielding portion of the black matrix 5b that extends in the vertical direction (column direction), it is possible to reduce the loss of display light. Also, it is possible to standardize the CR time constant of the driving electrodes 14D as a result of the arrangement of the lead-out wiring lines 12Dt; thus, it is possible to improve the performance of the touch panel.

The detection electrodes 12S and the driving electrodes 14D are formed of mesh-shaped (grid-shaped) metal electrodes, for example. At such time, it is possible to reduce the loss of display light by having the metal mesh be arranged so as to overlap the light-shielding portions of the black matrix 5b that extend in the row direction and the column direction. In addition, since it is possible to make the area of the driving electrodes 14D larger, it is possible to improve the detection accuracy of touch locations.

Figure 37:
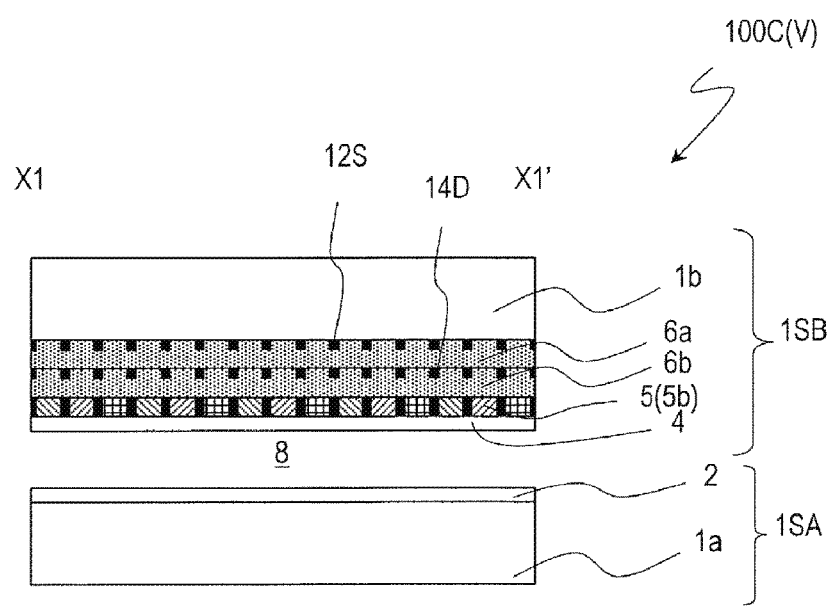
FIGS. 37(a) and 37(b) are schematic cross-sectional views of a type C touch panel 100C(V) that uses a vertical electric field mode liquid crystal display panel.
Figure 37:
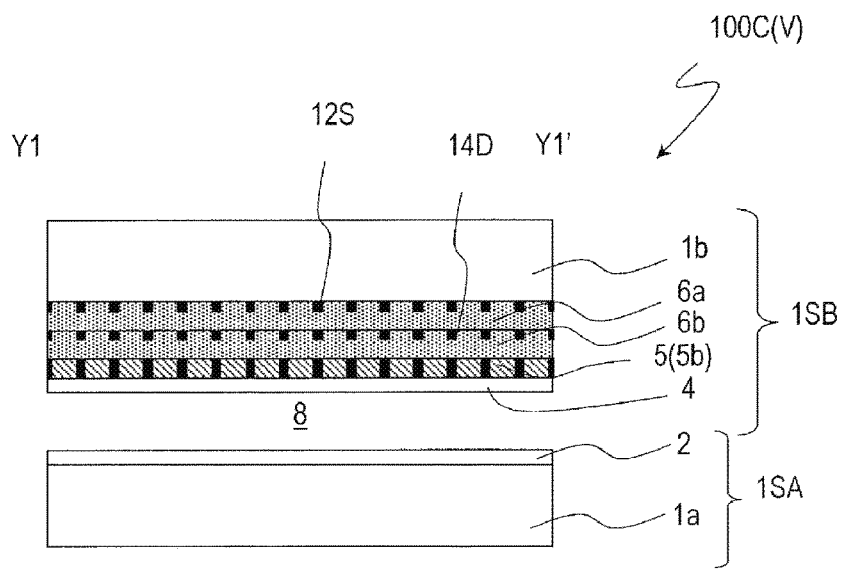

Next, the configuration of a type C touch panel 100C(V) that includes a vertical electric field mode liquid crystal display panel will be described with reference to FIG. 37. FIGS. 37(a) and 37(b) are schematic cross-sectional views of the touch panel 100C(V). FIG. 37(a) is a cross-sectional view along the line X1-X1', and FIG. 37(b) is a cross-sectional view along the line Y1-Y1'.

The touch panel 100C(V) includes: the TFT substrate (first substrate) 1SA; the opposite substrate (second substrate) 1SB disposed on the viewer side of the TFT substrate 1SA; and the liquid crystal layer 8 provided between the TFT substrate 1SA and the opposite substrate 1SB. The touch panel 100C(V) further includes: the plurality of pixel electrodes 2 and the common electrode 4 for applying voltage to the liquid crystal layer 8; and the plurality of detection electrodes 12S and the plurality of driving electrodes 14D for the touch sensor. The liquid crystal layer 8 is a vertical alignment-type liquid crystal layer that includes nematic liquid crystal material having a negative dielectric anisotropy, for example. The liquid crystal layer included in the vertical electric field mode liquid crystal display panel is not limited to a vertical alignment (VA) mode, and may be a liquid crystal layer used in another well-known type of vertical electric field mode, such as a twisted nematic (TN) mode, for example.

The TFT substrate 1SA includes: the first transparent substrate (a glass substrate, for example) 1a; and the plurality of pixel electrodes 2, which are formed on the liquid crystal layer 8 side of the first transparent substrate 1a. In FIG. 37, the plurality of pixel electrodes 2 are shown as one layer for ease of description, but are electrically independent for each pixel.

The opposite substrate 1SB includes: the second transparent substrate (a glass substrate, for example) 1b; and the plurality of driving electrodes 14D and the plurality of detection electrodes 12S formed on the liquid crystal layer 8 side of the second transparent substrate 1b. The opposite substrate 1SB does not include a conductive layer on the viewer side of the second transparent substrate 1b. The opposite substrate 1SB includes the common electrode 4, and the common electrode 4 is formed on the liquid crystal layer 8 side of the second transparent substrate 1b. The common electrode 4 is typically formed as a single conductive film.

In the opposite substrate 1SB of the touch panel 100C(V), the common electrode 4 is formed on the liquid crystal layer 8 side of the driving electrodes 14D and the detection electrodes 12S. The driving electrodes 14D and the detection electrodes 12S are insulated from each other via the interlayer insulating layer 6a. The interlayer insulating layer 6b is formed on the driving electrodes 14D, and the common electrode 4 is formed on the color filter layer 5 (which includes the black matrix 5b) that is formed on the interlayer insulating layer 6b. The common electrode 4 (unlike the driving electrodes 14D) has a fixed potential, and the common electrode 4 is used so as to suppress the generation of a vertical electric field in the liquid crystal layer 8 resulting from electric charges on the surface of the opposite substrate 1SB. In other words, the common electrode 4 functions as a shield electrode layer. In addition, since the potential of the common electrode 4 is fixed, the touch panel 100C(V) is able to resolve the above-mentioned Problem 3 of a decline in display quality due to liquid crystal molecules becoming misaligned as a result of the voltage used to drive the touch panel.

The touch panel 100C(V) does not include a conductive layer on the viewer side of the second transparent substrate 1b. In other words, a conductive layer is not formed on the surface on the viewer side of the second transparent substrate 1b. In addition, while the touch panel 100C(V) has two polarizing plates (not shown) that are disposed so as to face each other through the two substrates 1SA, 1SB interposed therebetween, the polarizing plate (also referred to as a "front polarizing plate") disposed on the viewer side of the opposite substrate 1SB is an ordinary polarizing plate that does not include an anti-static conductive layer. In this manner, the touch panel 100C(V) according to one embodiment of the present invention does not include a conductive layer (either a detection electrode layer or an anti-static conductive layer) on the viewer side of the touch panel. Therefore, the touch panel 100C(V) is able to resolve the above-mentioned Problem 1 of high manufacturing costs, difficulty in making the device larger and thinner, low light transmittance, and the like.

Figure 38:
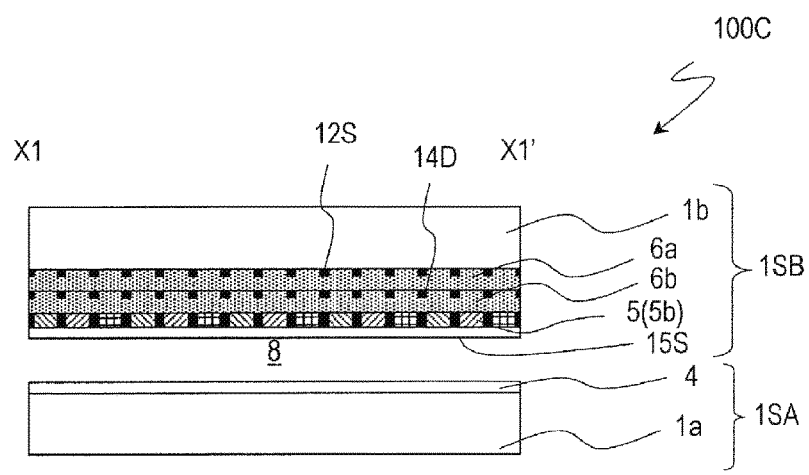
FIGS. 38(a) and 38(b) are schematic cross-sectional views of the type C touch panel 100C, which uses a horizontal electric field mode liquid crystal display panel.
Figure 38:
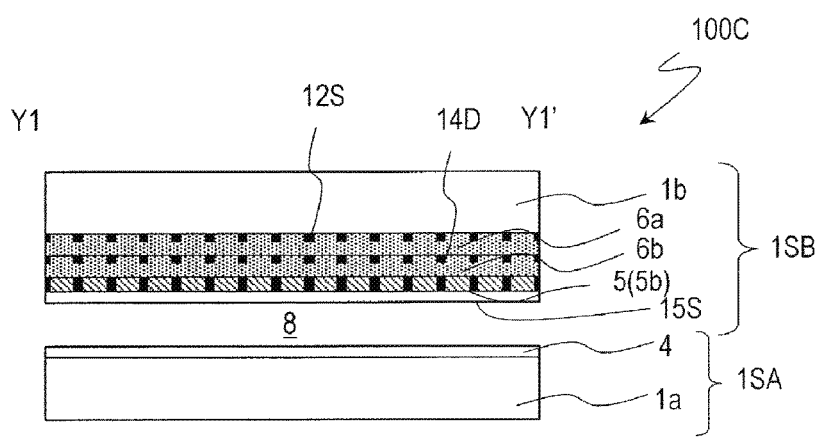
Figure 39:
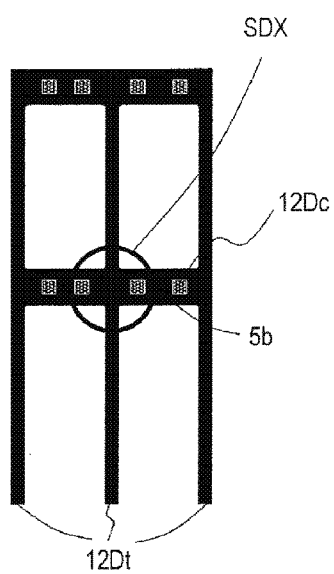
FIGS. 39(a) to 39(c) show the configuration of a connecting part of the lead-out wiring line 12Dt and the driving electrode 14D.
Figure 39:
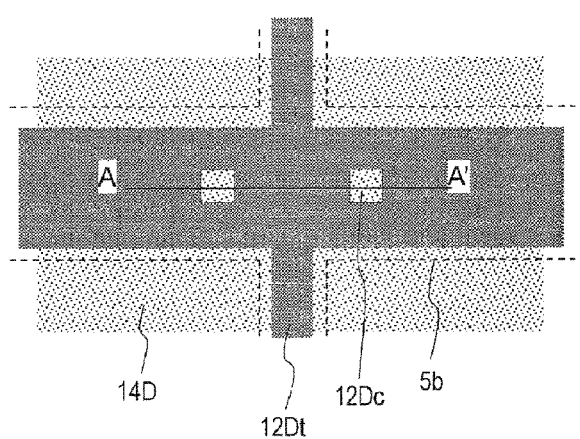
Figure 39:
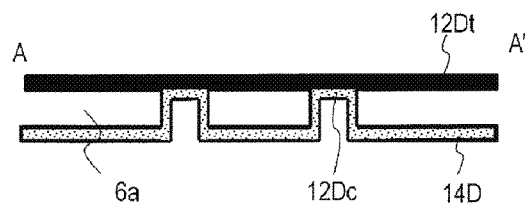

Next, the configuration of the type C touch panel 100C that includes a horizontal electric field mode liquid crystal display panel will be described with reference to FIG. 38. FIGS. 38(a) and 38(b) are schematic cross-sectional views of the touch panel 100C. FIG. 38(a) is a cross-sectional view along the line X1-X1', and FIG. 38(b) is a cross-sectional view along the line Y1-Y1'.

The touch panel 100C includes: the TFT substrate (first substrate) 1SA; the opposite substrate (second substrate) 1SB disposed on the viewer side of the TFT substrate 1SA; and the liquid crystal layer 8 provided between the TFT substrate 1SA and the opposite substrate 1SB. The touch panel 100C further includes: the plurality of pixel electrodes 2 and the common electrode 4 for applying voltage to the liquid crystal layer 8; and the plurality of detection electrodes 12S and the plurality of driving electrodes 14D for the touch sensor. The touch panel 100C includes an FFS mode liquid crystal display panel, for example, and the liquid crystal layer 8 is a horizontal alignment-type liquid crystal layer that includes nematic liquid crystal material having a negative dielectric anisotropy.

The opposite substrate 1SB includes: the second transparent substrate (a glass substrate; for example) 1b; and the plurality of driving electrodes 14D and the plurality of detection electrodes 12S formed on the liquid crystal layer 8 side of the second transparent substrate 1b. The opposite substrate 1SB does not include a conductive layer on the viewer side of the second transparent substrate 1b. The opposite substrate 1SB includes the shield electrode layer 15S, and the shield electrode layer 15S is formed on the liquid crystal layer 8 side of the second transparent substrate 1b. The shield electrode layer 15S is formed as a single conductive film, for example.

In the opposite substrate 1SB of the touch panel 100C, the shield electrode layer 15S is formed on the liquid crystal layer 8 side of the driving electrodes 14D and the detection electrodes 12S. The driving electrodes 14D and the detection electrodes 12S are insulated from each other via the interlayer insulating layer 6a, and the driving electrodes 14D and the shield electrode layer 15S are insulated from each other via the interlayer insulating layer 6b. The shield electrode layer 15S is formed on the color filter layer 5 (which includes the black matrix 5b) that is formed on the interlayer insulating layer 6b. The shield electrode layer 15S (unlike the driving electrodes 14D) has a fixed potential, and the shield electrode layer 15S is used so as to suppress the generation of a vertical electric field in the liquid crystal layer 8 that results from electric charges on the surface of the opposite substrate 1SB and the potential of the driving electrodes 14D. Therefore, the touch panel 100C is able to resolve the above-mentioned Problem 3 of a decline in display quality due to liquid crystal molecules becoming misaligned as a result of the voltage used to drive the touch panel.

The touch panel 100C does not include a conductive layer on the viewer side of the second transparent substrate 1b. In other words, a conductive layer is not formed on the surface on the viewer side of the second transparent substrate 1b. In addition, while the touch panel 100C has two polarizing plates (not shown) that are disposed so as to face each other through the two substrates 1SA, 1SB interposed therebetween, the polarizing plate (also referred to as a "front polarizing plate") disposed on the viewer side of the opposite substrate 1SB is an ordinary polarizing plate that does not include an anti-static conductive layer. In this manner, the touch panel 100C according to one embodiment of the present invention does not include a conductive layer (either a detection electrode layer or an anti-static conductive layer) on the viewer side of the touch panel. Therefore, the touch panel 100C is able to resolve the above-mentioned Problems 1 and 2 of high manufacturing costs, difficulty in making the device larger and thinner, low light transmittance, and the like.

Next, FIGS. 39(a) to 39(c) show the configuration of a connecting part of the lead-out wiring lines 12Dt and the driving electrodes 14D. FIG. 39(a) is a plan view that schematically shows the configuration of the connecting part of the lead-out wiring lines 12Dt and the driving electrodes 14D in the touch panel 100C. FIG. 39(b) is a schematic plan view of the intersection SDX of the lead-out wiring lines 12Dt and the wiring lines for the detection electrodes 12S, and FIG. 39(c) is a schematic cross-sectional view of the contact section 12Dc of the lead-out wiring lines 12Dt and the driving electrodes 14D.

As shown in FIGS. 39(a) to 39(c), the driving electrodes 14D and the lead-out wiring lines 12Dt are connected to each other in the contact section 12Dc within a contact hole formed in the interlayer insulating layer 6a. The detection electrodes 12S and the driving electrodes 14D are formed of mesh-shaped (grid-shaped) metal electrodes, for example, and the contact sections 12Dc also are formed in locations that overlap the light-shielding portion of the black matrix 5b.

Next, the configuration of type D touch panels will be described with reference to FIGS. 40 to 43. In a type D touch panel, a common electrode 4 and/or a shield electrode layer 15S is/are used as the driving electrodes 14D. Type D includes both type D1 and type D2. Type D1 can utilize both vertical electric field mode and horizontal electric field mode liquid crystal display panels. Type D2 can utilize only horizontal electric field mode liquid crystal display panels. Since a type D touch panel utilizes the common electrode 4 and/or the shield electrode layer 15S as the driving electrodes 14D, a type D touch panel cannot resolve the above-mentioned Problem 3 but can resolve the above-mentioned Problem 1. In addition, when a horizontal electric field mode liquid crystal display panel is used, it is possible to resolve the above-mentioned Problem 2.

Figure 40:
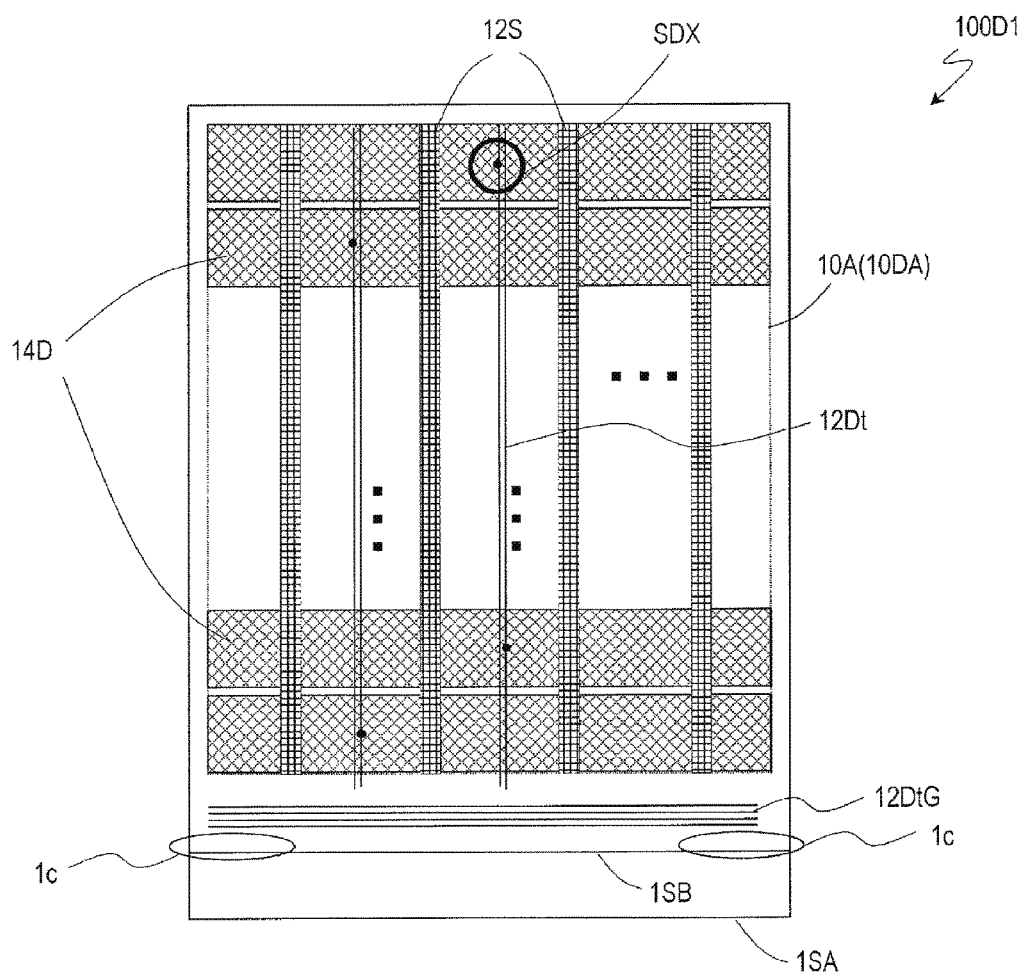
FIG. 40 is a schematic plan view of a type D1 touch panel 100D1 according to one embodiment of the present invention.

FIG. 40 is a schematic plan view of a type D1 touch panel 100D1. The touch panel 101 can include both vertical electric field mode and horizontal electric field mode liquid crystal display panels. The configuration of the touch panel 100D1 shown in FIG. 40 is fundamentally the same as the configuration of the touch panel 100C shown in FIG. 36, other than the driving electrodes 14D functioning as the common electrode 4 and/or the shield electrode layer 15S. In addition, the structure of the contact section 12Dc is fundamentally the same as the structure shown in FIG. 39. In a type D touch panel, the electrodes formed in a metal layer in the opposite substrate 1SB are only detection electrodes 12S (as well as optional lead-out wiring lines 12Dt). In regions in which it is not necessary to provide detection electrodes 12S, dummy wiring lines "Dummy" are formed (see FIG. 41 or FIG. 42). It is preferable to make transmittance uniform by providing the dummy wiring lines.

Figure 41:
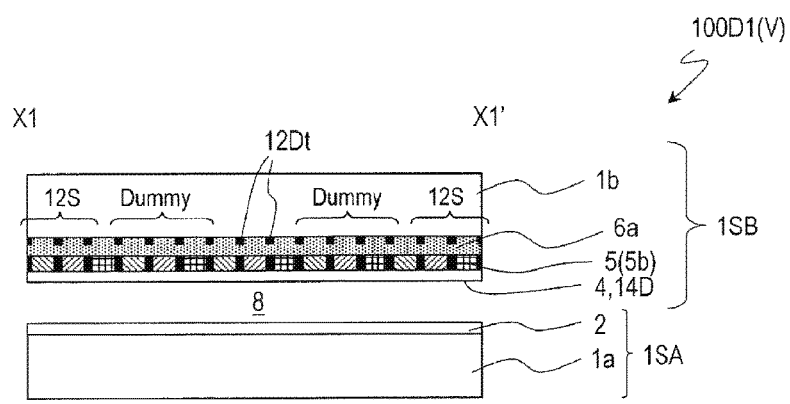
FIGS. 41(a) and 41(b) are schematic cross-sectional views of a type D1 touch panel 100D1(V) that uses a vertical electric field mode liquid crystal display panel.
Figure 41:
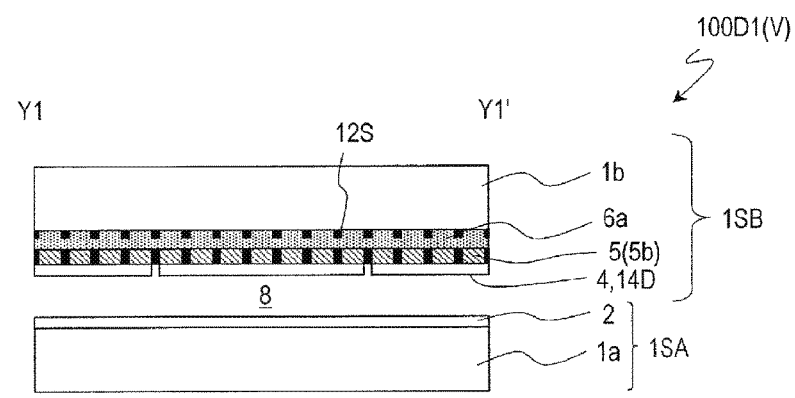

FIGS. 41(*a*) and 41(*b*) are schematic cross-sectional views of a type D1 touch panel 100D1(V) that uses a vertical electric field mode liquid crystal display panel. FIG. 41(*a*) is a cross-sectional view along the line X1-X1', and FIG. 41(*b*) is a cross-sectional view along the line Y1-Y1'.

The touch panel 100D1(V) includes the TFT substrate (first substrate) 1SA; the opposite substrate (second substrate) 1SB disposed on the viewer side of the TFT substrate 1SA; and the liquid crystal layer 8 provided between the TFT substrate 1SA and the opposite substrate 1SB. The touch panel 100D1(V) further includes: the plurality of pixel electrodes 2 and the common electrode 4 for applying voltage to the liquid crystal layer 8; and the plurality of detection electrodes 12S and the plurality of driving electrodes 14D for the touch sensor. The liquid crystal layer 8 is a vertical alignment-type liquid crystal layer that includes nematic liquid crystal material having a negative dielectric anisotropy, for example. The liquid crystal layer included in the vertical electric field mode liquid crystal display panel is not limited to a vertical alignment (VA) mode, and may be a liquid crystal layer used in another well-known type of vertical electric field mode, such as a twisted nematic (TN) mode, for example.

The TFT substrate 1SA includes: the first transparent substrate (a glass substrate, for example) 1*a*; and the plurality of pixel electrodes 2, which are formed on the liquid crystal layer 8 side of the first transparent substrate 1*a*. In FIG. 41, the plurality of pixel electrodes 2 are shown as one layer for ease of description, but are electrically independent for each pixel.

The opposite substrate 1SB includes: the second transparent substrate (a glass substrate, for example) 1*b*; and the plurality of driving electrodes 14D and the plurality of detection electrodes 12S formed on the liquid crystal layer 8 side of the second transparent substrate 1*b*. The opposite substrate 1SB does not include a conductive layer on the viewer side of the second transparent substrate 1*b*. The opposite substrate 1SB includes the common electrode 4, and the common electrode 4 is formed on the liquid crystal layer 8 side of the second transparent substrate 1*b*. The common electrode 4 has a plurality of common electrode sections that are parallel to each other, and the various common electrode sections function as the driving electrodes 14D.

In the opposite substrate 1SB of the touch panel 100D1 (V), the common electrode 4 that functions as the driving electrodes 14D is formed on the liquid crystal layer 8 side of the detection electrodes 12S. The driving electrodes 14D (common electrode 4) and the detection electrodes 12S are insulated from each other via the interlayer insulating layer 6*a*. The interlayer insulating layer 6*a* is formed on the detection electrodes 12S, and the driving electrodes 14D (common electrode 4) are formed on the color filter layer 5 (which includes the black matrix 5*b*) that is formed on the interlayer insulating layer 6*a*.

The touch panel 100D1(V) does not include a conductive layer on the viewer side of the second transparent substrate 1*b*. In other words, a conductive layer is not formed on the surface on the viewer side of the second transparent substrate 1*b*. In addition, while the touch panel 100D1(V) has two polarizing plates (not shown) that are disposed so as to face each other through the two substrates 1SA, 1SB interposed therebetween, the polarizing plate (also referred to as a "front polarizing plate") disposed on the viewer side of the opposite substrate 1SB is an ordinary polarizing plate that does not include an anti-static conductive layer. In this manner, the touch panel 100D1(V) according to one embodiment of the present invention does not include a conductive layer (either a detection electrode layer or an anti-static conductive layer) on the viewer side of the touch panel. Therefore, the touch panel 100D1(V) is able to resolve the above-mentioned Problem 1 of high manufacturing costs, difficulty in making the device larger and thinner, low light transmittance, and the like.

Figure 42:
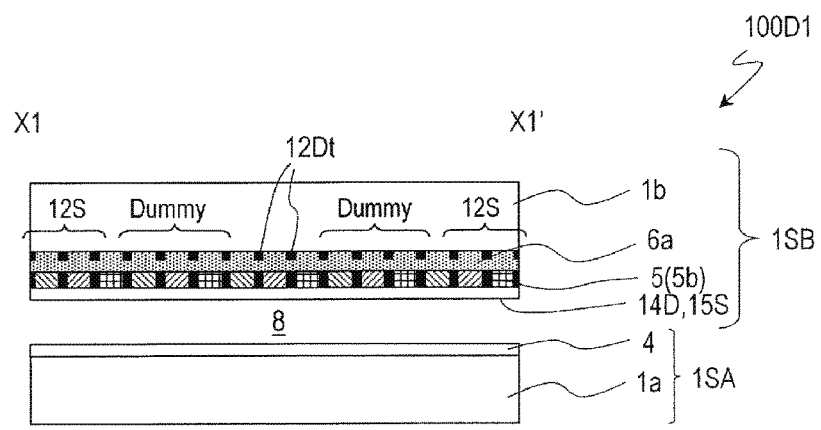
FIGS. 42(a) and 42(b) are schematic cross-sectional views of the type D1 touch panel 100D1, which uses a horizontal electric field mode liquid crystal display panel.
Figure 42:
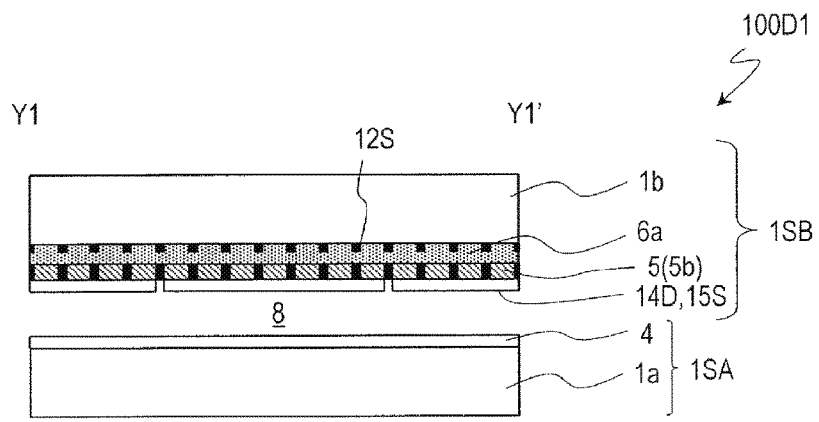

Next, the configuration of a type D1 touch panel 100D1 that includes a horizontal electric field mode liquid crystal display panel will be described with reference to FIG. 42. FIGS. 42(*a*) and 42(*b*) are schematic cross-sectional views of the touch panel 100D1. FIG. 42(*a*) is a cross-sectional view along the line X1-X1', and FIG. 42(*b*) is a cross-sectional view along the line Y1-Y1'.

The touch panel 100D1 includes: the TFT substrate (first substrate) 1SA; the opposite substrate (second substrate) 1SB disposed on the viewer side of the TFT substrate 1SA; and the liquid crystal layer 8 provided between the TFT substrate 1SA and the opposite substrate 1SB. The touch panel 100D1 further includes: the plurality of pixel electrodes 2 and the common electrode 4 for applying voltage to the liquid crystal layer 8; and the plurality of detection electrodes 12S and the plurality of driving electrodes 14D for the touch sensor. The touch panel 100D1 includes an FFS mode liquid crystal display panel, for example, and the liquid crystal layer 8 is a horizontal alignment-type liquid crystal layer that includes nematic liquid crystal material having a negative dielectric anisotropy.

The opposite substrate 1SB includes: the second transparent substrate (a glass substrate, for example) 1*b*; and the plurality of driving electrodes 14D and the plurality of detection electrodes 12S formed on the liquid crystal layer 8 side of the second transparent substrate 1*b*. The opposite substrate 1SB does not include a conductive layer on the viewer side of the second transparent substrate 1*b*. The opposite substrate 1SB includes the shield electrode layer 15S, and the shield electrode layer 15S is formed on the liquid crystal layer 8 side of the second transparent substrate 1*b*. The shield electrode layer 15S has a plurality of shield electrode sections that are parallel to each other, and the various shield electrode sections function as the driving electrodes 14D.

In the opposite substrate 1SB of the touch panel 100D1, the shield electrode layer 15S that functions as the driving electrodes 14D is formed on the liquid crystal layer 8 side of the detection electrodes 12S. The driving electrodes 14D (shield electrode layer 15S) and the detection electrodes 12S are insulated from each other via the interlayer insulating layer 6*a*. The interlayer insulating layer 6*a* is formed on the detection electrodes 12S, and the driving electrodes 14D (shield electrode layer 15S) are formed on the color filter layer 5 (which includes the black matrix 5*b*) that is formed on the interlayer insulating layer 6*a*.

The touch panel 100D1 does not include a conductive layer on the viewer side of the second transparent substrate 1*b*. In other words, a conductive layer is not formed on the surface on the viewer side of the second transparent substrate 1*b*. In addition, while the touch panel 100D1 has two polarizing plates (not shown) that are disposed so as to face each other through the two substrates 1SA, 1SB interposed therebetween, the polarizing plate (also referred to as a "front polarizing plate") disposed on the viewer side of the opposite substrate 1SB is an ordinary polarizing plate that does not include an anti-static conductive layer. In this manner, the touch panel 100D1 according to one embodiment of the present invention does not include a conductive layer (either a detection electrode layer or an anti-static conductive layer) on the viewer side of the touch panel. Therefore, the touch panel 100D1 is able to resolve the above-mentioned Problems 1 and 2 of high manufacturing costs, difficulty in making the device larger and thinner, low light transmittance, and the like.

Figure 43:
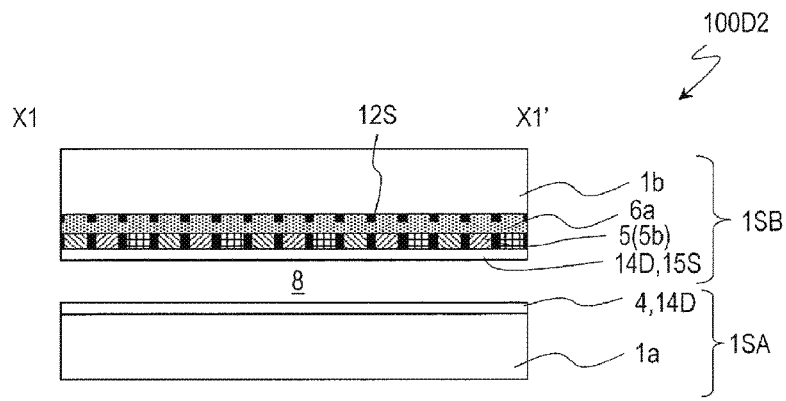
FIGS. 43(a) and 43(b) are schematic cross-sectional views of a type D2 touch panel 100D2 that uses a horizontal electric field mode liquid crystal display panel.
Figure 43:
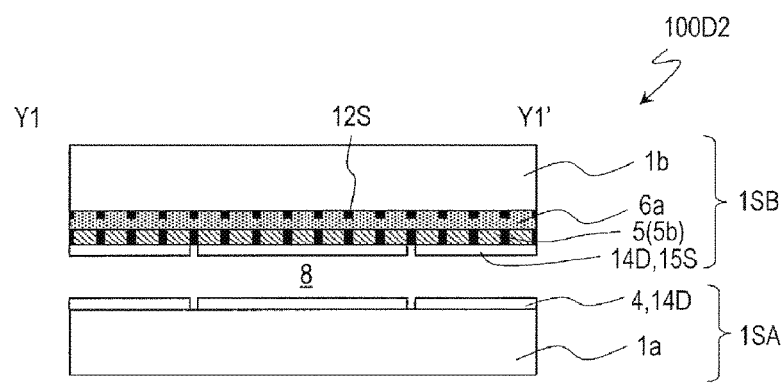

Next, the configuration of a type D2 touch panel 100D2 that includes a horizontal electric field mode liquid crystal display panel will be described with reference to FIG. 43. FIGS. 43(a) and 43(b) are schematic cross-sectional views of the touch panel 100D2. FIG. 43(a) is a cross-sectional view along the line X1-X1', and FIG. 43(b) is a cross-sectional view along the line Y1-Y1'.

The touch panel 100D2 differs from the touch panel 100D1 in that the common electrode 4 includes a plurality of common electrode sections, and the plurality of common electrode sections also function as driving electrodes 14D. In other words, the plurality of common electrode sections are respectively electrically connected to one of the plurality of shield electrode sections 15S that face the common electrode sections through the liquid crystal layer 8, and these common electrode sections function as driving electrodes 14D. The touch panel 100D2 has a lower parasitic capacitance (electrostatic capacitance) associated with the driving electrodes 14D than does the touch panel 100D1; thus, it is possible for the touch panel 100D2 to have a higher sensing sensitivity than the touch panel 100D1.

An example of the relationship between the touch panel and the specific configuration of the liquid crystal display panel will be described with reference to FIGS. 44 to 47.

FIG. 44(a) is a schematic plan view of a TFT substrate in a TFT liquid crystal display panel. FIG. 44(b) is a plan view that shows the TFT substrate as viewed from the opposite substrate side. FIG. 44(a) schematically shows a typical positional relationship of the pixel electrodes 2, the TFT, gate bus lines GL, source bus lines SL, and CS bus lines CSL. In addition, as shown in FIG. 44(b), the driving electrodes 14D are disposed so as to be hidden by the gate bus lines GL and the light-shielding portion of the black matrix 5b. Also, the common electrode 4 has a plurality of common electrode sections 4u, and the common electrode sections 4u have a configuration so as to be able to function as detection electrodes 12S.

Figure 45:
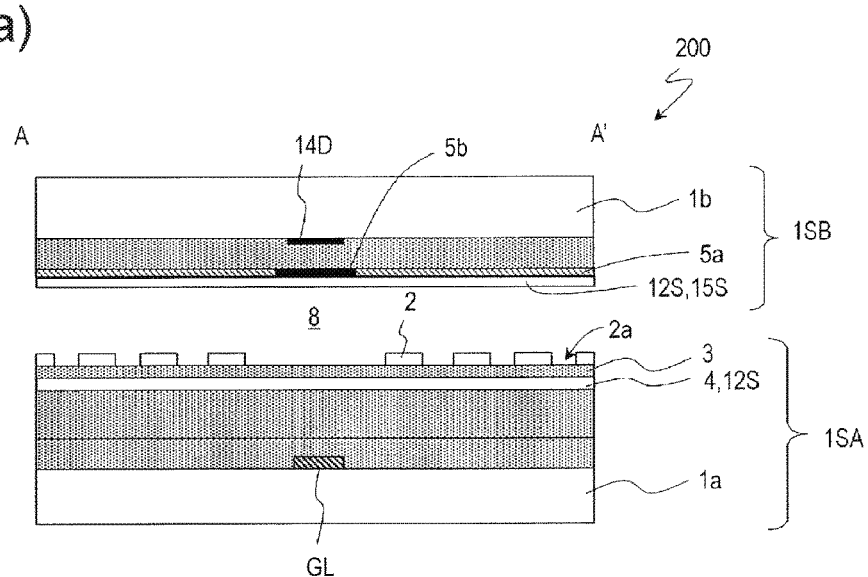
FIGS. 45(a) and 45(b) are schematic cross-sectional views of a touch panel 200 that uses an FFS mode liquid crystal display panel.
Figure 45:
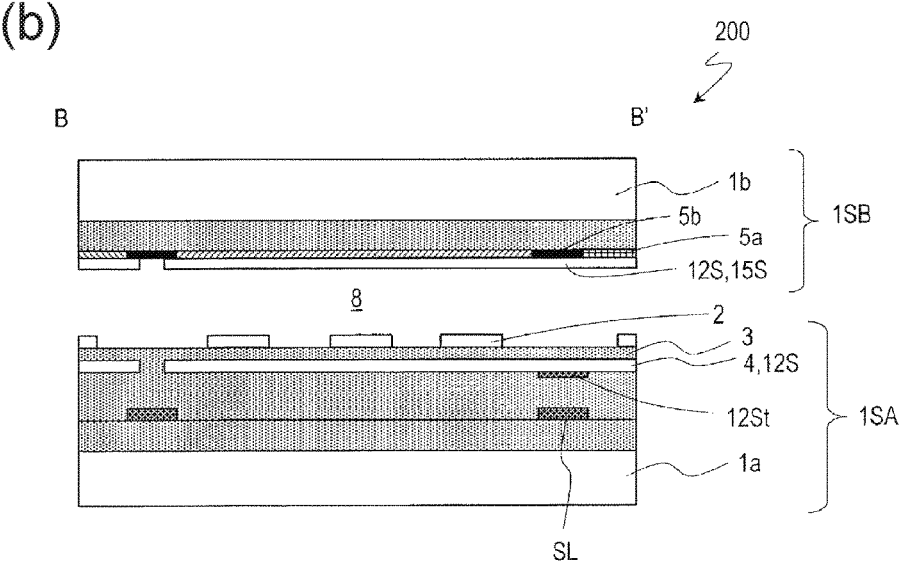

FIG. 45 shows schematic cross-sectional views of a touch panel 200 that uses an FFS mode liquid crystal display panel. FIG. 45(a) is a cross-sectional view along the line A-A' in FIG. 44(a), and FIG. 45(b) is a cross-sectional view along the line B-B' in FIG. 44(a).

The pixel electrodes 2 are formed on the side of the TFT substrate 1SA closest to the liquid crystal layer 8. The pixel electrode 2 includes slits 2a that extend in parallel. The common electrode 4 is provided below the pixel electrodes 2 with an interlayer insulating film 3 interposed therebetween. Pixel electrodes 2 do not exist between the detection electrodes 12S (common electrode 4, 4u) and the driving electrodes 14D of the touch sensor. As a result, the capacitance (the capacitance value of the pixel capacitance) between the pixel electrodes 2 and the common electrode 4 varying as a result of a display operation of the liquid crystal display panel does not have an effect on a touch detection operation. Therefore, the accuracy of the touch detection operation can be increased.

The positional relationship between the pixel electrodes 2 and the common electrode 4 is not limited to the example used above, and it is also possible to use an electrode configuration utilized in a well-known FFS mode liquid crystal display panel.

Figure 46:
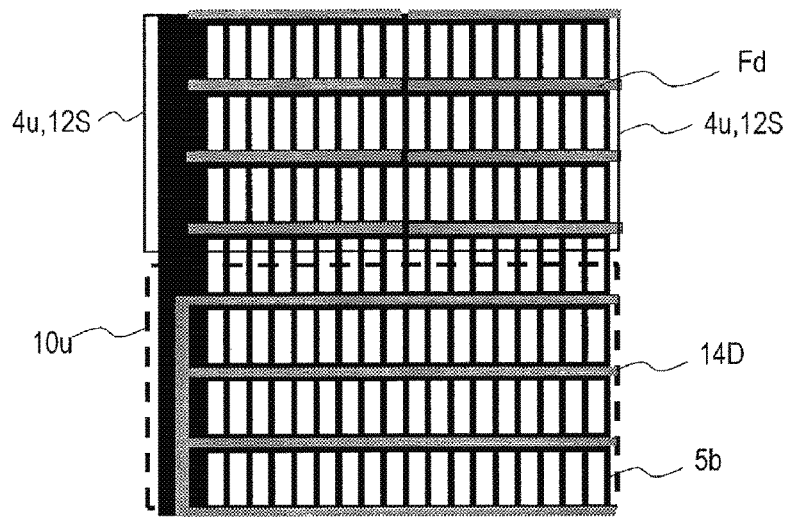
FIG. 46 shows a basic pattern of a touch sensor.
Figure 46:
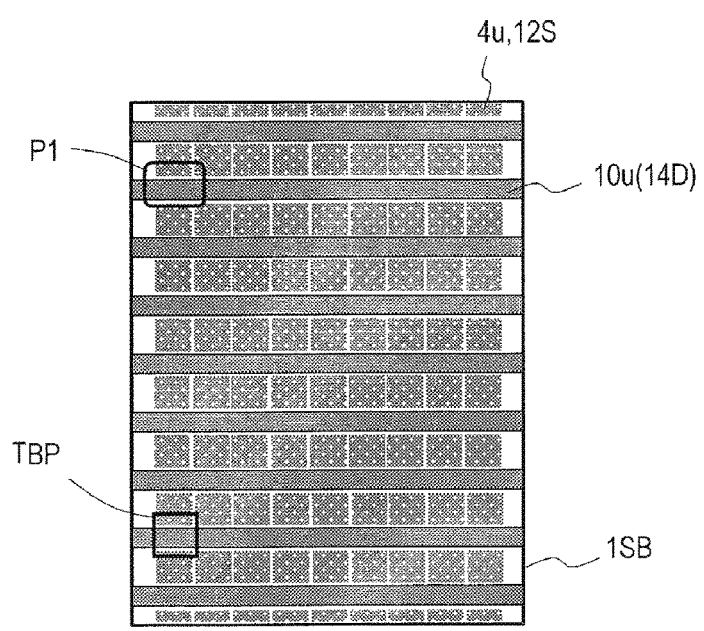

Next, the electrode wiring lines and the size of a basic touch sensor pattern will be described with reference to FIG. 46 and FIG. 47.

FIG. 46(b) shows a basic touch sensor pattern TBP, and FIG. 46(a) enlarges a portion P1 of FIG. 46(b). The size of the basic touch sensor pattern TBP that is formed from the various detection electrodes 12S and the various driving electrodes 14D of the touch sensor is approximately 1 mm to 6 mm, for example. A location detection unit 10u of the driving electrodes 14D includes a plurality of the driving electrodes 14D that extend along the black matrix 5b. In addition, the detection electrodes 12S function as the common electrode 4, and the common electrode 4 is partitioned on the display signal wiring lines. The partitioned common electrodes 4u are respectively the location detection units of the detection electrodes 12S. Auxiliary wiring lines 12St that contribute toward decreasing the resistance of the detection electrodes 12S are arranged so as to overlap the display signal wiring lines. In addition, floating electrodes Fd, which are not electrically connected to any other location, may be provided in pixel regions in which driving electrodes 14D are not provided.

Figure 47:
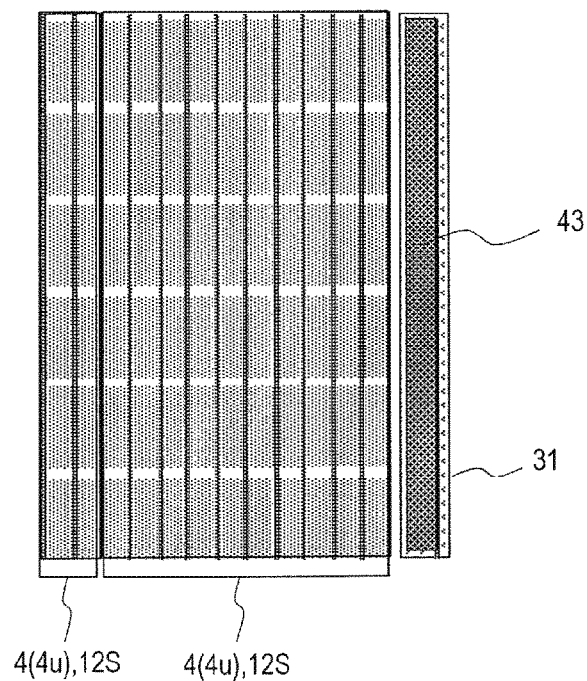
FIG. 47 shows the TFT substrate 1SA.
Figure 47:
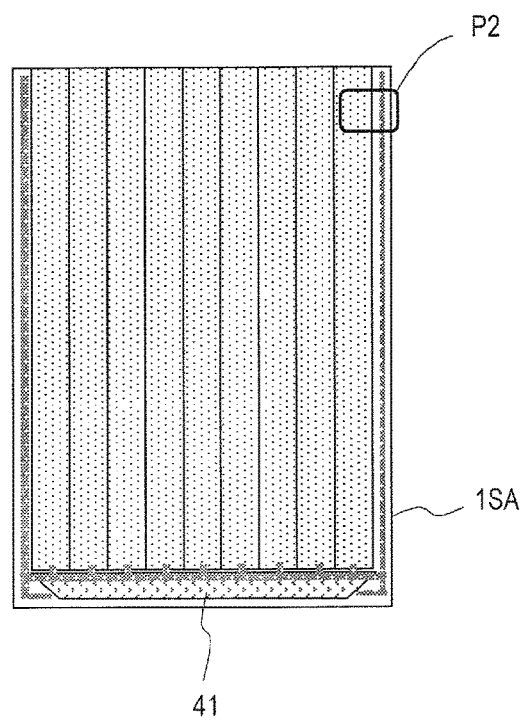

FIG. 47(b) shows the TFT substrate 1SA, and FIG. 47(a) enlarges a portion P2 of FIG. 47(b). As shown in FIG. 47, wiring lines 43 for the driving electrodes 14D are provided on the TFT substrate 1SA. The driving electrode wiring lines 43 on the TFT substrate 1SA may be formed so as to pass over a gate driver 31 formed on the TFT substrate 1SA. The opposite substrate 1SB and the TFT substrate 1SA are attached using a conductive seal (which includes conductive beads) that conducts only in the pressure-bonding direction, or the like, and the wiring lines 43 on the TFT substrate 1SA side are connected to the driving electrodes 14D on the opposite substrate 1SB side.

The touch panel of the present embodiment can be combined with not just an FFS mode liquid crystal display panel, but also with a VA mode liquid crystal display panel.

Figure 48:
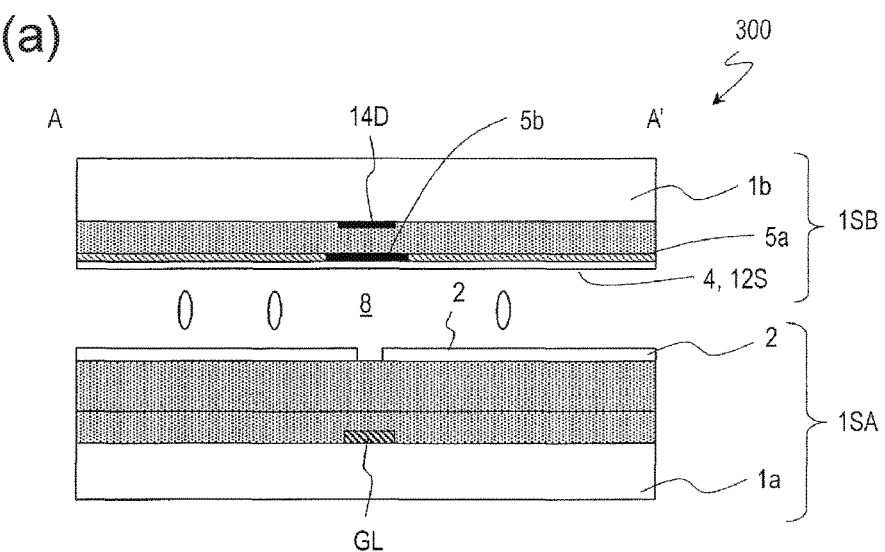
FIGS. 48(a) and 48(b) are cross-sectional views of a touch panel 300 that uses a VA (vertical alignment) mode liquid crystal display panel.
Figure 48:
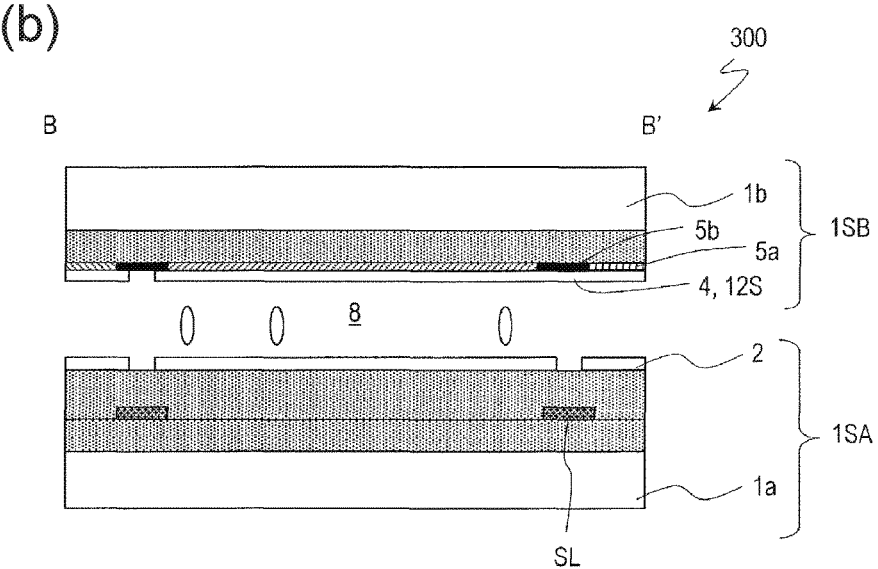

FIG. 48 shows cross-sectional views of a touch panel 300 that uses a VA (vertical alignment) mode liquid crystal display panel. FIG. 48(a) is a cross-sectional view along the line A-A' in FIG. 44(a), and FIG. 48(b) is a cross-sectional view along the line B-B' in FIG. 44(a).

The touch panel 300 differs from the touch panel 200 that used an FFS mode liquid crystal display panel in that the common electrode 4 is formed in the opposite substrate 1SB. The common electrode 4 is kept at a fixed potential; thus, it is possible to use the common electrode 4 as the detection electrodes 12S, and the common electrode 4 can also fulfill the function of a shield electrode layer.

In a touch panel according to one embodiment of the present invention, it is possible to obtain benefits such as those listed below when using a vertical alignment (VA) mode liquid crystal display panel.

When a circularly polarizing plate is used as the front polarizing plate, it is possible to realize a display with a high front luminance (a mode efficiency of 90%, for example). Thus, it is possible to realize lower power consumption. In addition, since the circularly polarizing plate is used so as to reduce ambient light reflection, it is possible to increase brightness contrast and improve visibility outdoors.

In addition, in a VA mode liquid crystal display panel, the auxiliary capacitance (CS) is smaller than in an FFS mode liquid crystal display panel; thus, such a liquid crystal display panel is useful in increasing the display size. Furthermore, since flexoelectric polarization (polarization resulting from deformations of the electric field) such as that observed in FFS mode does not occur, low frequency driving is simple, and it is easy to realize low power consumption. Conversely, there are no restrictions regarding the liquid crystal material and the like, and such a touch panel is useful in high speed driving (double speed, quadruple speed, or the like).

The present specification discloses the touch panels described below.

<Item 1>

A touch panel includes: a first substrate; a second substrate disposed on a viewer side of the first substrate; and a liquid crystal layer provided between the first substrate and the second substrate. The touch panel further includes: a plurality of pixel electrodes and a common electrode for applying a voltage to the liquid crystal layer; and a plurality of detection electrodes and a plurality of driving electrodes for a touch sensor. The first substrate includes: a first transparent substrate; and the plurality of pixel electrodes, which are formed on the liquid crystal layer side of the first transparent substrate. The second substrate includes: a second transparent substrate; and the plurality of driving electrodes and the plurality of detection electrodes, which are formed on the liquid crystal layer side of the second transparent substrate. The touch panel does not include a conductive layer on the viewer side of the second transparent substrate.

The touch panel disclosed in item 1 is able to at least resolve the problems (Problem 1) of high manufacturing costs, difficulty in making the touch panel larger and thinner, low light transmittance, and the like.

<Item 2>

In the touch panel disclosed in item 1, the second substrate includes the common electrode, the common electrode is formed on the liquid crystal layer side of the second transparent substrate, and the liquid crystal layer is a vertical alignment-type liquid crystal layer that includes nematic liquid crystal material having a negative dielectric anisotropy.

<Item 3>

In the touch panel disclosed in item 2, the common electrode has a plurality of common electrode sections, and the plurality of common electrode sections function as the plurality of detection electrodes.

<Item 4>

In the touch panel disclosed in item 1, the first substrate includes the common electrode, the common electrode is formed on the liquid crystal layer side of the first transparent substrate, and the liquid crystal layer is a horizontal alignment-type liquid crystal layer that includes nematic liquid crystal material having a negative dielectric anisotropy.

According to the touch panel disclosed in item 4, by utilizing nematic liquid crystal material having a negative dielectric anisotropy, it is possible to mitigate the problem (Problem 3) of display quality decreasing due to liquid crystal molecules becoming misaligned as a result of voltage used to drive the touch panel.

<Item 5>

In the touch panel disclosed in item 4, the second substrate further includes a shield electrode layer formed closer to the liquid crystal layer than the plurality of driving electrodes.

According to the touch panel disclosed in item 5, since it is not necessary to use a touch panel in which a polarizing plate disposed on the viewer side of the second substrate includes an anti-static conductive layer, it is possible to resolve the problems (Problem 2) of higher costs associated with using such a special polarizing plate, a decrease in the sensing functionality of the touch panel, and a decrease in light transmittance.

<Item 6>

In the touch panel disclosed in item 5, the potential of the shield electrode layer is fixed.

According to the touch panel disclosed in item 6, it is possible to resolve the problem (Problem 3) of display quality decreasing due to liquid crystal molecules becoming misaligned as a result of voltage used to drive the touch panel. The nematic liquid crystal material having a negative dielectric anisotropy that is disclosed in item 4 also contributes toward resolving this problem.

<Item 7>

In the touch panel disclosed in item 5 or item 6, the shield electrode layer has a plurality of shield electrode sections, and the plurality of shield electrode sections function as the plurality of detection electrodes.

According to the touch panel disclosed in item 7, it is possible to provide a touch panel with a relatively simply configuration.

<Item 8>

In the touch panel disclosed in any one of items 4 to 7, the common electrode has a plurality of common electrode sections that are parallel to the plurality of detection electrodes, and the plurality of common electrode sections are respectively electrically connected to one of the plurality of detection electrodes that face the common electrode sections through the liquid crystal layer.

According to the touch panel disclosed in item 8, sensing sensitivity is increased as a result of the parasitic capacitance associated with the detection electrodes decreasing.

<Item 9>

In the touch panel disclosed in any one of items 1 to 8, the second substrate further includes a black matrix formed on the liquid crystal layer side of the second transparent substrate, the plurality of driving electrodes respectively include a metal electrode, and the plurality of driving electrodes are disposed so as to overlap a light-shielding portion of the black matrix when viewed from a direction normal to the second substrate.

According to the touch panel disclosed in item 9, it is possible to improve display brightness.

<Item 10>

In the touch panel disclosed in item 9, the plurality of detection electrodes extend in a first direction, the plurality of driving electrodes extend in a second direction that intersects the first direction, the light-shielding portion of the black matrix has a wide section that extends in the second direction, and the plurality of driving electrodes are disposed so as to overlap the wide section of the black matrix when viewed from a direction normal to the second substrate.

According to the touch panel disclosed in item 10, a touch panel is provided that has a high degree of brightness and in which the loss of light due to the driving electrodes is decreased.

<Item 11>

In the touch panel disclosed in item 10, the touch panel further includes a plurality of lead-out wiring lines that are formed from a same conductive film as the plurality of detection electrodes and that extend in the first direction, the plurality of driving electrodes are respectively connected to at least one of the plurality of lead-out wiring lines, and a terminal for the plurality of detection electrodes and a terminal for the plurality of lead-out wiring lines are each provided near a same side of the second transparent substrate that extends substantially parallel to the second direction.

According to the touch panel disclosed in item 11, it is possible to provide a touch panel in which there is almost no non-display area (narrow region) on three sides (the upper side, left side, and right side, for example).

<Item 12>

In the touch panel disclosed in any one of items 1, 2, and 4 to 6, the plurality of driving electrodes and the plurality of detection electrodes are formed from a same conductive film, and, among the plurality of driving electrodes, two driving electrodes that are adjacent to each other with one of the plurality of detection electrodes interposed therebetween are electrically connected to each other.

According to the touch panel disclosed in item 12, it is possible to provide a touch panel with a relatively simply configuration.

<Item 13>

In the touch panel disclosed in item 12, the touch panel further includes a plurality of lead-out wiring lines that are formed from the same conductive film as the plurality of driving electrodes and the plurality of detection electrodes, the plurality of driving electrodes are respectively connected to at least one of the plurality of lead-out wiring lines, and a terminal for the plurality of detection electrodes and a terminal for the plurality of lead-out wiring lines are each provided near a same side of the second transparent substrate that extends substantially parallel to the second direction.

According to the touch panel disclosed in item 13, it is possible to provide a touch panel in which there is almost no non-display area (narrow region) on three sides (the upper side, left side, and right side, for example).

<Item 14>

In the touch panel disclosed in any one of items 1, 2, and 4 to 6, the plurality of driving electrodes and the plurality of detection electrodes are formed from two different conductive films that are insulated from each other.

<Item 15>

In the touch panel disclosed in item 1 or item 4, the second substrate includes a shield electrode layer formed closer to the liquid crystal layer than the plurality of detection electrodes, the shield electrode layer has a plurality of shield electrode sections, and the plurality of shield electrode sections function as the plurality of driving electrodes.

According to the touch panel disclosed in item 15, it is possible to resolve the above-mentioned Problems 1 and 2.

<Item 16>

In the touch panel disclosed in any one of items 1, 2, and 4 to 6, the common electrode includes a plurality of common electrode sections, and the plurality of common electrode sections function as the plurality of driving electrodes.

According to the touch panel disclosed in item 16, sensing sensitivity is increased as a result of the parasitic capacitance associated with the driving electrodes decreasing.

INDUSTRIAL APPLICABILITY

A touch panel of the present invention can be utilized in a variety of applications.

DESCRIPTION OF REFERENCE CHARACTERS

1a TFT-side glass substrate
1b opposite substrate-side glass substrate
1c seal contact section
1SA TFT substrate
1SB opposite substrate
2 pixel electrode
2p pixel section
3 interlayer insulating layer
4 common electrode
5 color filter layer
5a color filter
5b black matrix
6, 6a, 6b interlayer insulating layer
8 liquid crystal layer
10A sensor array region
10DA display area
12Dc contact section
12Dt lead-out wiring line
12S detection electrode
12St detection wiring line
14D driving electrode
15S shield electrode
95 special polarizing plate
95S shield electrode within special polarizing plate
100A1, 100A2, 100B, 100C, 100D1, 100D2, 200, 300 touch panel

What is claimed is:

1. A touch panel, comprising:
a first substrate;
a second substrate disposed on a viewer side of the first substrate; and
a liquid crystal layer provided between said first substrate and said second substrate,
wherein the touch panel further includes a plurality of pixel electrodes and a common electrode for applying a voltage to the liquid crystal layer, and a plurality of detection electrodes and a plurality of driving electrodes for a touch sensor,
wherein the first substrate includes a first transparent substrate and said plurality of pixel electrodes formed on the liquid crystal layer side of the first transparent substrate,
wherein the second substrate includes a second transparent substrate and said plurality of driving electrodes and said plurality of detection electrodes formed on the liquid crystal layer side of the second transparent substrate,
wherein the touch panel does not include a conductive layer on the viewer side of the second transparent substrate,
wherein the first substrate includes the common electrode,
wherein the common electrode is formed on the liquid crystal layer side of the first transparent substrate,
wherein the liquid crystal layer is a horizontal alignment-type liquid crystal layer that includes nematic liquid crystal material having a negative dielectric anisotropy,
wherein the common electrode has a plurality of common electrode sections that are parallel to the plurality of detection electrodes, and wherein the plurality of common electrode sections are respectively electrically connected to one of the plurality of detection electrodes facing the common electrode sections through the liquid crystal layer.

2. The touch panel according to claim 1, wherein the second substrate further includes a shield electrode layer formed closer to the liquid crystal layer than the plurality of driving electrodes.

3. The touch panel according to claim 2, wherein a potential of the shield electrode layer is fixed.

4. The touch panel according to claim 2,
wherein the shield electrode layer has a plurality of shield electrode sections, and
wherein the plurality of shield electrode sections function as the plurality of detection electrodes.

5. The touch panel according to claim 1,
wherein the second substrate further includes a black matrix formed on the liquid crystal layer side of the second transparent substrate,
wherein the plurality of driving electrodes respectively include a metal electrode, and
wherein the plurality of driving electrodes are disposed so as to overlap a light-shielding portion of the black matrix when viewed from a direction normal to the second substrate.

6. The touch panel according to claim 5,
wherein the plurality of detection electrodes extend in a first direction,
wherein the plurality of driving electrodes extend in a second direction that intersects said first direction,
wherein the light-shielding portion of the black matrix has a wide section that extends in the second direction, and
wherein the plurality of driving electrodes are disposed so as to overlap the wide section of the black matrix when viewed from the direction normal to the second substrate.

7. The touch panel according to claim 6,
wherein the touch panel further includes a plurality of lead-out wiring lines that are formed from a same conductive film as the plurality of detection electrodes and that extend in the first direction,
wherein the plurality of driving electrodes are respectively connected to at least one of the plurality of lead-out wiring lines, and
wherein terminals for the plurality of detection electrodes and terminals for the plurality of lead-out wiring lines are both provided near a same side of the second transparent substrate that extends substantially parallel to the second direction.

8. The touch panel according to claim 1,
wherein the plurality of driving electrodes and the plurality of detection electrodes are formed from a same conductive film, and
wherein, from among the plurality of driving electrodes, two driving electrodes that are adjacent to each other with one of the plurality of detection electrodes interposed therebetween are electrically connected to each other.

9. The touch panel according to claim 8,
wherein the touch panel further comprises a plurality of lead-out wiring lines formed from the same conductive film as the plurality of driving electrodes and the plurality of detection electrodes,
wherein the plurality of driving electrodes are respectively connected to at least one of the plurality of lead-out wiring lines, and
wherein terminals for the plurality of detection electrodes and terminals for the plurality of lead-out wiring lines are both provided near a same side of the second transparent substrate.

10. The touch panel according to claim 1, wherein the plurality of driving electrodes and the plurality of detection electrodes are formed of two different conductive films that are insulated from one another.

11. The touch panel according to claim 1,
wherein the second substrate further includes a shield electrode layer formed closer to the liquid crystal layer than the plurality of detection electrodes,
wherein the shield electrode layer has a plurality of shield electrode sections, and
wherein the plurality of shield electrode sections function as the plurality of driving electrodes.

12. The touch panel according to claim 1,
wherein the common electrode includes a plurality of common electrode sections, and
wherein the plurality of common electrode sections function as the plurality of driving electrodes.

* * * * *